March 15, 1966     S. A. J. LILJENDAHL     3,239,849
METHOD OF HYDRO-PNEUMATIC CONVEYING, SYSTEM AND APPARATUS
Filed March 22, 1962     32 Sheets-Sheet 3
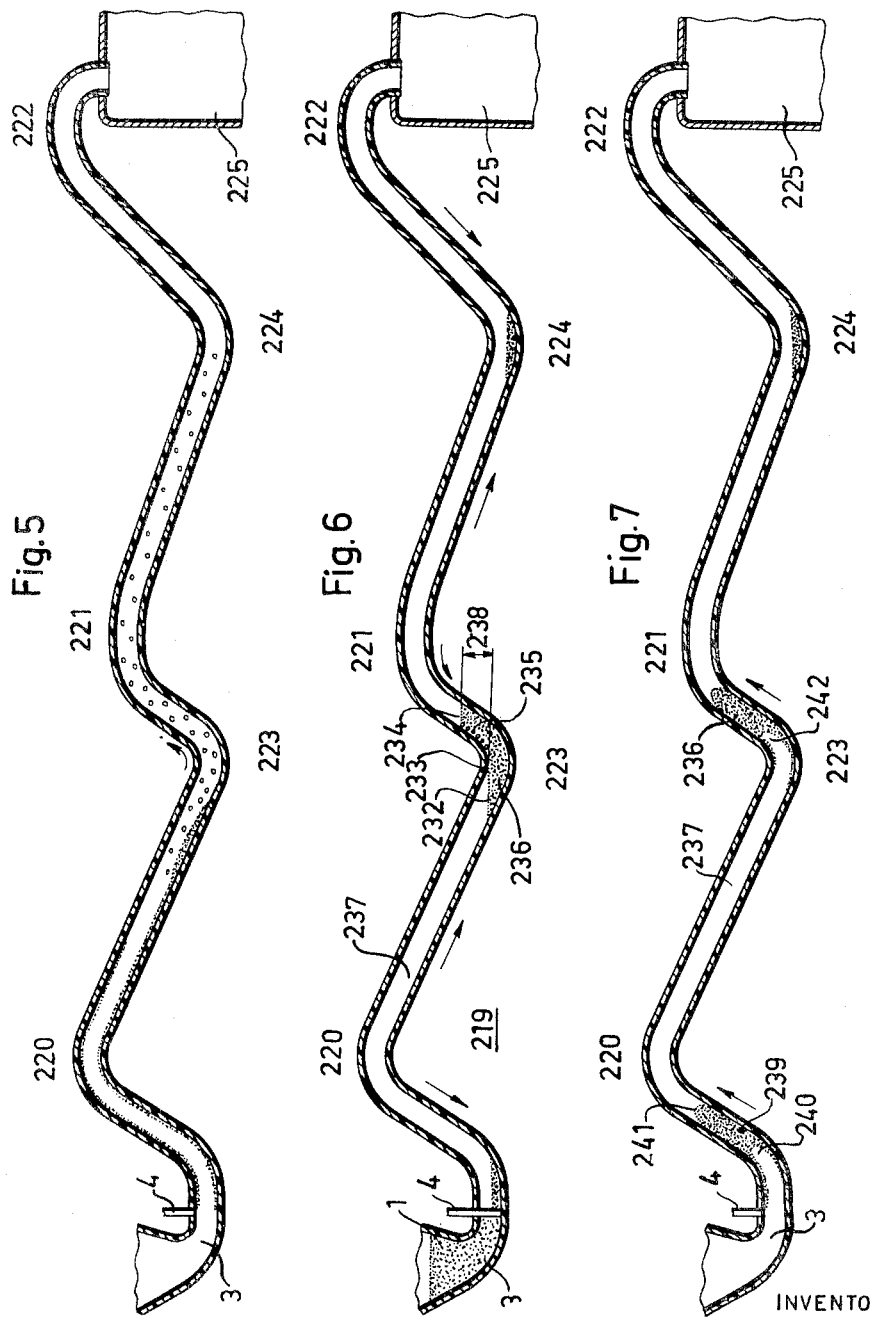
INVENTOR
Sven Algot Joel Liljendahl
BY
ATTORNEYS

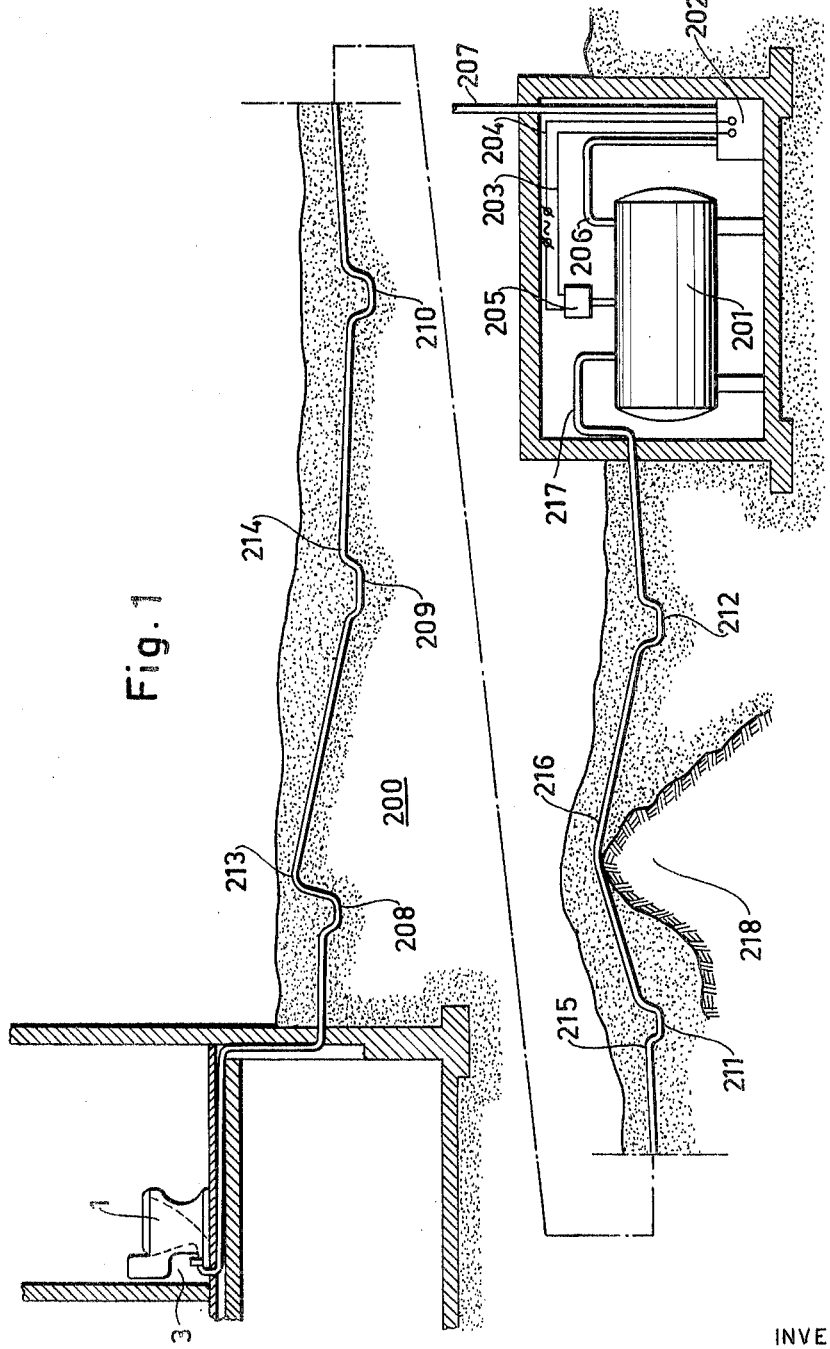

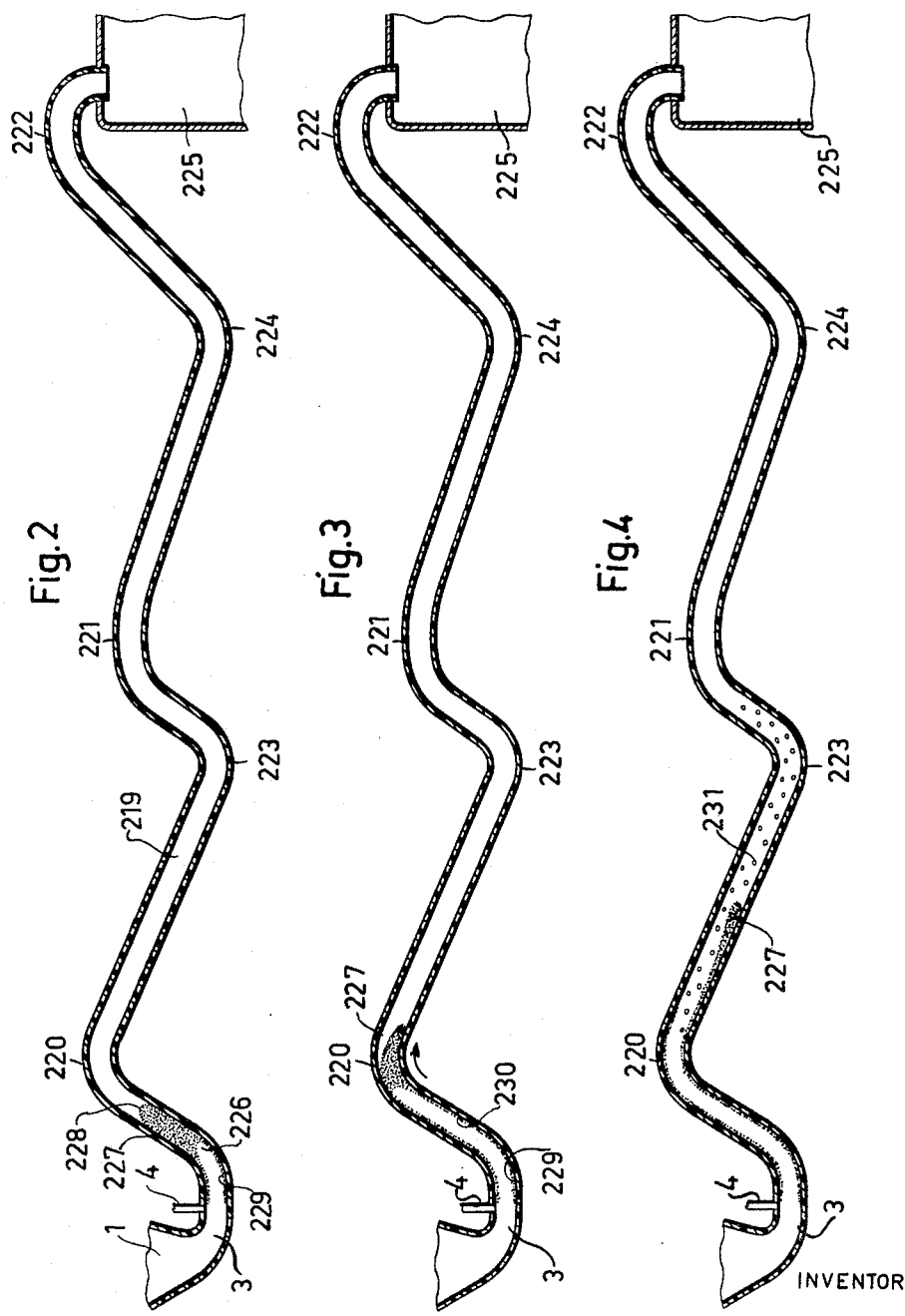

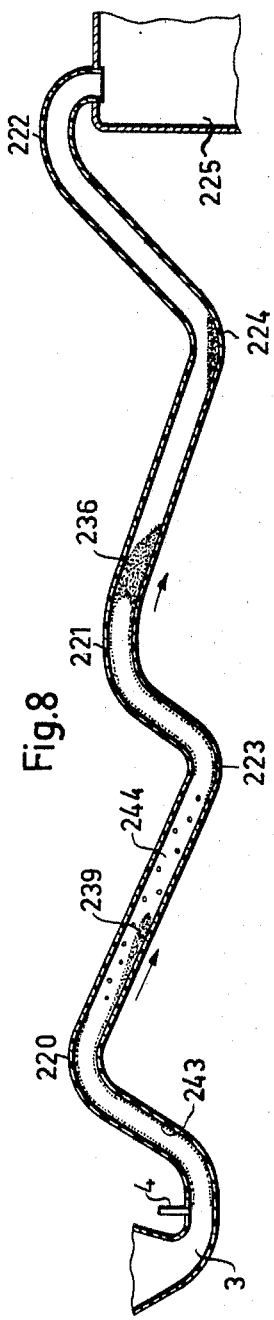
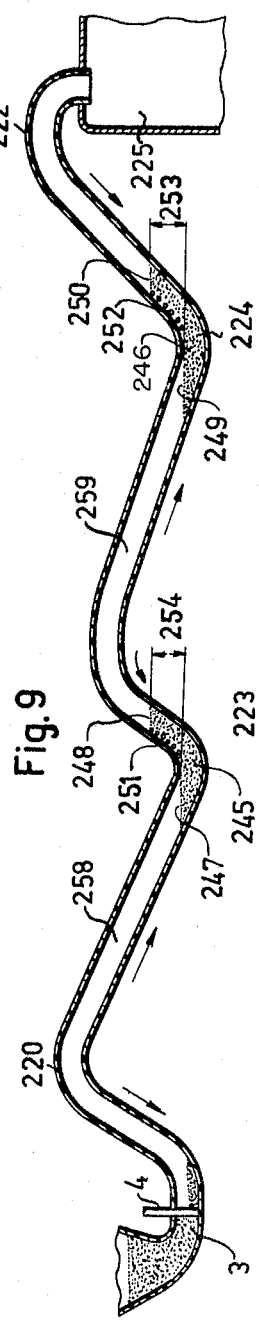
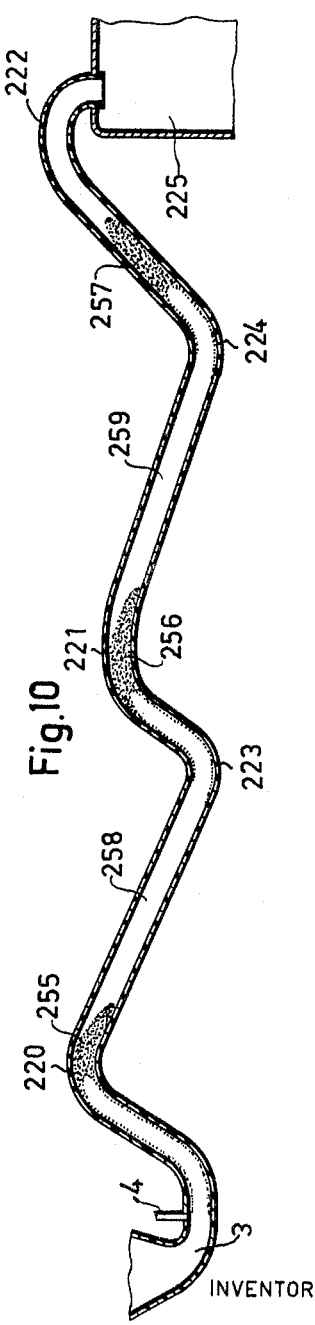

March 15, 1966  S. A. J. LILJENDAHL  3,239,849
METHOD OF HYDRO-PNEUMATIC CONVEYING, SYSTEM AND APPARATUS
Filed March 22, 1962  32 Sheets-Sheet 5

INVENTOR
Sven Algot Joel Liljendahl

BY *Strauch, Nolan & Neale*
ATTORNEYS

March 15, 1966  S. A. J. LILJENDAHL  3,239,849
METHOD OF HYDRO-PNEUMATIC CONVEYING, SYSTEM AND APPARATUS
Filed March 22, 1962  32 Sheets-Sheet 6
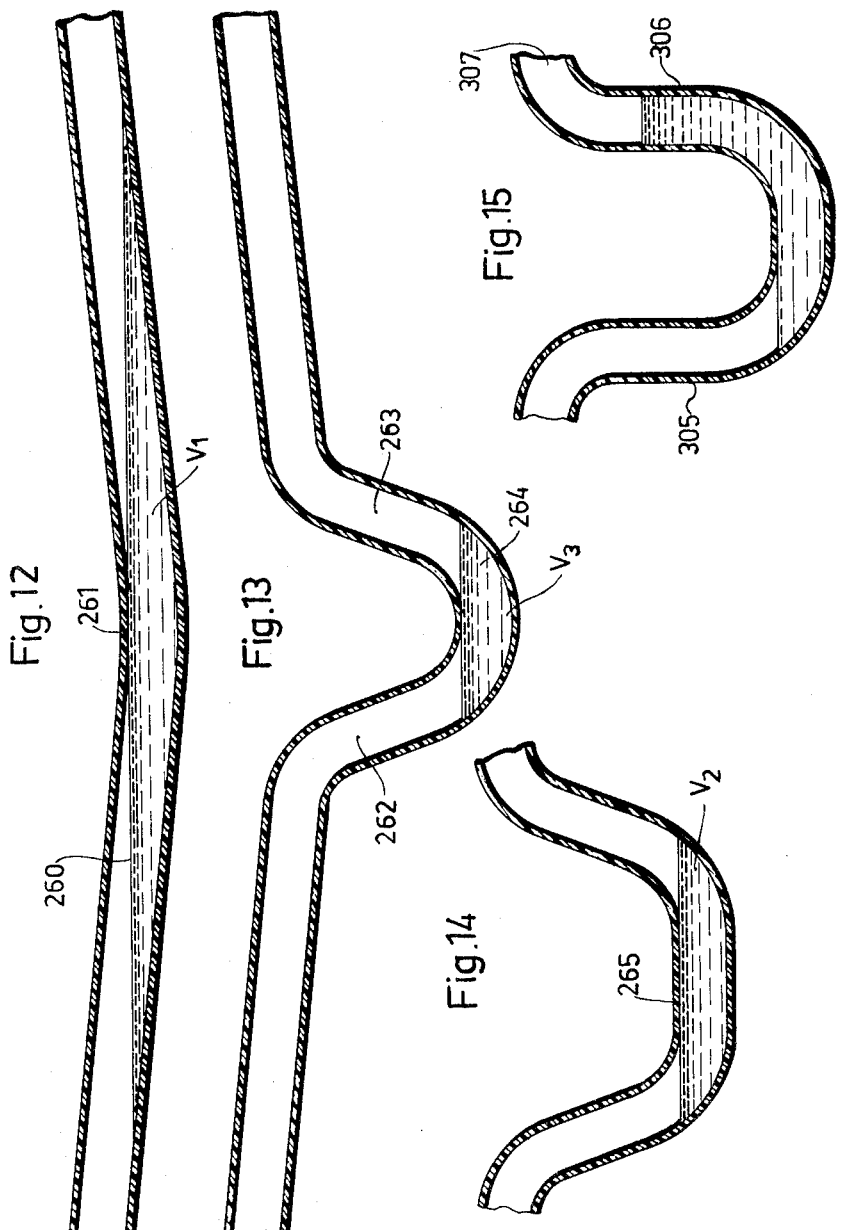
INVENTOR
Sven Algot Joel Liljendahl
BY  *Strauch, Nolan & Neale*
ATTORNEYS March 15, 1966 S. A. J. LILJENDAHL 3,239,849
METHOD OF HYDRO-PNEUMATIC CONVEYING, SYSTEM AND APPARATUS
Filed March 22, 1962 32 Sheets-Sheet 7

INVENTOR
Sven Algot Joel Liljendahl

BY *Strauch, Nolan & Neale*
ATTORNEYS

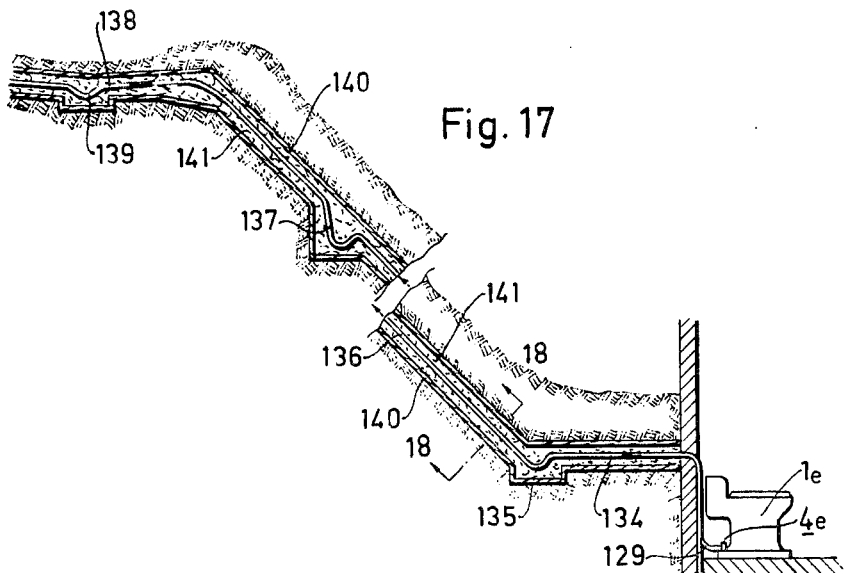
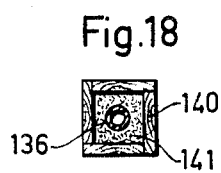

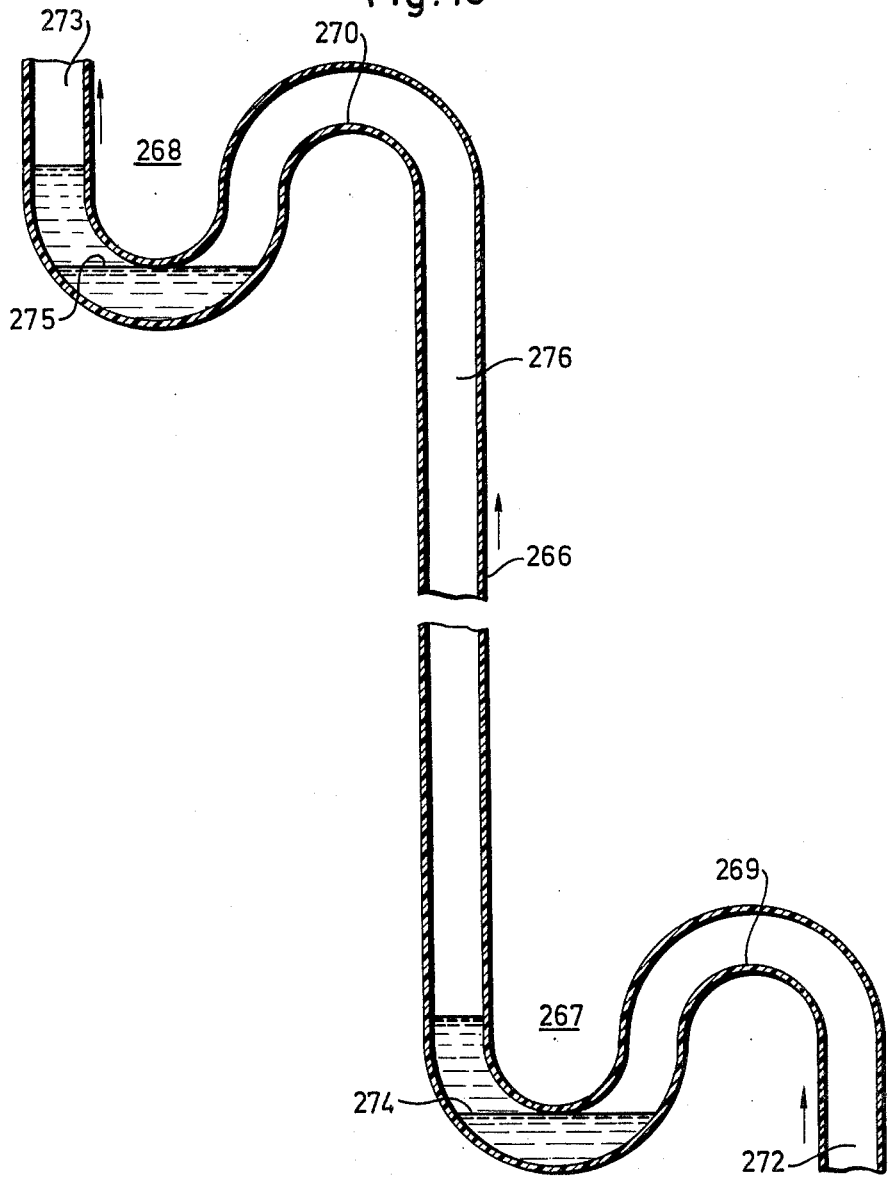

March 15, 1966  S. A. J. LILJENDAHL  3,239,849
METHOD OF HYDRO-PNEUMATIC CONVEYING, SYSTEM AND APPARATUS
Filed March 22, 1962  32 Sheets-Sheet 10

INVENTOR
Sven Algot Joel Liljendahl

BY *Strauch, Nolan & Neale*
ATTORNEYS

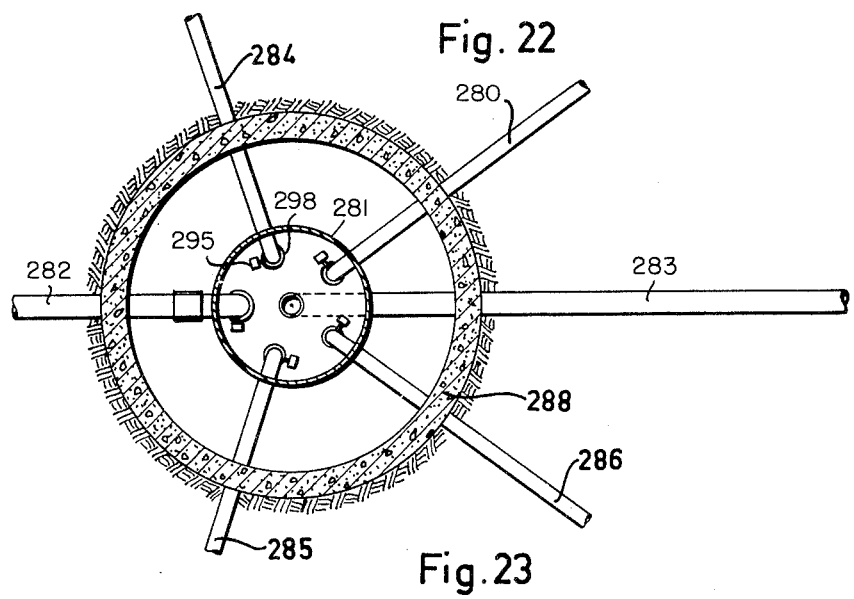

March 15, 1966   S. A. J. LILJENDAHL   3,239,849
METHOD OF HYDRO-PNEUMATIC CONVEYING, SYSTEM AND APPARATUS
Filed March 22, 1962   32 Sheets-Sheet 12

INVENTOR
Sven Algot Joel Liljendahl

BY *Strauch, Nolan & Neale*

ATTORNEYS

INVENTOR
Sven Algot Joel Liljendahl

BY *Krauch, Nolan & Neale*
ATTORNEYS

INVENTOR
Sven Algot Joel Liljendahl

BY
ATTORNEYS

March 15, 1966 S. A. J. LILJENDAHL 3,239,849
METHOD OF HYDRO-PNEUMATIC CONVEYING, SYSTEM AND APPARATUS
Filed March 22, 1962 32 Sheets-Sheet 15

INVENTOR
Sven Algot Joel Liljendahl

BY
ATTORNEYS

March 15, 1966     S. A. J. LILJENDAHL     3,239,849
METHOD OF HYDRO-PNEUMATIC CONVEYING, SYSTEM AND APPARATUS
Filed March 22, 1962     32 Sheets-Sheet 17

INVENTOR
Sven Algot Joel Liljendahl

BY *Strauch Nolan & Neale*
ATTORNEYS

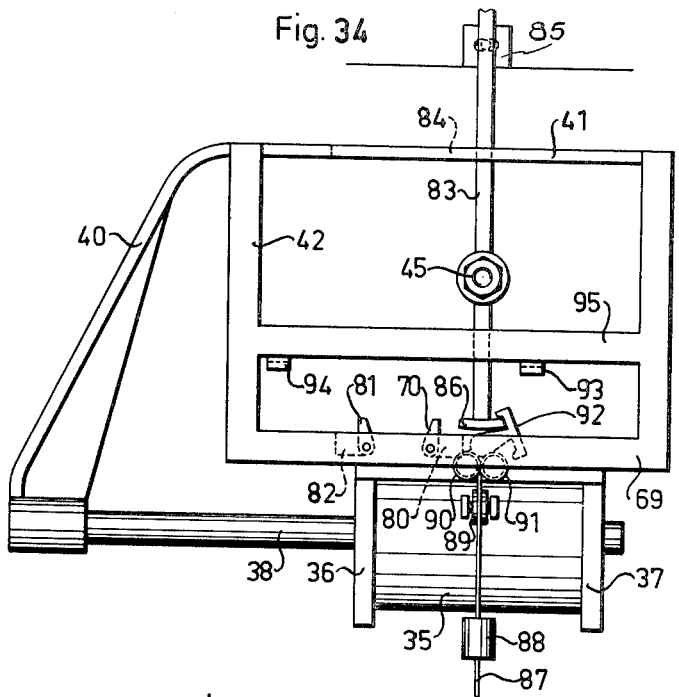

March 15, 1966 S. A. J. LILJENDAHL 3,239,849
METHOD OF HYDRO-PNEUMATIC CONVEYING, SYSTEM AND APPARATUS
Filed March 22, 1962 32 Sheets-Sheet 19

INVENTOR
Sven Algot Joel Liljendahl

BY *Strauch Nolan & Neale*

ATTORNEYS

March 15, 1966 S. A. J. LILJENDAHL 3,239,849
METHOD OF HYDRO-PNEUMATIC CONVEYING, SYSTEM AND APPARATUS
Filed March 22, 1962 32 Sheets-Sheet 20

INVENTOR
Sven Algot Joel Liljendahl

BY
ATTORNEYS

March 15, 1966     S. A. J. LILJENDAHL     3,239,849
METHOD OF HYDRO-PNEUMATIC CONVEYING, SYSTEM AND APPARATUS
Filed March 22, 1962     32 Sheets-Sheet 21

INVENTOR
Sven Algot Joel Liljendohl

BY
ATTORNEYS

March 15, 1966 S. A. J. LILJENDAHL 3,239,849
METHOD OF HYDRO-PNEUMATIC CONVEYING, SYSTEM AND APPARATUS
Filed March 22, 1962 32 Sheets-Sheet 22

*INVENTOR.*
SVEN ALGOT JOEL LILJENDAHL

March 15, 1966 S. A. J. LILJENDAHL 3,239,849
METHOD OF HYDRO-PNEUMATIC CONVEYING, SYSTEM AND APPARATUS
Filed March 22, 1962 32 Sheets-Sheet 26

INVENTOR.
SVEN ALGOT JOEL LILJENDAHL

March 15, 1966 S. A. J. LILJENDAHL 3,239,849
METHOD OF HYDRO-PNEUMATIC CONVEYING, SYSTEM AND APPARATUS
Filed March 22, 1962 32 Sheets-Sheet 27

INVENTOR.
SVEN ALGOT JOEL LILJENDAHL

March 15, 1966 S. A. J. LILJENDAHL 3,239,849
METHOD OF HYDRO-PNEUMATIC CONVEYING, SYSTEM AND APPARATUS
Filed March 22, 1962 32 Sheets-Sheet 28

*INVENTOR.*
SVEN ALGOT JOEL LILJENDAHL

March 15, 1966 S. A. J. LILJENDAHL 3,239,849
METHOD OF HYDRO-PNEUMATIC CONVEYING, SYSTEM AND APPARATUS
Filed March 22, 1962 32 Sheets-Sheet 29

*INVENTOR.*
SVEN ALGOT JOEL LILJENDAHL

March 15, 1966 S. A. J. LILJENDAHL 3,239,849
METHOD OF HYDRO-PNEUMATIC CONVEYING, SYSTEM AND APPARATUS
Filed March 22, 1962 32 Sheets-Sheet 30

*INVENTOR*
SVEN ALGOT JOEL LILJENDAHL

INVENTOR.
SVEN ALGOT JOEL LILJENDAHL

March 15, 1966 S. A. J. LILJENDAHL 3,239,849
METHOD OF HYDRO-PNEUMATIC CONVEYING, SYSTEM AND APPARATUS
Filed March 22, 1962

*INVENTOR.*
SVEN ALGOT JOEL LILJENDAHL

United States Patent Office 3,239,849
Patented Mar. 15, 1966

3,239,849
METHOD OF HYDRO-PNEUMATIC CONVEYING, SYSTEM AND APPARATUS
Sven Algot Joel Liljendahl, Gyllenstiernas Vag 8, Staket, Sweden
Filed Mar. 22, 1962, Ser. No. 184,632
37 Claims. (Cl. 4—77)

This application is a continuation-in-part of co-pending applications Serial Nos. 656,462, filed May 1, 1957 and 754,625, filed Aug. 12, 1958, both since abandoned.

This invention relates to methods of and systems and apparatus for conveying materials by means of hydro-pneumatics and is particularly exemplified by methods, systems and apparatus for emptying water closet bowls, atomic and other noxious waste materials and conveying the emptied material to a desired different location. This application is a continuation-in-part combining the basic disclosures and claims of co-pending applications Serial Nos. 656,462, filed May 1, 1957 and 754,625, filed August 12, 1958, and includes additional subject matter not part of either co-pending application. Both of said co-pending applications are now abandoned.

The present invention also relates to waste disposers, such as water closets, comprising a bowl having a bottom outlet, a valve normally closing off said outlet and movable into an open position in order to discharge the contents of the bowl, and a mechanism for controlling the operation of said valve. Such an operating mechanism should be adapted to be initiated at will and, after having been so initiated, to open the outlet valve and to re-close the same after a predetermined period of time, and which mechanism is, also adapted to control a supply of pressurized water so as to cause water to be supplied to the bowl.

The overall concept of the methods and systems of this invention and specific components used therein, have been developed, and are specifically described hereinafter, relative to rapid and economical disposal of excrements from water closet bowls and conveyance to a receiver. Nevertheless it is to be understood that basically the invention concerns conveyance of materials from one locale to another, the method, and automatic operating mechanism being applicable to material, other than excrements, which in particulate or agglomerate form can be maintained in suspension in a relatively small plug form liquid vehicle during self sealing passage of such a vehicle for a considerable distance in a conveyor conduit under the differential force of pneumatic pressures.

Conventional water closet systems are in most cases gravity flow conveyors, the closet bowls are connected to ordinary sewer pipes and a large quantity of water is required and used for each emptying of a closet bowl in such a conventional system. Still larger quantities of water are emptied into the same sewerage system from bathtubs, kitchen sinks and the like, and often surface water conducted from the streets is accommodated in the same sewer pipes rather than in separate storm sewers. Accordingly, it is often the case that when the water closet waste, containing poisonous excrements, finally reaches a receiver, it has been diluted with enormous quantities of water. In spite of the dilution, such waste constitutes a serious sanitary danger when emptied raw into rivers and lakes. To minimize the sanitary problems encountered when disposing of sewage, waste water from a common sewer system is often subjected to more or less complete purification in separate purifying plants prior to dumping it into a river, lake or other receiver. Due to the great dilution of the sewage, huge amounts of water must be processed which renders the purifying operation extremerly expensive and often unsatisfactory.

The conveying system of the present invention may be used to entirely eliminate noxious water closet bowl waste and other undesirable materials from receivers such as lakes and rivers. To that end, connection of waste disposers such as water closets to an ordinary sewer system is eliminated, permitting the remaining contents of the sewer system to be emptied into lakes or rivers without processing or, as may be desired in some cases, after having been subjected to a minor degree of purification in a simple and inexpensive type of plant.

This invention constitutes a conveyor system, using a combination of pneumatic and hydraulic principles, completely independent of a conventional sewer system, to transport materials, such as water closet wastes, to a separate receiving vessel where it is either destroyed, converted or refined into fertilizer or other suitable products. Such destruction or refining processes are greatly simplified because the waste or other material collected is in a concentrated condition due to the minimum water requirements of the basic inventive system. In the specific example of a water closet system the cost of separate waste disposal systems is more than offset by the elimination of the need for large purification plants.

Another important attribute of the present invention, particularly when utilized as a water closet disposal system, is in its resultant conservation of water, the availability of which is daily becoming of greater concern to the highly populated sections of all countries.

Some pneumatic type waste disposal systems proposed previous to applicant's present invention are found in British Patents Nos. 608,448 and 680,154 to Faulkner and British Patent No. 390,117 to Letellier. The Faulkner patents teach systems which are essentially portable in nature, having short extents of soil pipe which remain on a level or extend downward to a receptacle and use a sweeping action of high velocity airflow to pick-up excrement and carry it along the soil pipe to the receptacle. The Letellier system is particularly designed for shipboard use in disposing of all waste material on board the ship. Such systems, although using pneumatic pressure to develop the conveying force, are primarily hydraulic in transmitting the conveyed material as distinguished from the conveyor system of the present invention in which the conveying forces are primarily pneumatic in nature.

There are many disadvantages to such shipboard systems which make them unacceptable for use in conventional waste disposing systems. Such prior art systems use comparatively long straight stretches of large diameter horizontal pipe leading to a large diameter vertical pipe passing to a vacuum source. A vertical discharge pipe passes downwardly from a water closet, the bowl outlet of which is controlled by a valve. The amount of rinsing water poured into the closet bowl and the time of keeping the bowl outlet open are controlled at will by the operator and it must be borne in mind that in shipboard installations, the availability of rinse water is no problem. In practical tests made on such a prior art system, it has been found that after a number of rinsing procedures, the horizontal pipe will gradually become more and more filled with liquid and the inertia of the large mass of liquid and waste material accumulated in the horizontal pipe will render the rate of emptying the bowl very slow. If the bowl outlet is then held open a few seconds longer than the time required for the emptying of the bowl, there is developed in the horizontal pipe an oscillating surge causing most unpleasant rebuffs passing liquid return back through the bowl outlet and high up in the air. If, to avoid this undesired action, the operator then quickly closes the outlet as soon as the emptying is accomplished, practically no air is admitted to the system and the horizontal and vertical pipes will finally be practically entirey filled with liquid upon which a system like Letellier's becomes practically inoperable.

To produce an acceptable pneumatic conveyor type water closet system which will be satisfactorily operable over any appreciable distance and to raise the conveyed material through any appreciable height, in accord with the teachings of the present invention, it is necessary to produce short length liquid vehicle plugs of relatively small cross section area separated by relatively long lengths of air cushions. To safeguard the maintenance of these conditions, a system for positively initially forming a liquid plug and, if desired, having one or more vehicle plug reforming pockets located at intermediate positions in the conveyor conduit, as will be hereinafter described, are provided. In the system of the present invention, the short length of the plug vehicle and maintaining of a coherent plug shape over a considerable distance results in the acceleration rate of the plug vehicle easily reaching several times that of gravity of the order of 5 to 10 times in ordinary water closet systems, and thus is a primary factor behind the considerable force of the emptying and conveying action developed in the system of the present invention.

To accomplish the foregoing ends, the present invention includes provision for automatic closet bowl mechanism which distributes and delivers to the closet bowl, during each bowl operation, not only a restricted quantity of liquid but automatically determines delivery of at least a minimum requisite quantity of air into the conveyor conduit, the volume of the latter being several times that of the liquid. The closet bowl mechanism should, in order to safeguard correct functioning and avoid wasteful operation, be initiated by the operator, thereafter undergo an automatic cycle of operation and include means to prevent the operator from influencing the automatic cycle of operation of the mechanism after initiation.

It is significant that the previously known shipboard system discussed above is unable to transport liquid to a level higher than the water column corresponding to the negative pressure of the vacuum chamber, whereas applicant's invention herein described, in a practical installation has transported liquid and waste to heights considerably exceeding a 34 foot level due to the fact that the liquid is divided into a number of short plugs separated by long air cushions. In this respect, of course, the distance between plugs (air cushion) is dependent upon the extremely high velocities attained by the short length low mass plugs. For example, in one system constructed according to applicant's present invention, liquid has been continuously transported for years to a level of over 65 feet above the lowest point of the system, in spite of the fact that the vacuum never exceeded about 16 feet, water column.

A still further point, apparent from tests on the aforesaid previously known shipboard type of system, is that solid waste matter contained in the liquid in the large horizontal pipe will remain there for a considerable period of time, enabling it to settle so that the pipe gradually becomes jammed with waste and is thereafter unworkable.

Accordingly, a primary object of the present invention resides in the provision of novel methods of conveying material by means of a conduit, liquid vehicle plugs and pneumatic pressure.

A related object resides in the provision of a novel method of conveying material through a conduit from one location to a second distant location requiring the formation, maintenance and reformation, if necessary, of material being conveyed as small finite liquid vehicle plugs within an extent of relatively small diameter pipe line conduit, developing and utilizing differential pneumatic pressure to force the liquid vehicle plugs through the pipe line conduit at high velocity, accomplishing the complete conveyance of the plugs in sequential steps if necessary.

A further related object resides in the provision of the step of feeding material to be conveyed into the conveyor conduit while simultaneously forming the introduced feed material as a liquid vehicle plug and introducing a large volume of air immediately following the plug.

A further primary object resides in the provision of a novel method for conveyance of waste from one or more waste receptacles through a selective operable waste material introduction device into a pneumatic conduit and thence to a terminal receiver. In conjunction with this object it is contemplated that the waste receptacles be water closet, atomic waste or like receptacles.

A still further object resides in the provision of a novel method for removing wastes from one or more receptacles and conveying the wastes as liquid vehicle plugs to a receiver or container, which may be separable and portable, located at a distance relative to the original receptacle, comprising the steps of initially collecting a small quantity of waste material with liquid, rapidly introducing this small quantity of waste material with liquid into a pneumatic conduit as a small low mass coherent plug having sub-atmospheric pressure on the downstream side and permitting atmospheric pressure to be applied to its upstream side for a predetermined time period thereby driving the low mass plug along the conduit toward the receiver as a result of the force created by the pressure differential.

In conjunction with the foregoing object, it is a further object to provide in such a method the further step of draining and collecting the residue and remains of conveyed plugs which adhere to the walls of the conduit by boundary layer friction and final dissolution of a plug, into secondary coherent low mass plug vehicles at specific downstream locations in the conduit so that a subsequent introduction of a newly formed plug or charge of atmospheric air into the conduit upstream of the secondary plug, and preceding plugs, if any are present, will by means of cushions of air trapped between the separated plugs result in a differential pneumatic conveying force to move the spaced plugs, accumulated in the system, further distances along the conduit.

Still another object resides in a method for removing excrements collected in an initial waste receptacle such as a water closet bowl comprising the steps of wholly blocking the initial receptacle or bowl outlet, introducing a predetermined comparatively small quantity of water into the bowl, rapidly creating a fluid communication between the bowl outlet and a conduit with cross sectional area substantially equal to that of the outlet driving the bowl contents into said conduit as a coherent low mass vehicle plug by subjecting such plug to a sudden pneumatic pressure differential to thereby drive the liquid plug by means of the force exerted by the pressure differential along the pipe for a substantial distance in coherent plug state.

Still another primary object resides in the provision of a novel pneumatic conveying system including a conduit, one or more devices for introducing into the conduit, material to be conveyed in the form of coherent low mass liquid vehicle plugs, and a receiver under sub-atmospheric pressure at the terminal end of the conduit. In conjunction with this object it is a further object to provide a plurality of liquid vehicle plug forming pockets in the conduit or conduits between the material introducing devices and the receiver as dictated by the distance and height the material is to be conveyed.

A further object resides in the provision of novel combination hydro-penumatic conveying systems utilizing means to form and maintain, and reform if necessary, material to be conveyed in the form of low mass liquid vehicle plugs within a pneumatic conduit terminating in an evacuated receiving device including means for providing intermittent selectively controlled durations of application of differential pneumatic pressure upon the liquid vehicle plug.

A still further object resides in the provision of a small diameter pneumatic conduit terminating in an evacuation chamber, having one or more means for collecting small quantities of waste and liquid capable of being shaped into the pneumatic conduit and providing that such plug be followed by a considerable volume of atmospheric air.

Still another object resides in the provision of a novel water closet bowl emptying and disposal system in which a water closet bowl is arranged with its outlet directed into a portion of a pneumatic conduit system the terminal end of which is subjected to sub-atmospheric pressure, and bowl emptying mechanism is provided which is selectively operable and subject to an automatic cycle of operation to rapidly introduce the bowl contents into the pneumatic conveying conduit followed by a considerable volume of atmospheric air passing through the bowl and the bowl outlet and thereafter reclosing the outlet and introducing a quantity of liquid vehicle carrier into the bowl sufficient to form a subsequent low mass coherent liquid vehicle plug upon selective initiation of a subsequent cycle of operation.

In conjunction with the preceding object, it is a further object to provide a series of novel conduit drainage pockets at specific spaced intervals between water closet bowls and receiving receptacles enabling collection by gravity drainage of liquid vehicle and material particles from prior plugs passing through the conduit to form secondary plugs at spaced locations in the conduit thereby enabling progressive stepped conveying of liquid vehicle plugs for sucessive distances along the conveyor system until the material in the plugs reaches the receiving receptacle at the terminal end of the conveyor system.

A further object resides in the provision of a novel pneumatic liquid plug vehicle conveying system including a master receiver and multiple material introduction devices with associated branch conveyor conduits feeding into a main conveyor conduit, the main conduit and master receiver providing a sub-atmospheric pressure connection to all branch conduits and associated material introduction devices, and each material introduction device being capable of introducing a plug form vehicle followed by a large quantity of air under pressure higher than the sub-atmospheric pressure present in the system.

In conjunction with the preceding object, a further object resides in the provision of a plurality of novel vehicle plug forming pockets spaced along the various conduits.

Another object resides in the provision of novel connection devices between branch conduits of a low mass liquid vehicle plug pneumatic conveyor system and a trunk line conduit. In conjunction with this object a further object resides in providing a connection box for joining conduits of one cross section dimension with a trunk conduit of slightly larger cross section dimension enabling reforming of any plugs introduced into the connection box for subsequent conveyance as reformed liquid vehicle plugs along the trunk conduit during subsequent introduction of new material into any branch conduit.

It is also an object to provide in the connection boxes of the previous objects, novel provision to prevent upstream flow from any branch conduit through the connection box into any other branch conduit.

A further primary object resides in the provision of an operating mechanism which is suitable for the purpose stated, as well as a power drive for this mechanism, and means for initiating and controlling said power drive.

A further object of the invention resides in the provision of a structurally simple and reliable operating mechanism, as well as a power drive therefor, which is simple and safe in operation.

Still another object resides in the provision of novel automatic bowl conditioning and emptying mechanism, enabling initiation of operation by a user with subsequent fully automatic cyclic control of discharge of the bowl contents as a vehicle plug through its outlet accompanied by a specific timed opening of the outlet enabling a considerable volume of air to follow the plug through the outlet, followed by a subsequent closure of the outlet, and an introduction of a predetermined small quantity of liquid to condition the bowl with sufficient liquid to form a subsequent low mass liquid vehicle plug for discharge through the outlet during the next succeeding operation.

A still further object of the invention is to provide an operating mechanism, the rate of operation of which in respect of various steps of its control function is readily adjustable so as to enable the desired opening and closing rates of the outlet valve to be obtained, and any desired supply of flushing water to the closet bowl to be determined at will.

A more specific object of the invention is to make provision, in a water closet of the kind referred to and which has its outlet connected through a waste conduit to a source of vacuum or sub-atmospheric pressure in order to promote discharging, for preventing initiation of the actuation of the operating mechanism if the vacuum existing at the bowl is less than a predetermined value.

Another object of the invention is to ensure automatic discharge from a closet bowl to which flushing water is being supplied, if the free water level in the bowl should happen to rise above a predetermined level.

A still further object resides in the provision of a novel charge forming and feeding apparatus for use with a low mass liquid vehicle plug, pneumatic conduit conveyor system, the apparatus including a receptacle having inlets connecting to atmosphere and to a source of water supply under pressure and an outlet connection to the pneumatic conveyor system, with control valves in said water supply connection and said outlet connection and selectively operable cyclical means for controlling opening and closing of the water supply valve and the outlet in an automatic predetermined manner, which can include coincident and non-coincident operational sequences, to render abrupt feeding of a low mass liquid vehicle charge through the outlet valve in coherent plug shape with subsequent recharging of the apparatus with a predetermined quantity of water. In conjunction with this object a further object resides in accomplishing introduction of water into the apparatus before and after the opening and closing of the outlet valve and, if desired, at a reduced rate during the time that the outlet valve is open, the outlet valve being retained open for a period exceeding that necessary for the charge to be fed as a coherent plug vehicle into the conveyor conduit.

In conjunction with the foregoing object a further object resides in the provision of novel electrical timing control in cyclic control relationship to the outlet valve and water system valve, still another object resides in a novel cyclic automatic system deriving hydraulic power for operation from the pressurized water supply system, and a still further object resides in a novel cyclic automatic system deriving pneumatic power for operation from an evacuation or sub-atmospheric apparatus.

Further novel features and other objects of this invention will become apparent from the following detailed description, discussion and the appended claims taken in conjunction with the accompanying drawings showing a preferred structure and embodiment, in which:

FIGURE 1 illustrates diagrammatically a water closet emptying and material conveying system made according to the present invention;

FIGURES 2-11 illustrate diagrammatically various stages in the operational functioning of a system as shown in FIGURE 1;

FIGURES 12-15 illustrate several embodiments of plug-forming pockets or traps used in the conveyor conduit;

Figure 16:
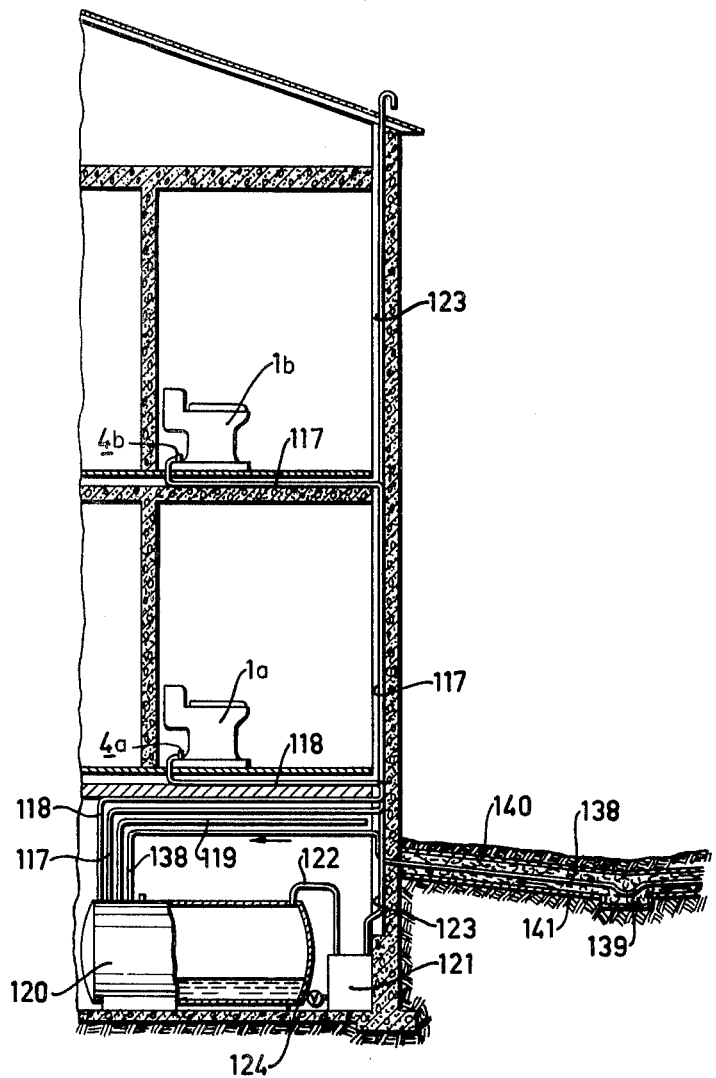
FIGURE 16 is a vertical section through a building illustrating a water closet system constructed in accord with the present invention, installed therein.
Figure 20:
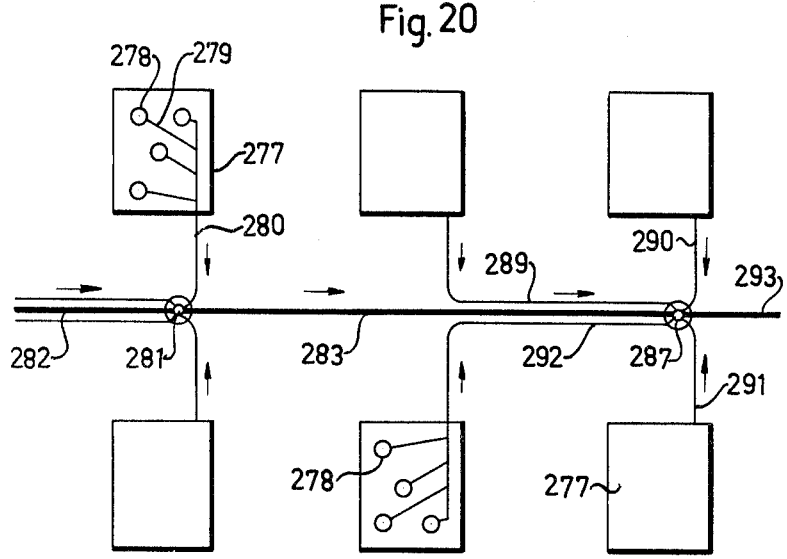
Figure 21:
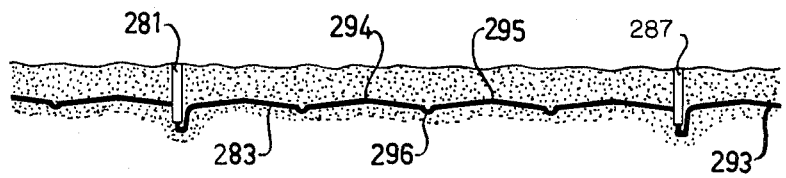
Figure 24:
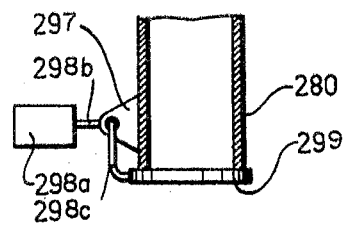
Figure 25:
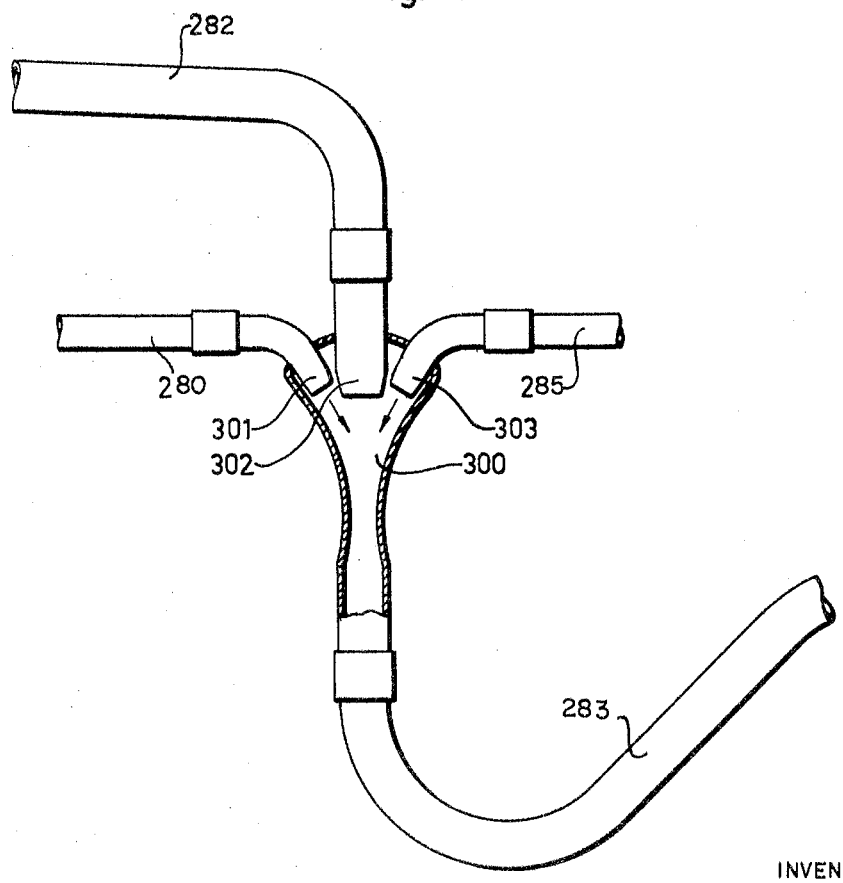
Figure 26:
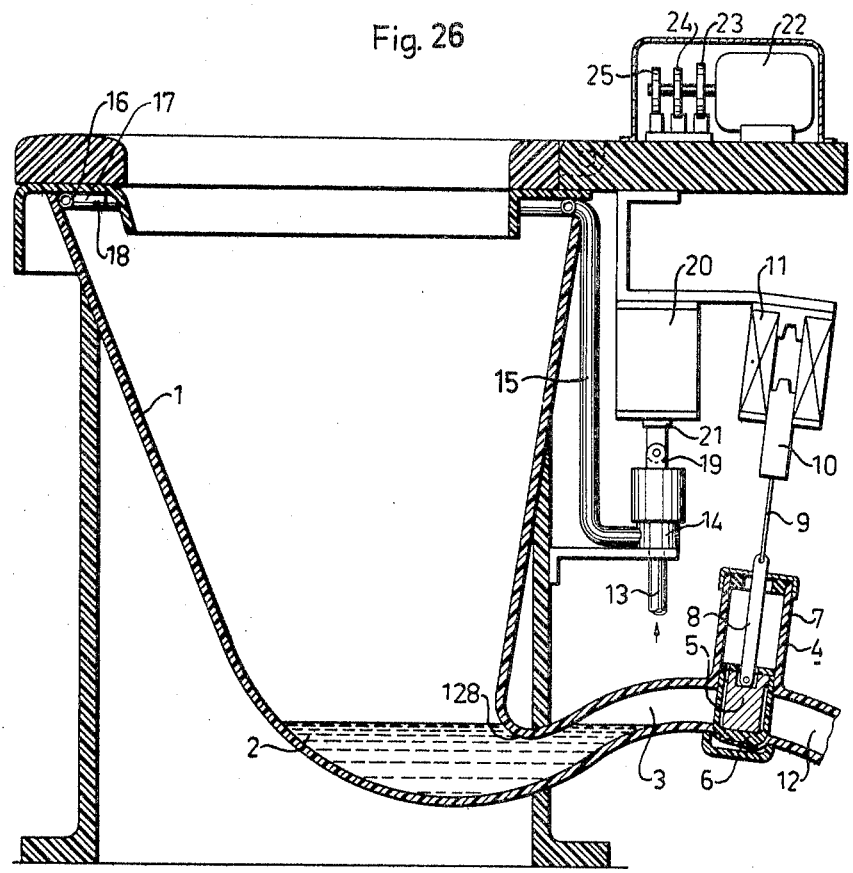
Figure 27:
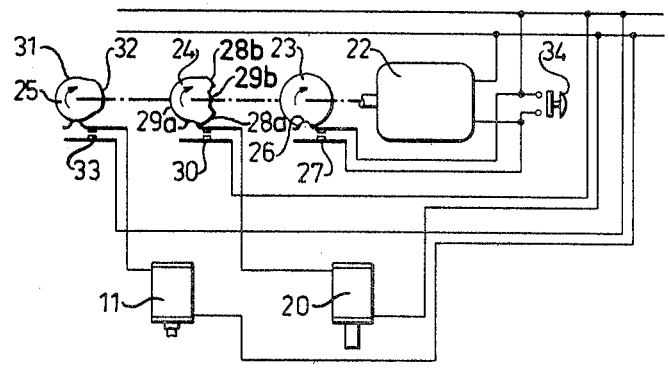
Figure 28:
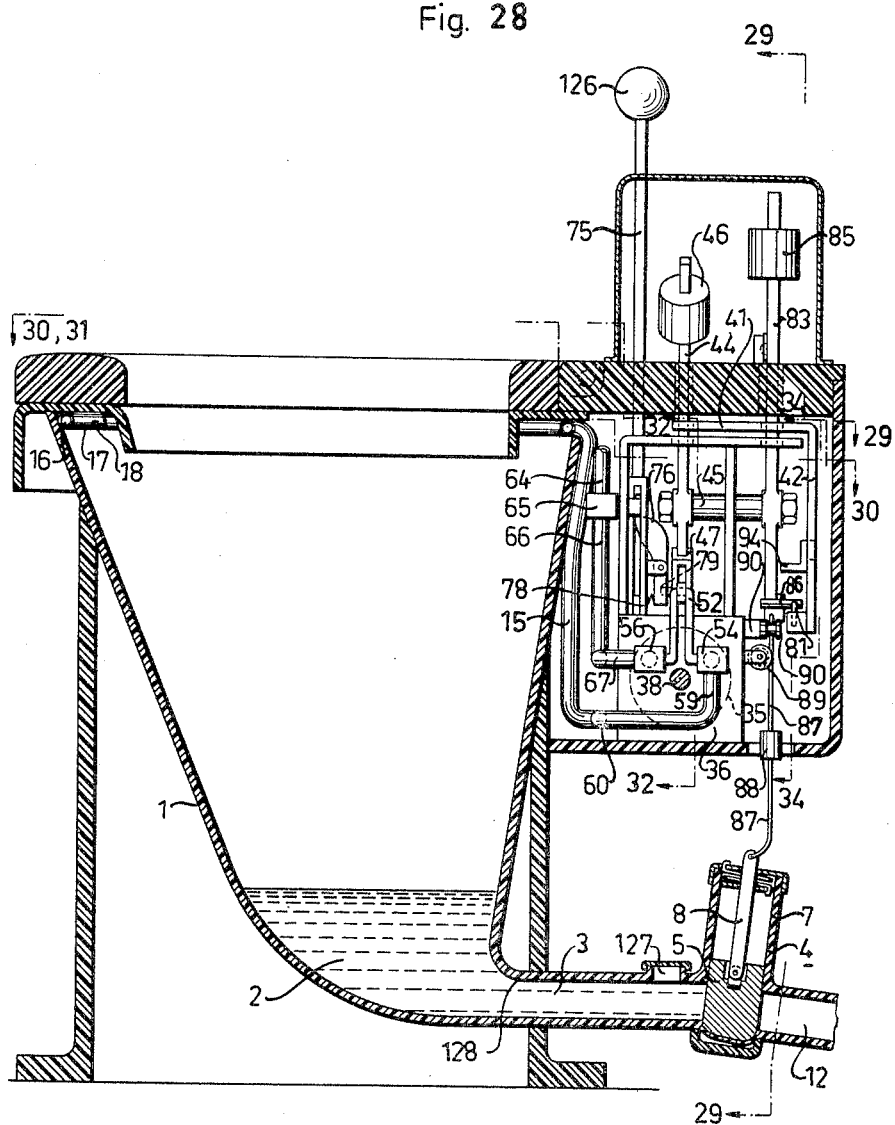
Figure 29:
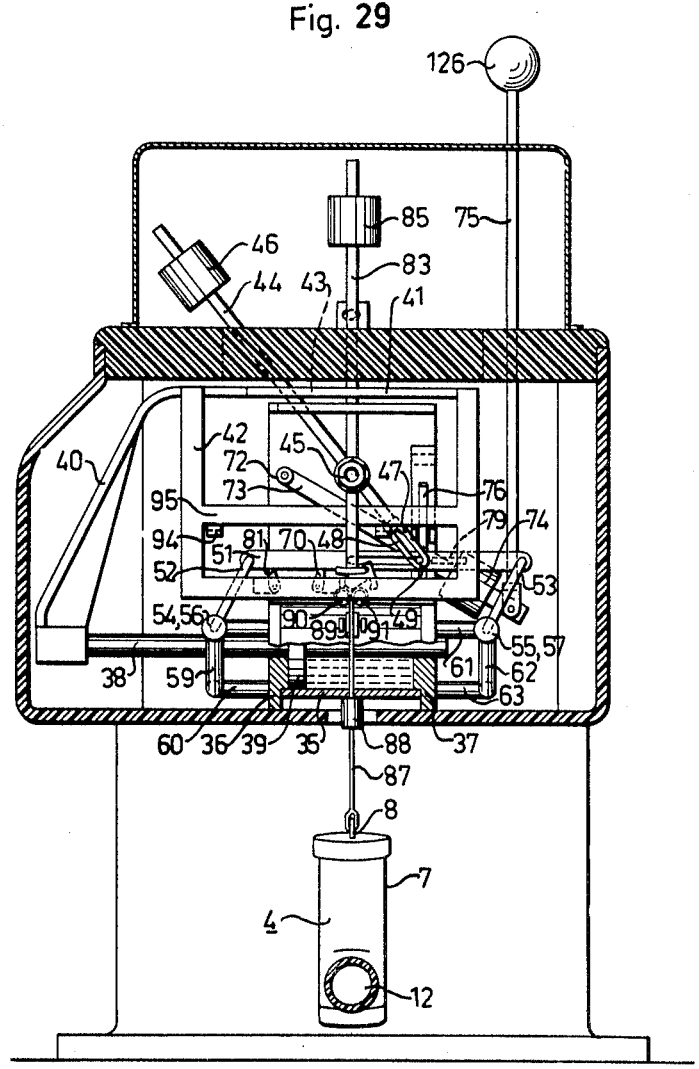
Figure 30:
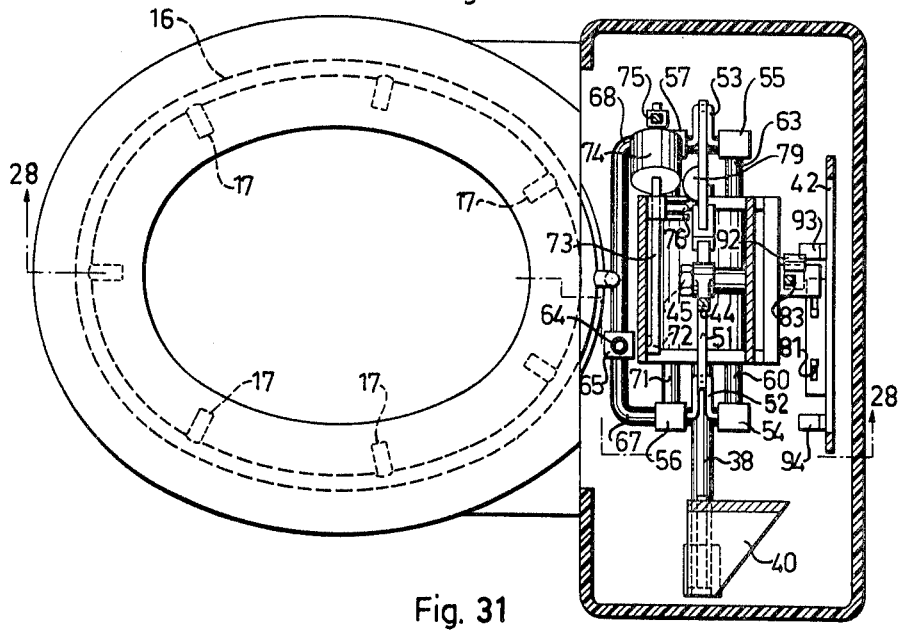
Figure 31:
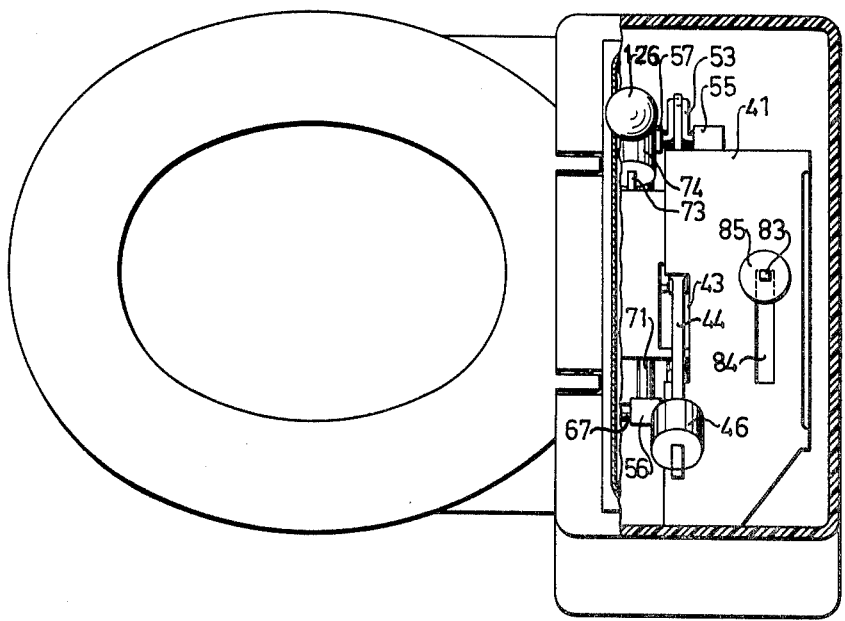
Figure 32:
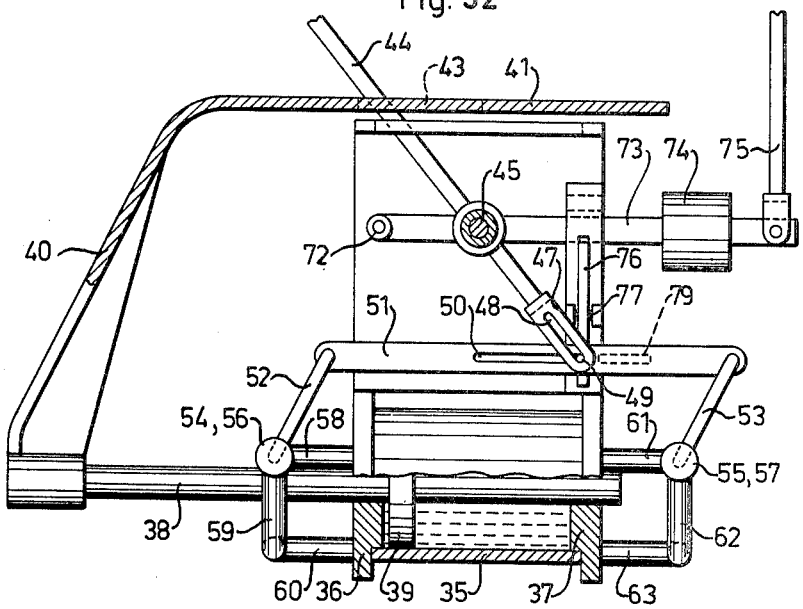
Figure 33:
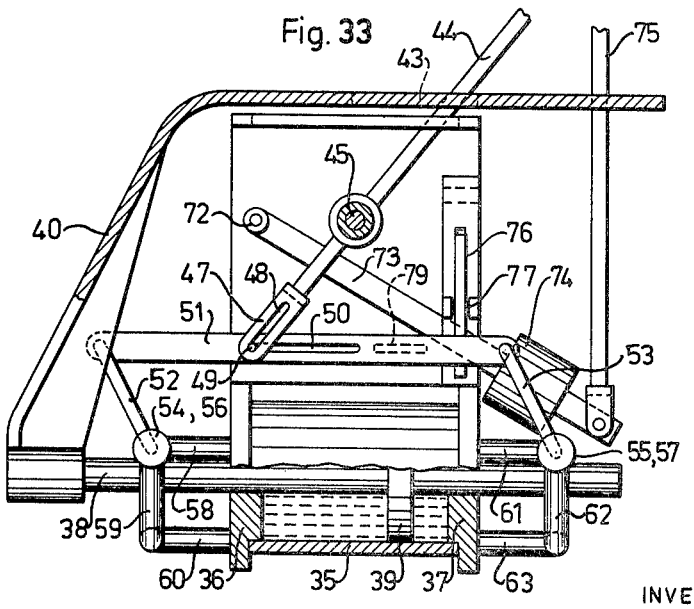
Figure 36:
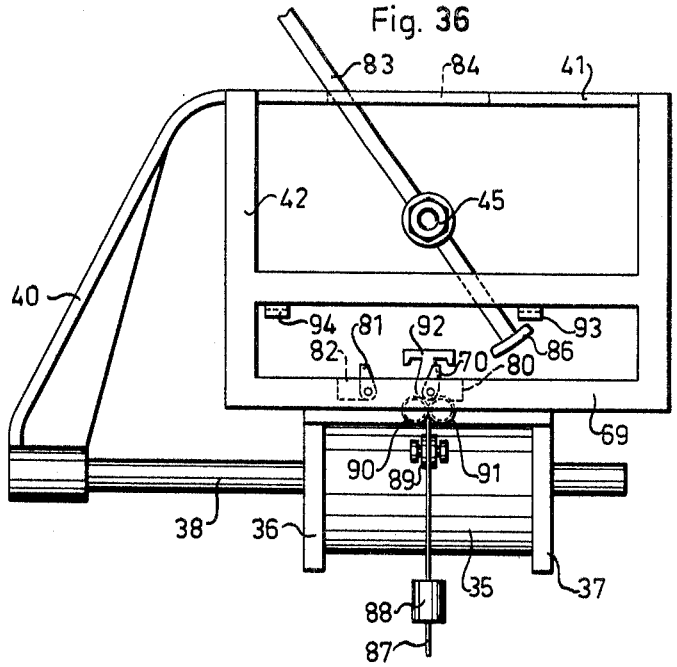
Figure 37:
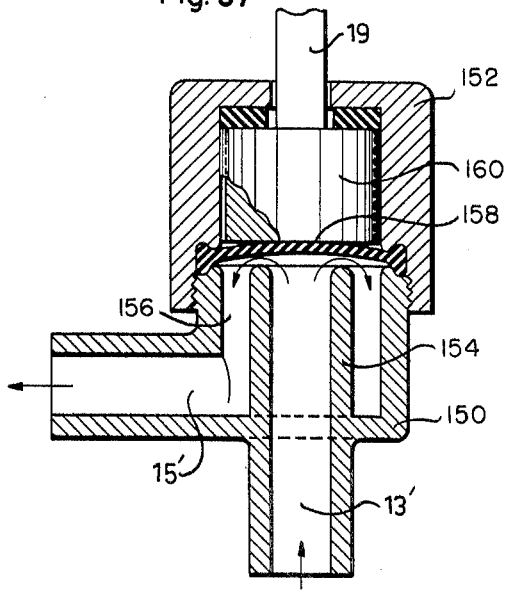
Figure 38:
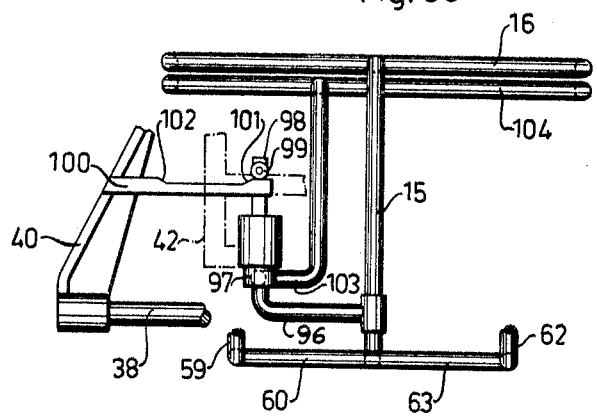
Figure 39:
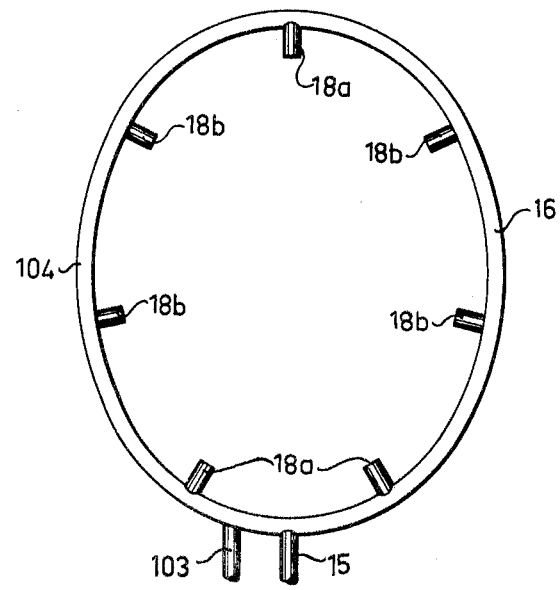
Figure 40:
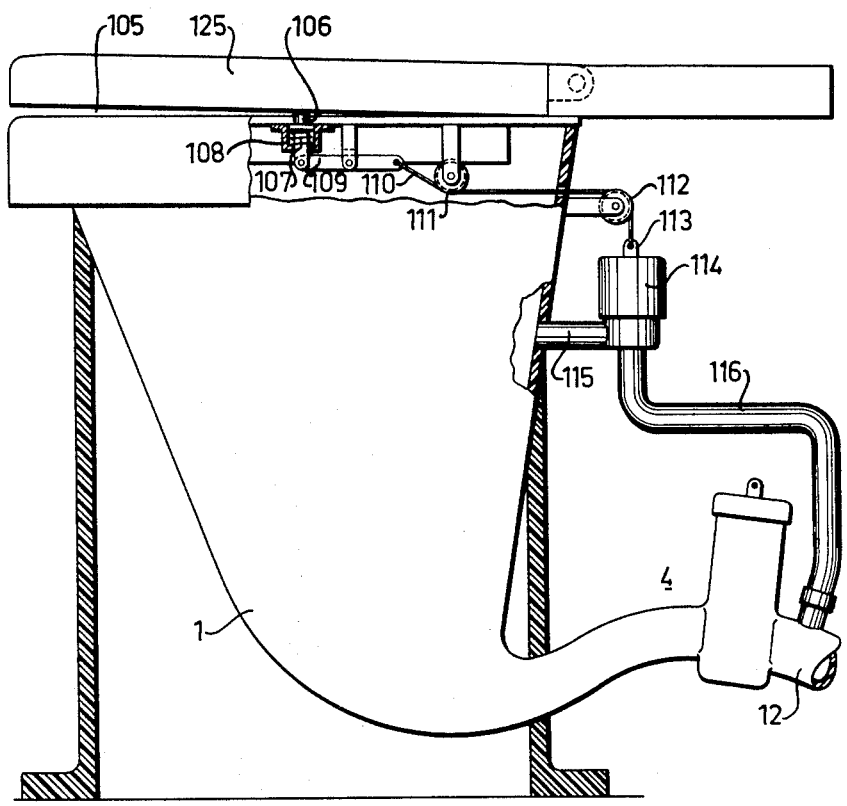
Figure 41:
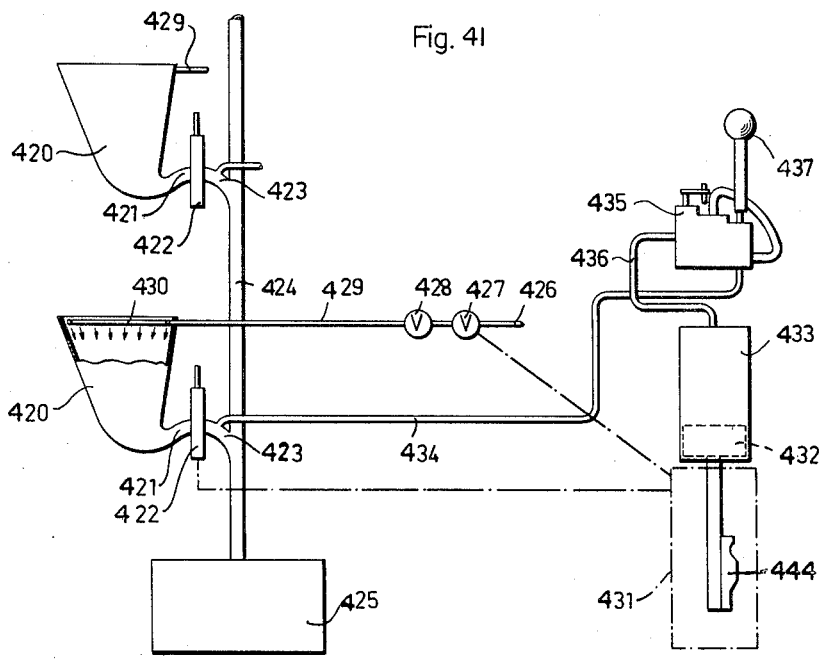
Figure 42:
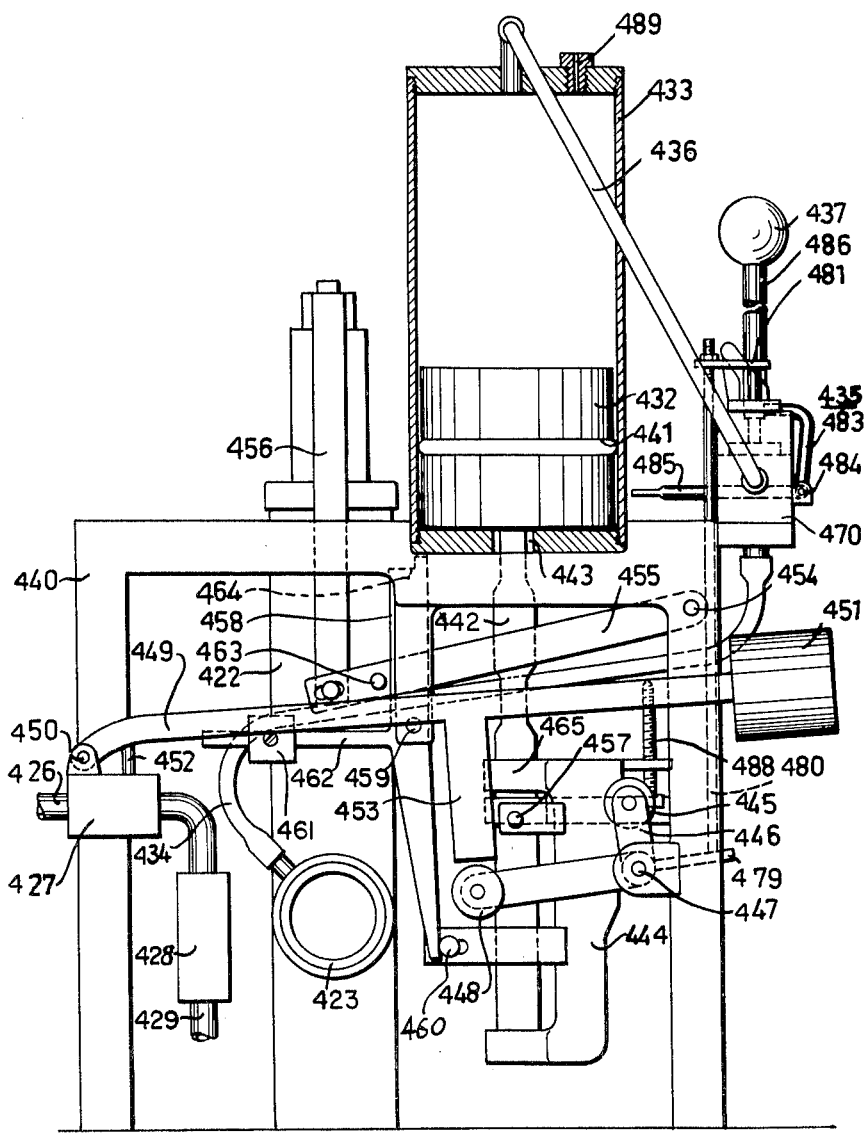
Figure 43:
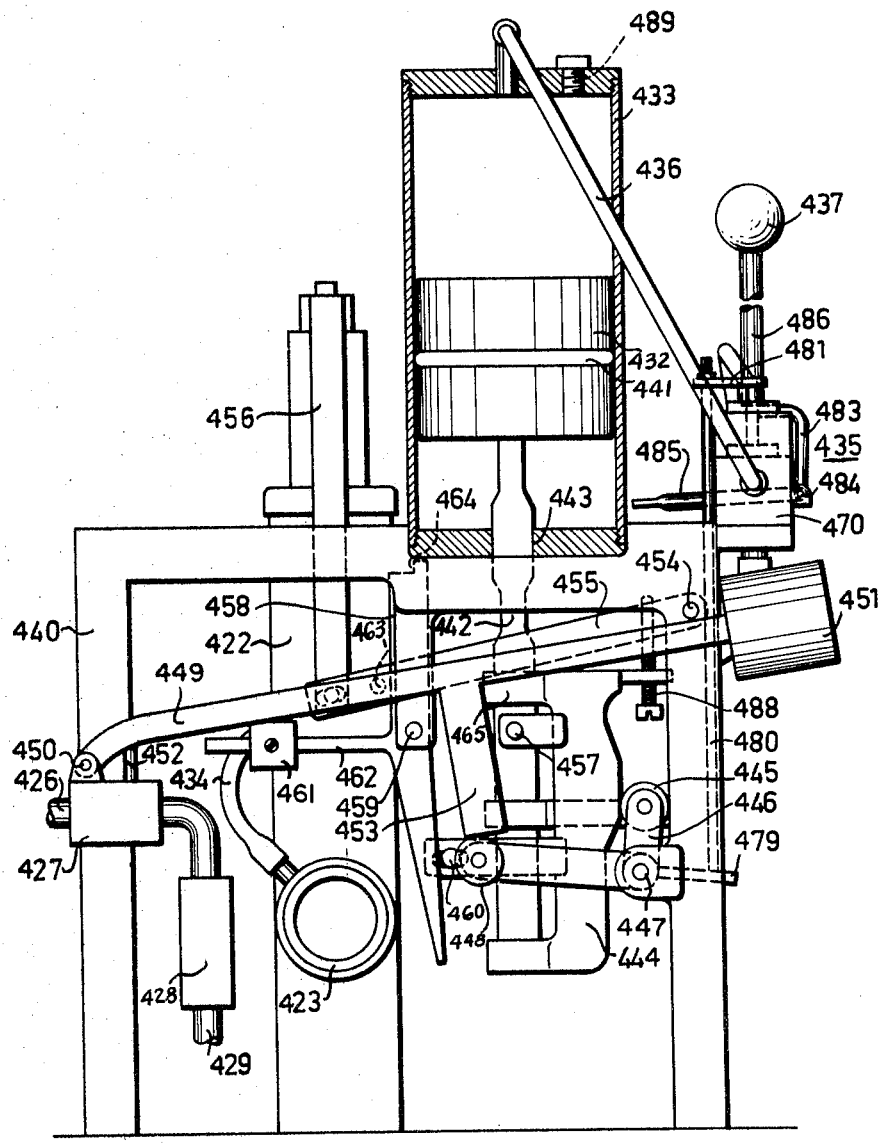
Figure 44:
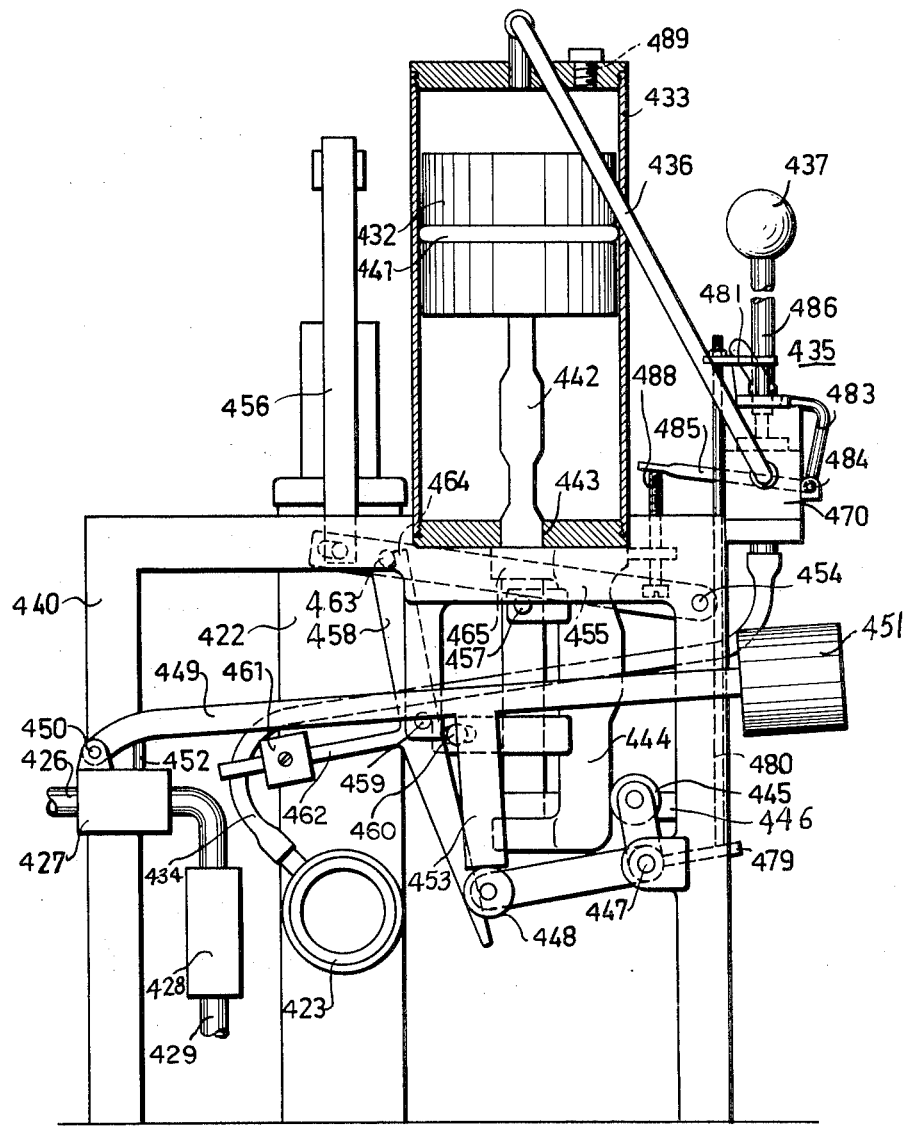
Figure 45:
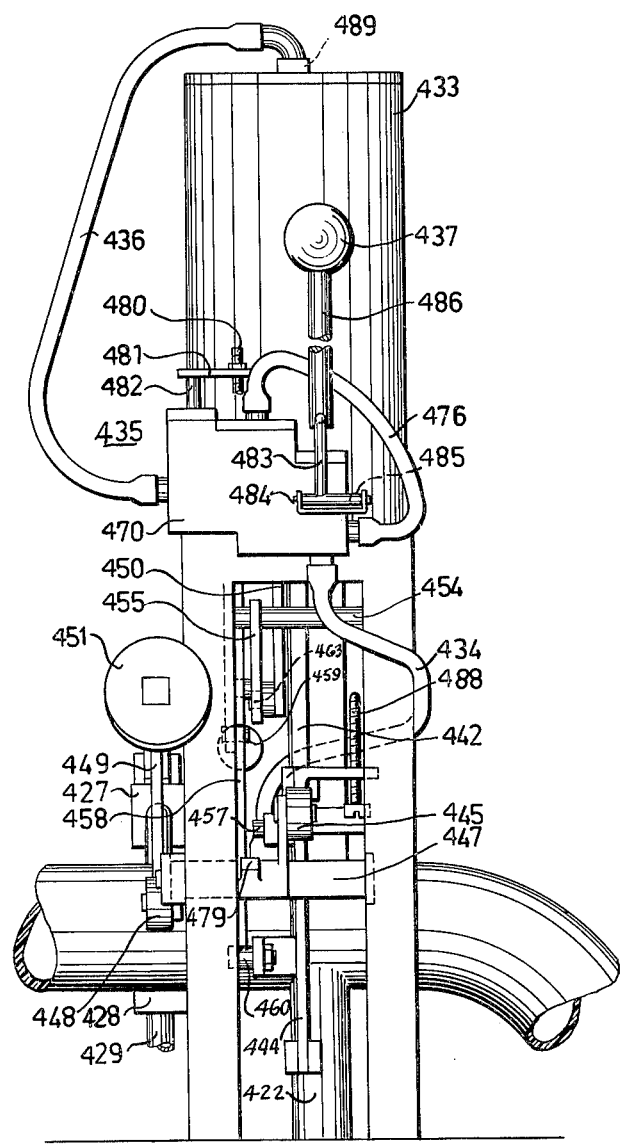
Figure 46:
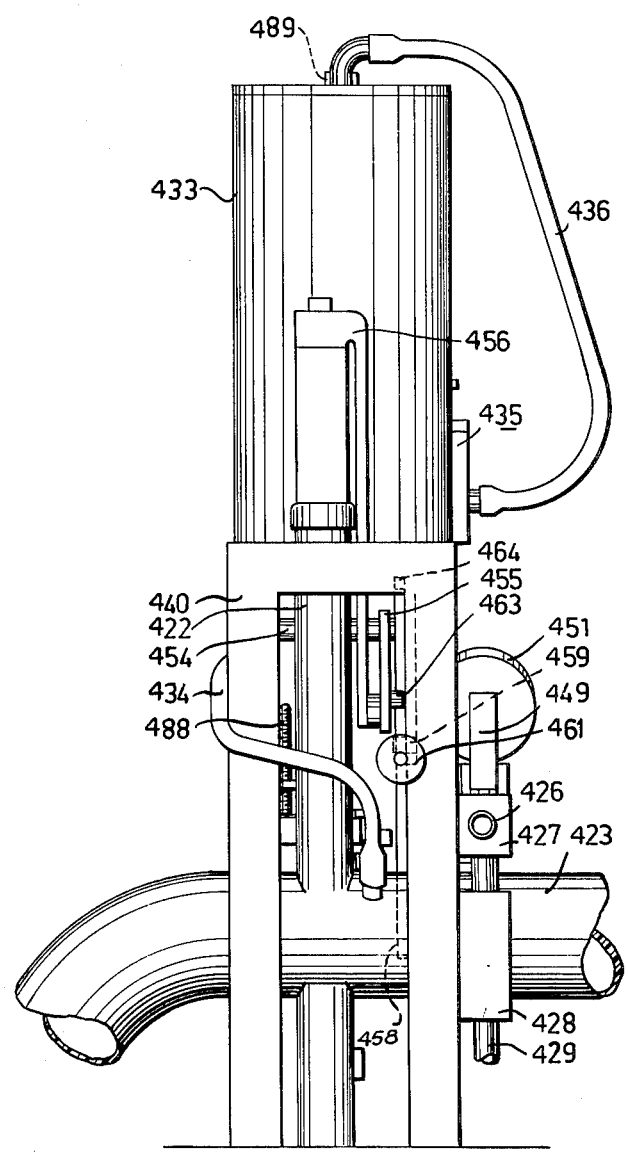
Figure 47:
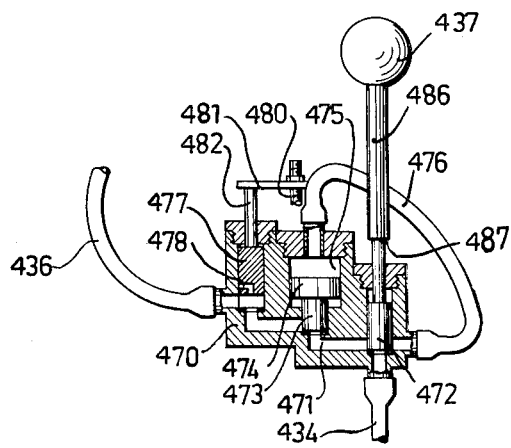
Figure 48:
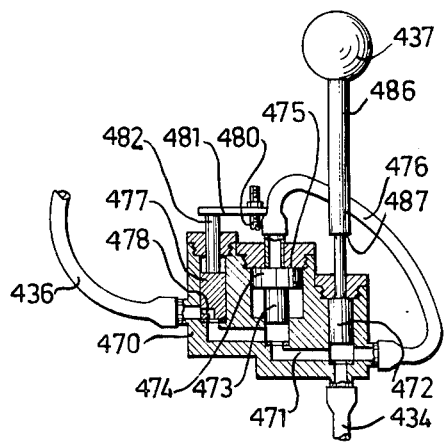
Figure 49:
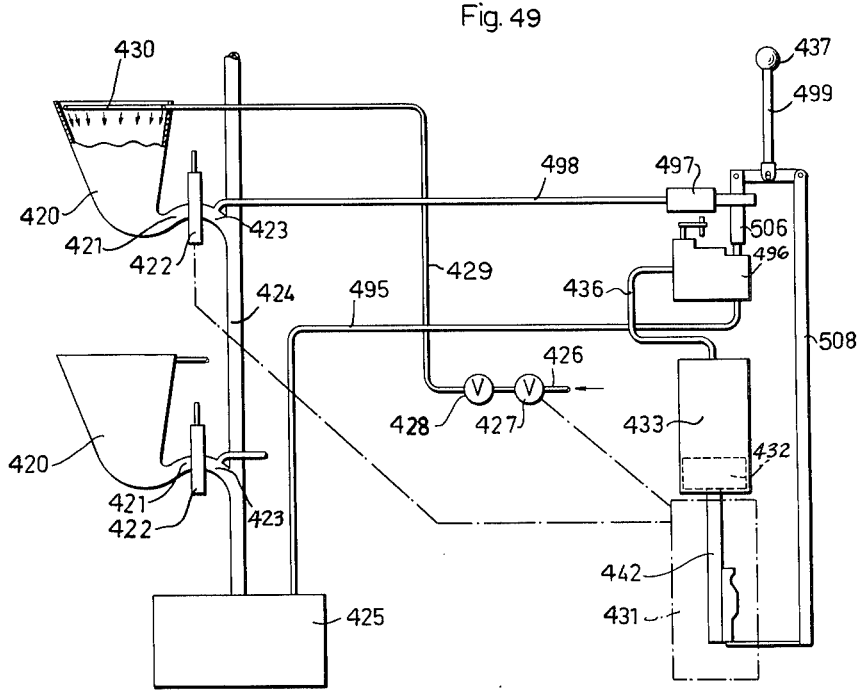
Figure 50:
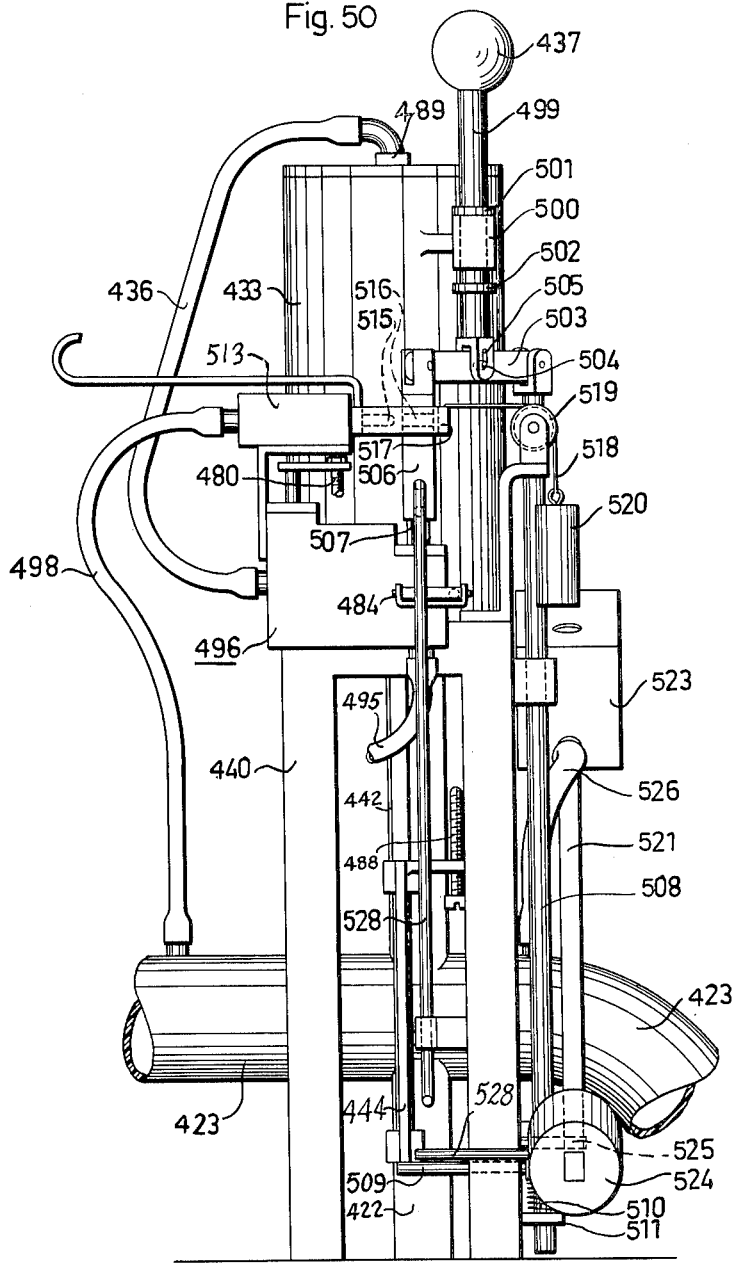
Figure 51:
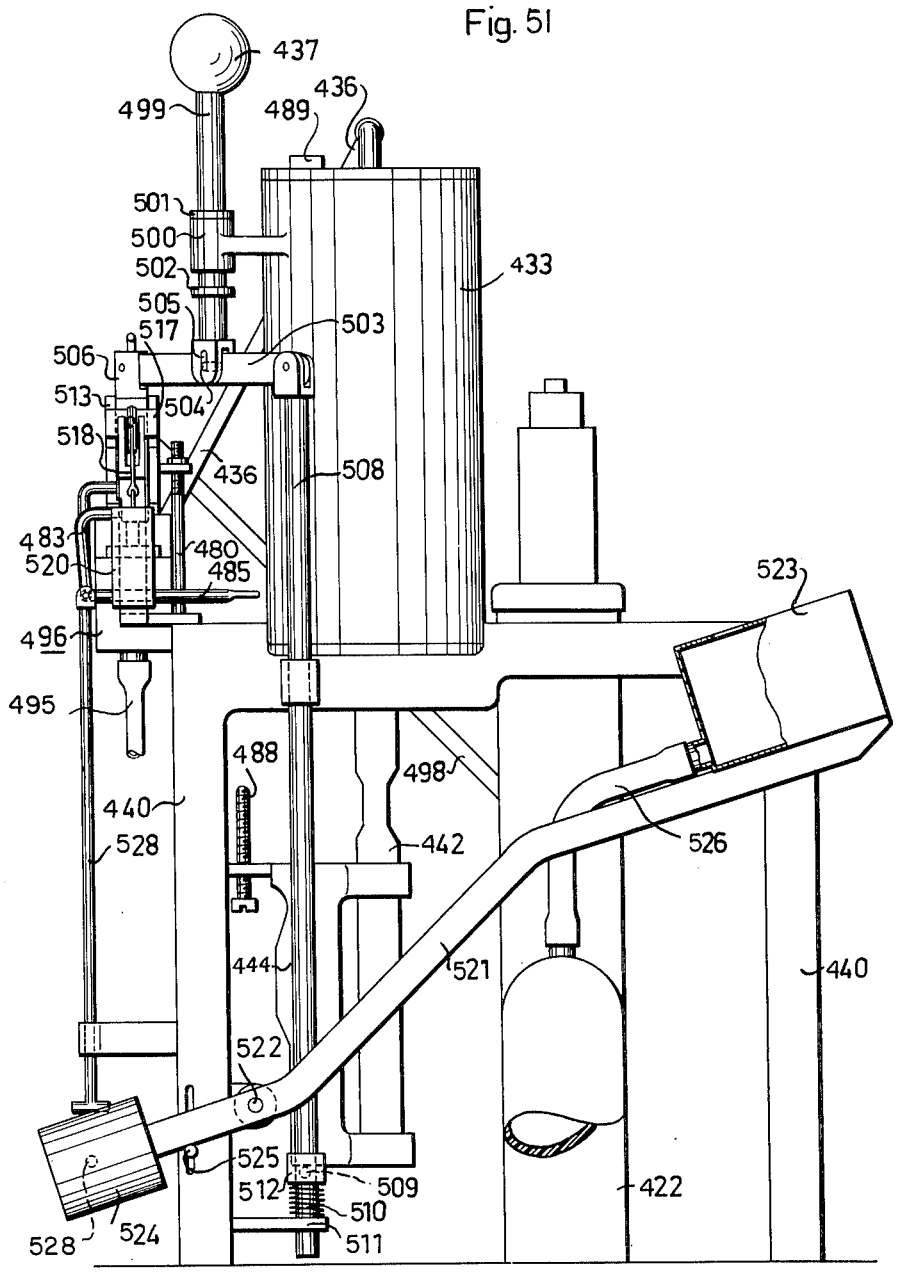
Figure 52:
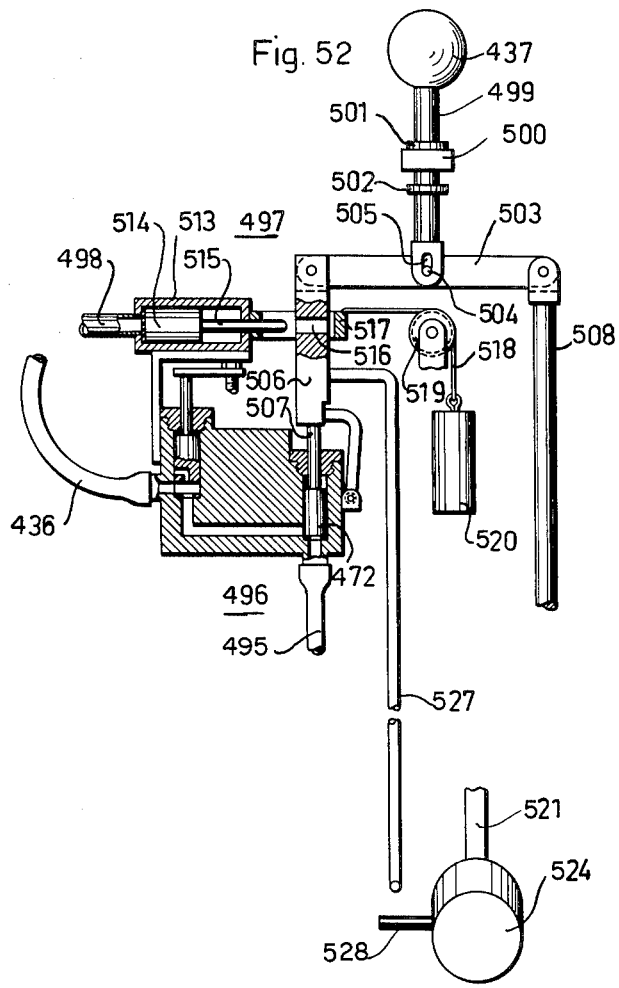
Figure 53:
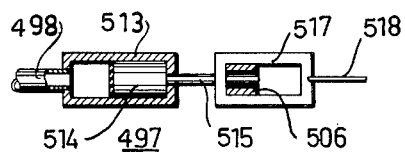

FIGURE 17, should be viewed with FIGURE 16 and illustrates a second building situated at a considerably lower level than the building in FIGURE 16 and having bowls and conduits connected to the system illustrated in FIGURE 16;

FIGURE 18 is a detail cross section taken on line 18—18 in FIGURE 17, and shows one form of laying the conduit in the ground;

FIGURE 19 illustrates a special pocket arrangement which is convenient for use in vertical pipes;

FIGURE 20 is a diagrammatic plan view of a portion of a large system as would be utilized in an urban development or similar multiple unit application;

FIGURE 21 is a longitudinal vertical section of the system shown in FIGURE 20;

FIGURE 22 is a plan view of a well which surrounds a connecting junction of several conduits;

FIGURE 23 is a vertical section through the well of FIGURE 22;

FIGURE 24 a detail section of a flapper valve seen in FIGURES 22 and 23;

FIGURE 25 is a modification of a connecting box;

FIGURE 26 is a vertical section through an electrically controlled mechanism for a water closet bowl with an outlet connection to a conduit of the conveyor system according to the invention;

FIGURE 27 is an electrical circuit diagram for the mechanism of FIGURE 26;

FIGURE 28 shows a modified form of a hydraulically powered water closet bowl emptying mechanism which is mechanically controlled through an automatic cycle of operation, the vertical section being taken on line 28—28 in FIGURE 30;

FIGURES 29–32 and 34 are sections and views taken respectively on lines 29—29, 30—30, 31—31, 32—32 and 34—34 in FIGURE 28, illustrating different components and their relationships in the mechanical control system;

FIGURE 33 shows the components in positions other than those in FIGURE 32, and FIGURES 35 and 36 show the parts in positions other than those in FIGURE 34;

FIGURE 37 is a detail section through a valve for controlling inlet water to the bowl;

FIGURE 38 shows a modified arrangement of the water flushing mechanism, depicted in a manner similar to that of FIGURE 29;

FIGURE 39 shows a diagrammatic plan view of the arrangement of FIGURE 30 but with the seat proper removed from the bowl;

FIGURE 40 shows the water closet seat associated with an auxiliary evacuating device;

FIGURE 41 illustrates diagrammatically a further conveying system embodiment in accord with the present invention using a pneumatically powered automatic bowl control mechanism;

FIGURES 42, 43 and 44 are front elevations of the operating mechanism proper of FIGURE 41, and its associated pneumatic power drive unit or motor, the three figures respectively showing the mechanism in three different positions;

FIGURE 45 shows the mechanism in side elevation, as seen from the right in FIGURES 42 to 44; and FIGURE 46 is a similar view of the same mechanism as seen from the left;

FIGURES 47 and 48 show sectional elevations of a valve device for controlling the pneumatic power unit;

FIGURE 49 diagrammatically illustrates a second embodiment of a pneumatically controlled conveyor system according to the invention;

FIGURES 50 and 51 show, in two side elevations at right angles to each other, the modified valve device for controlling the power drive unit of the operating mechanism in the system of FIGURE 49, as well as the power drive unit and means for automatically initiating the operation of the latter under certain conditions; and FIGURES 52 and 53 illustrate certain structural details.

In conventional water closet disposal systems, water is used as the transporting medium but in spite of the large quantities of water used, it does not and is not intended to entirely fill out the cross section of the waste pipes employed. Instead, the waste matter is washed along the pipes. In underground sewer pipes, where the water flows comparatively slowly through almost horizontal pipe sections, this movement of waste by washing action is aided by the flowing of large quantities of other waste water added from other sources.

In contrast, in systems according to the present invention, as will be described in detail, a relatively small quantity of water with or without waste is deliberately formed as a small piston-like liquid plug vehicle which entirely fills the cross section of intentionally small cross section conduits (pipes) and is sucked for a considerable distance at a high speed by air pressure differential, through the pipe thereby transporting solid waste. In other words, according to this invention, water is used as a vehicle for the wastes such as excrements, the displacement of the vehicle in self sealed reaction with the conduit or pipe walls, through the pipes from the conveyor inlet, e.g., a closet bowl, to the evacuated receiver, being effected by the force of air pressure which, upon each successive emptying operation, drives each liquid plug or vehicle of low mass in the system between the points of entry and discharge at high speed for a considerable distance through the intermediate conveying piping or conduit.

The quantity of water required is determined, in the first instance, by its use as a vehicle for the excrements or waste material to the collecting tank. When used for sewage disposal in a water closet system, the water quantity must be sufficient to cleanse the inner sides of the closet bowl by a flushing action. The water quantity is matched to the general arrangement and dimensions of the pipes, especially to their inner diameter, for the purpose of creating favorable conditions for the formation, maintenance, recombination and transport of the liquid plugs therein. Accordingly, it is important to the operation of the overall system that at each emptying operation the closet or conveyor feed inlet device delivers to the pipe a water quantity which is adjusted to a predetermined value, preferably accomplished by an automatic valve operator mechanism. The primary grounds for the need of predetermined water quantity are first, the liquid plug should have a certain minimum length with respect to its diameter to maintain its piston plug nature in sealed relationship to the conduit walls over a reasonable distance of travel and, second, that the plug length should not be so great that the acceleration of the plug due to its mass becomes insufficient to move the plug an appreciable distance. Above all, under no conditions should the plug length exceed the difference, expressed in terms of the height of a water column, between the atmospheric pressure and the pressure in the receiving vessel. Tests have shown that one liter of water or less, for example, is sufficient for each emptying of an adequate water closet bowl. Under the foregoing preferred conditions, the quantity of water mixed with the excrements in the receiving vessel is a small fraction of the amounts of water mixed with water closet waste in ordinary sewer systems.

The method and apparatus of the present invention, in actual practice, has been constructed as single and multiple unit water closet bowl emptying and removal systems but, as will be clearly apparent, can be utilized in other applications for conveying of materials in liquid plug vehicles.

In practice in a water closet system, the air pressure differential is created by providing a closed receiving vessel, in which a substantial vacuum is constantly maintained, and by providing adjacent each water closet bowl, in each pipe leading from a closet bowl to the container, a normally closed valve which is rapidly opened and kept open for a predetermined time when it is desired to empty the closet bowl, the liquid plug formed in the pipe upon opening of the valve being thus sucked through the pipe in a coherent state a considerable distance towards the collecting receiver with substantially reduced water consumption as compared to conventional water closet system water use.

As stated hereinbefore, the conveyor pipes provided in the waste disposal system according to the invention are of small cross section to render possible the formation of a coherent liquid plug of sufficient length as compared with the inner diameter of the pipe. Using a small quantity of water per plug, of the order of one to two liters, the inside diameter of the pipe should generally not exceed two (2) inches. To enable passage through the pipes of such solid matter as is ordinarily dumped into a closet bowl, the inside diameter of the pipe must not be too small, generally not smaller than ¾ inch. Thus, a preferred range of conveyor pipe inside diameters for water closet sewage disposal is of the order of from ¾ inch to two inches.

Another important condition for the maintenance, in a coherent state, of a liquid plug and its transport along a considerable length of the pipe is that the pipe must not abruptly change its cross sectional area. Ideal conditions are obtained if the pipe has substantially the same diameter all the way from the closet bowl to the evacuated receiving vessel. Accordingly, in case two or more water closet bowls are connected via branch pipes to a common pipe which leads to the evacuated collecting container, the diameter of the common pipe should preferably be the same as that of each branch pipe although, as will be later discussed, a slight increase in diameter can be accommodated.

So long as the liquid vehicle and the conveyed material are kept together in the form of a coherent plug, a minimum quantity of air is required for effecting the transportation of the liquid and material plug in a piston-like manner along the pipe. The effectiveness of the transportation of such a vehicle plug has been found to depend to a great extent on the diameter of the pipe, as already indicated.

A characteristic and extremely advantageous feature of this pneumatic conveying system is that since the vehicle transport is effected by air pressure and this is independent of a slope from the water closets to the collecting receiver, such transport may be effected through pipes which wholly or partly extend vertically or angularly uphill towards the receiving vessel. This involves two important and most unique advantages. First, the water closets may be located on a lower level than the receiving vessel which in many cases render possible the exploitation for house-building purposes of such areas in which conventional sewer systems cannot work except with the aid of expensive auxiliary apparatus. Second, insofar as is practical, the conveyor pipes can be allowed to follow the undulations of the ground surface whereby the costs for burying the pipes will be greatly reduced. Systems operating in accordance with this invention have already been placed into use where the distance from the evacuated collecting receiver to the most remote water closet is approximately 1600 feet and where the connecting pipes are located at a constant depth below the undulated ground surface.

The conveyor pipes can be made of any satisfactory material. However, pipes made of plastic material yield a number of substantial advantages chiefly relating to the function of the system and economy for its installation. The smooth inner wall surface, usually inherent in a plastic tube, results in a very low resistance against the passage of the liquid plugs therethrough and such an advantage is further enhanced by the fact, especially as far as concerns the portion of the system located outside the building, i.e., between them and the place where the collecting receiver is installed, the use of plastic material tubes makes it possible to reduce the number of joints to a fraction of that necessary when conventional cast iron pipes are used and directional transitions can be more readily gradually made without abrupt undesirable flow disturbances. It is clearly apparent that the last-mentioned feature also results in a corresponding reduction of the required man-hours necessary for installing a given conduit length. Also warranting particular consideration are the advantages attained in the portions of the system located inside the buildings where the flexibility of the plastic pipe also substantially reduces installation time and simplifies the work in that the number of separate pipe elbow connections may be reduced because the pipe itself may be bent to accommodate it to the local installation patterns. Finally, the small diameter of the plastic tube (¾" to 2") as compared with that of conventional cast iron pipes (5" to 6" in residential homes) as well as that most unique and characteristic feature of specific advantage to the present inventive system, that the inner diameter of the pipes is generally constant right from the closet bowls to the more or less distant receivers, offer valuable standardization advantages contributing to the low pipe installation costs. It will be obvious to those in the construction field that, irrespective of the savings referred to above, the price of a plastic tube is considerably lower than that of a corresponding cast iron pipe.

As a matter of fact, it has been found that the savings, above accounted for by utilizing plastic tubing, more than outweigh the costs for the separate normal sewer system for waste water from bathtubs, sinks, etc., plus the costs for receiving vessels, vacuum generating apparatus and other extra equipment necessary in a complete pneumatic conveyor installation so that the net economic result is definitely positive in respect of both the installation and operation costs. In addition, there will be considerable savings for the community, in that sewage purification plants in some cases may be dispensed with entirely and, if required, may be made much simpler and less expensive, since the sewage to be purified no longer would contain the most dangerous impurities, viz, the excrements emanating from the water closets.

It has also been found that the high speed passage of the liquid vehicle and material plug through the conveyor pipes results in substantially complete disintegration of the originally more or less solid excrements so that when the vehicle plugs arrive at the receiving vessel the excrements have formed an emulsion with the water. Such disintegration appears to result from the turbulent internal currents set up within the plugs as they travel through the pipes. The bacteria present in the solid wastes are therefore more easily rendered innocuous by virtue of the solids being emulsified.

When the receiving vessel is situated fairly near the water closet bowl, the plug formed in the waste pipe on opening of the outlet valve will be projected into the receiving vessel during the emptying operation. On the other hand, in the case of longer distances between the bowl and the receiving vessel, the plugs will gradually lose their vehicle body until after having been projected a considerable distance through the pipes they no longer have the capability of maintaining a sealed plug relationship with the conduits. This is due, inter alia, to boundary layer friction causing the plugs to leave behind them a film of liquid adhering to the pipe walls and gradually reducing plug length to a point where they become disintegrated and transformed to a spray which is carried by the air current a further distance through the pipe. The disintegrated plug fragments and boundary layer film remains will gravitate to the bottom of the waste pipe and flow slowly along the pipe in the direction of its slope.

In order that the portions of disintegrated water-excrement mixture plugs be positively advanced a further distance towards the receiving vessel, plug reforming pockets or liquid traps are provided at spaced intervals as integral sections of the conveyor pipe. Because of gravity flow these pockets collect the disintegrated plug fragments which successively fill such pockets and form new, or secondary, plugs. The secondary plugs remain in the pockets until a subsequent emptying operation when such secondary plugs are again subjected to a pressure differential and will be projected at high speed along the pipe towards the receiver vessel.

In general, the liquid fragments from one disintegrated plug do not suffice to form in the next pocket a new or secondary plug. Rather, the fragments combine with fragments already collected in the pocket to build up another plug. Thus, secondary plugs usually are built from fragments of several primary and secondary plugs. Moreover, in a fairly long conveyor pipe there may be provided other pockets in which tertiary plugs are built up from fragments of secondary plugs and possibly from old tertiary plugs etc.

Principally, pockets are provided whenever the conveyor pipes are of such length that the coherent plug shape will dissipate before reaching the receiver. Thus, the plug forming pockets may be provided in lines running in any direction, i.e., uphill, downhill, or on the level, although pockets could be avoided in downhill extents of conduits. In principle, the arrangement should be such that each part of the conveyor line is traversed at least now and then by a coherent plug which wipes off the pipe walls and prevents permanent deposition thereon of solid matter.

So long as the liquid plug is coherent, the pressure differential will force it forward at a high speed, whereas the fragments or remains of burst plugs or of liquid wiped off on the pipes and left behind are substantially moved only under the action of gravity at a rather slow speed, although they do receive a slight amount of conveying force from the flow of air.

Turning now to the drawing figures, the following description will proceed in a logical sequence to set forth in detail the various aspects of the present invention. A basic system utilizing the basic method will be initially described, followed by several more complex system embodiments and closing with specific descriptions of several embodiments of automatic bowl, or receptacle, control devices.

*Basic system and method*

In FIGURE 1, the water closet bowl 1 is of a type that will be more fully described hereinafter. Water from a controllable water supply and any excrements and/or other waste materials will be collected in the bowl and retained so long as a controllable valve is an outlet 3 from the bowl remains closed. The bowl outlet 3 communicates via a pipe generally designated 200 with a sub-atmospheric receiving vessel 201, the evacuation of vessel 201 being attained by an electrically operated evacuation pump 202 which, via the electric conductors 203, 204, is controlled by a pressure sensitive relay 205. The inlet side of pump 202 is connected to vessel 201 via the pipe 206 and its outlet side, via the pipe 207, to the atmosphere. Relay 205 is set so that it will induce the pump to operate when the pressure inside the vessel 201 has risen to an upper limit, such as 0.6 of atmospheric pressure, and causes the pump to stop when a sufficient vacuum is reestablished, for instance, corresponding to 0.4 of atmospheric pressure. Whenever the term "vacuum" is used hereinafter, it refers to a sub-atmospheric pressure as distinguished from a true vacuum. It is to be understood that other means of producing the sub-atmospheric pressure in vessel 201 could be used, one such means being disclosed and claimed in copending application Serial No. 816,131 filed May 27, 1959.

When the valve in bowl outlet 3 is quickly opened, the bowl contents which are under atmospheric pressure, will be subjected to a considerably sub-atmospheric pressure on the outlet side and the resultant pressure differential acting on the contents will force the contents in a unit mass through the bowl outlet 3 and into the pipe 200 shaped as a unit plug. The outlet 3 must remain open after passage of the contents from the bowl 1 into pipe 200 so that a considerable volume of air will flow through the bowl and its outlet 3 into the pipe 200 to provide continuing atmospheric pressure behind the plug. The valve in outlet 3 is then closed after a predetermined time.

As will be described in further detail hereinafter, any liquid remaining in the pipe 200 after one or more discharge procedures will, during a closure period of the valve in outlet 3, be collected in one or more pockets or traps 208 to 212 provided in pipe 200 as required by the size and nature of the system. The design and function of such pockets will also be more fully described hereinafter. When the outlet 3 is closed, each pocket will collect accumulation by drainage from an associated section of the pipe, thus in FIGURE 1, pocket 208 collects drainage from the section between outlet 3 and the pipe bend 213, the latter serving as a kind of water-parting or divide. Pocket 209 drains the section between the divides 213 and 214, pocket 210 draws the section between the divides 214 and 215, pocket 211 drains the section between the divides 215 and 216 and pocket 212 drains the section between the divides 216 and 217.

An intersecting aspect of the conveying system according to the present invention is that the conveying pipe line between the closet bowl 1 and the vessel 201 can be laid in different inclinations so that natural obstacles, such as an underground rock 218, can be readily avoided simply by making a bend in the pipe as shown at 216.

As has been described, the conduit or pipe is preferably made from a plastic of a type such as polyethylene, which is sufficiently stiff or rigid to resist the difference in pressure between the atmosphere and the pressure in the vessel 201 and also to resist deformation by ground pressures. It is of importance that the internal surface of the conveyor pipe, whatever material it is made from, be smooth to avoid adherence of solid particles to the wall. The smooth walls also provide a desirable reduction in friction between the moving liquid plug vehicle and the wall. The internal diameter of the pipe varies in actual practice between 1½ and 2½ inches. The best results are obtainable if the inside diameter does not exceed 2 inches or 51 mms., however minimum inside diameter may exceptionally be as small as 1⅓ inches or even down to ¾ inch. Pipes of this type, e.g., made of plastic or copper, may be delivered in considerable lengths, e.g., 300′ or 600′ whereby joints are avoided or at least considerably reduced in number.

Reference is made to FIGURES 2-11 in describing the operation of the aforedescribed pockets. FIGURES 2-11 illustrate successively occurring conditions in diagrammatic fashion. The discharge or conveying pipe 219 is here shown as having three divides 220, 221 and 222 and two intermediate pockets 223 and 224. The outlet 3 from the closet bowl 1 is controlled by a rapidly actuated reciprocating gate type of valve 4, the gate of which is raised by a mechanism when the content of the bowl is to be emptied and which is lowered after the lapse of a predetermined time so as to again close the outlet 3. The evacuated receiving vessel 225 contains air under substantially constant sub-atmospheric pressure of 7.11 lbs./ins. (0.5 kgs./cm.²).

Before the valve 4 opens a water accumulation is provided in the bottom of the bowl 1 amounting to, for instance, 50 in.³ (0.85 qt.). The inner diameter of the pipe 219 is in this case assumed to be 1.75 inches so that the water contents of the bowl correspond to a theoretical length of a coherent liquid body in the pipe of approximately 21 inches. For the sake of clarity the scale of the pipe diameter on the sketch is about five times larger than the axial or longitudinal scale, which corresponds to an actual spacing between adjacent ones of the points 3, 223 and 224 of about 13 feet. In practice these distances in most circumstances would be considerably longer which, however, is of no principle importance in the present description of the method of functional operation. On the whole, no exact relative dimensions of the pipeline should be derived from the drawings.

Assume in FIGURE 2 that valve 4 has just been opened and the contents from bowl 1 have entered pipe 219 as a plug 227 so that atmospheric pressure through bowl 1 is acting upon the left hand end surface 226 of the formed liquid plug 227 and the right hand end 228 of the plug is subjected directly to the reduced pressure condition existing in the container 225 and connected pipeline 219. As the resistance against the flow of air is rather insignificant at the velocities here concerned, for the moment disregarding friction in the liquid plug, this resultant difference in pressure acting on plug 227 may amount to about 7.11 lbs./in.² At a plug length of 21 inches this difference in pressure corresponds, in a horizontal pipe, to an accelerating force of $$\frac{7.11}{21 \times .0361} = 9.5$$

times the weight or gravity of the plug and, in a vertical pipe, 8.5 times this weight. A force of this order may be assumed to act practically during the entire time when the plug 227 is coherent, making a complete circumferential contact with the walls of the pipe 219. The plug thus acts as a piston. Of considerable importance is that, due to its small length, the plug 227 very quickly attains a considerable speed, such as 65 to 100 feet per second. However, because of boundary layer friction when proceeding through the pipe, the plug will lose mass, leaving a film of liquid 229 along the pipe wall. Also, gravity force acting transversely on the plug will tend to flatten it out. Due to the fact that the outer circumferential zone of the plug liquid is subject to a higher resistance against movement along the pipe walls than is the center zone of liquid of the plug, the trailing end surface 226 of a plug will become concave and its leading end surface 228 convex.

In FIGURE 3, the appearance of the plug is shown when it has traversed the rising section of the pipe between points 3 and 220. The plug at this stage of travel has left considerable liquid quantities 229 and 230 on the pipe walls so that the liquid mass of the plug proper is now considerably reduced, although the plug is still coherent. As the plug continues its travel, it will become more and more deformed whereby the sealing contact surface between the plug and the pipe wall is more and more reduced.

In FIGURE 4 the plug 227 is no longer a coherent sealed plug mass, having lost its contact with the upper pipe wall which negates its effect as a piston. The atmospheric air behind the plug, due to the pressure differential, now rushes past the remaining liquid, tearing it into pieces and forming liquid drops and foam 231, which are quickly carried forward through the pipe in the air stream. So long as the passage of air continues, many of the smaller particles will, at this stage, be subject to pure pneumatic conveying action.

In FIGURE 5, the air carried particles and foam have been conveyed further and the walls of the pipe 219 have been wetted by liquid all the way from point 3 to point 224, and very likely all the way to the evacuated receiver.

In FIGURE 6, the bowl outlet valve 4 has been closed, the inflow of atmospheric air has stopped, airflow in the conveyor pipe has stopped and new liquid introduced into the bowl 1. The liquid remaining in the conveyor pipe 219 flows under gravity influence in opposite directions towards the bottoms of the depressions, e.g., at the downstream side of valve 4 and at points 223 and 224, where they form smaller or larger accumulations of liquid. The largest accumulation of liquid will, at this stage, be at point 223 where the left hand level 232 of the accumulation will only just contact the upper side 233 of the pipe bend whereas the right hand level 234 will be somewhat higher. The sub-pressure of air in the container 225 is a condition causing all air having a higher pressure than that prevailing in the container 225 (approximately 0.5 kilogram per cm.²) to have a tendency to move towards this container. If then the pressure of air cushion 237 entrapped between valve 4 and level 232 of the accumulation at point 223 is considerably higher than that, air bubbles 235 will be sucked through the liquid 236 at point 223 until the pressure of the entrapped air cushion 237 will be only so much higher than the pressure in the container 225 as corresponds to the height of the liquid column 238. The accumulated liquid 236 thus forms a new plug which seals the pipe, for convenience being called a secondary plug, and which results, inter alia, in that the discharge conduit 219 is divided by a liquid trap into two sections, the one from valve 4 to point 223 and the second from point 223 to the container 225. The air pressure of the different sections is stepwise only slightly different. The function of the air cushion 237 will be explained below.

Referring to FIGURE 7 when the valve 4 is opened for the second time to initiate the next subsequent emptying operation, a new liquid mass will be ejected from the bowl outlet 3 as a coherent plug 239 into the discharge pipe due to the action of atmospheric pressure on the external surface 240. The inner surface 241 is in this case being initially subjected to the low pressure of the air cushion 237 which is equal to the sub-atmospheric pressure in the container 225 plus the slight pressure increase caused by the gravity of the column 238 (see FIGURE 6) of the secondary plug 236. The secondary plug 236 is initially subjected, on its left hand end 242, to the same pressure. However, as the air cushion 237 entrapped between the plugs 236 and 239 is gradually compressed during the advancement of the plug 239 the air pressure in the cushion 237 will increase correspondingly. The secondary plug 236 will then be increasingly accelerated, although at a lower rate than was the case when the plug 227 was in its position according to FIGURE 2. Also the acceleration of plug 239 will gradually become lower than the rate originally valid because of counter pressure built up in the air cushion 237 because of the compression thereof.

In FIGURE 8 the plug 239 no longer has contact with the upper pipe wall and has left behind it liquid quantities 243 on the pipe wall and produced drops and foam 244 which are carried forward through the pipe. The plug 236 has now moved but through a somewhat shorter distance than the liquid from the plug 239. From that moment when plug 239 loses its contact with the pipe wall, atmospheric air will pass by rapidly and, if secondary plug 236 is still intact, it will be subjected to an increased driving pressure so that its acceleration will increase considerably. During this sequence of plug movement, the small water accumulation at point 224 remains rather intact as only a current of low pressured air is passing by.

In FIGURE 9 the valve 4 has been closed again and the inflow of atmospheric air has ceased. The water particles remaining in the conveying pipe drains, due to the inclinations of the pipe, to the "pockets" at 223 and 224 where it accumulates and forms a new secondary plug 245 and a tertiary plug 246. The container 225 tends to draw all air which has a higher pressure than that prevailing therein, such as 0.5 kg./cm.², and the newly formed plugs 245 and 246 will thus be set as indicated on the sketch having their left hand levels 247 and 249, respectively, at a lower height than their right hand levels 248 and 250. Air bubbles will flow through the water accumulations as indicated at 251 and 252 whereby the system will be gradually balanced in such a way that the pressure of the air cushion 259 entrapped between levels 248 and 249 will be the same as that in the container 225 plus a value corresponding to the liquid column 253 and that of the air cushion 258 entrapped between valve 4 and level 247 equal to the pressure in the container 225 increased with a value corresponding to the sum of the liquid columns 253 and 254.

When, according to FIGURE 10, the valve 4 has been opened for the third time, the atmospheric air will drive a primary plug 255, the air cushion 258, a secondary plug 256, the air cushion 259 and a tertiary plug 257 towards the container 225. This time the plug 255 is not influenced by a pressure difference being as high as that indicated in FIGURE 2 and not even by the pressure difference acting according to FIGURE 7. Plug 255 has, however, still acquired an initially considerable acceleration which will be reduced gradually. The plug 256 is accelerated only gradually as the air cushion 258 is compressed by the movement of the plug 255 and the plug 257 will be accelerated still later and at a low rate, i.e. when the plug 256 has been moved so far that the air cushion 259 has had time to be noticeably compressed, however, when plug 255 loses contact, plug 256 will surge into a higher acceleration and similarly when plug 256 loses contact with the pipe wall, the tertiary plug will surge into higher acceleration.

Figure 11:
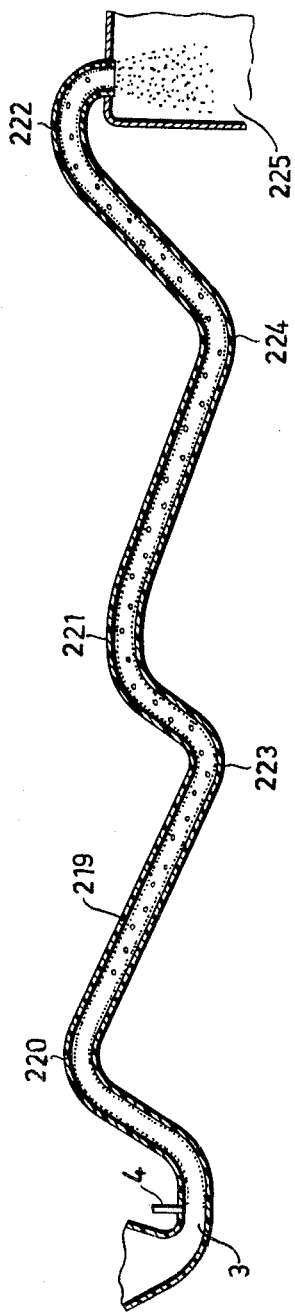

In the position of FIGURE 11, all the plugs have lost sealing contact with the conduit wall and only liquid particles and foam are driven forward by passage of atmospheric air through the discharge conduit 219 during a moment of time until the valve 4 is again closed. As soon as that has been done, the conditions within the conveying pipe 219 are returned to those prevailing according to FIGURE 9.

The system depicted has now reached its steady state which is characterized in that, as long as the valve 4 is closed, the discharge conduit is divided into air filled sections or air cushions separated from one another by one or more liquid plugs, the air pressure in said cushions being stepwise increased from the container 225 to the valve 4. When the valve 4 is opened, at first the primary plug formed by the content of the closed bowl will attain a high speed. Only thereafter the secondary plug will be started and only when this latter has moved a certain distance the tertiary plug will start, et certera.

This means that if the discharge conduit has any noticeable length, the primary plug will never reach the container 225 in a coherent state before it loses coherency and falls into pieces and quite often the secondary plug, as such, will not reach the container 225. Also, it may be that it is only the tertiary plug or a portion thereof or even a plug of a still higher order or at least a portion thereof which will actually reach the container 225 if the conduit is of substantial length.

In each case it is evident that so long as a liquid plug fills out the pipe by making complete circumferential contact with the pipe walls, it constitutes a piston-like vehicle which is driven through the pipe with a large force at least during a period of the emptying procedure so long as a corresponding pressure difference is acting between both end surfaces of the plug.

On the other hand, it should be made clear that the plug forming pockets at points 223 and 224 must be separated by a sufficient length of pipe which is air filled to avoid a condition where plug length will be too large for the air cushion and the acceleration too low, particularly if at the same time the pipe has an uphill extension so that gravity counteracts the movement. Because of the fact that the air pressure acts per unit of surface of the cross section of the liquid plug it will be exclusively (1) the length of the liquid plug, (2) the value of the difference in specific air pressure, (3) the value of frictional forces resisting the movement of the plug and (4) the direction of gravity which will be decisive for the rate of acceleration. If, for instance, the entire discharge pipe were permitted to become filled with liquid, a system in accord with the present invention can no longer operate satisfactorily. It is further evident from simple principles of physics that the liquid plug will lose coherency as a plug earlier, the larger the pipe diameter. Clearly thus, it is quite important that the pipe diameter should not be too large. When the plug has lost its coherency as a sealing plug and no longer makes contact with the pipe wall along its entire circumference, the piston-like driving action will no longer exist so that the differential pressure transport force will be so much less efficient as to decrease to substantially nil.

In FIGURES 2 to 11 the bottom of the depressions form pockets 223 and 224 and the liquid stored therein forms liquid plugs. If it is assumed that the volume V of a pocket is defined as being that minimum volume of liquid that is necessary to provide a liquid seal in the pipe it is apparent that the volumes V of the pockets at 223 and 224 are only a small fraction of the pipe volume to be drained by each pocket between two adjacent divides, such as at 220 and 221 and 222 respectively. This has a connection with the inclinations of the pipe sections adjacent the pocket in question. In FIGURES 2 to 11 these inclinations vary between about 15° and 60° to the horizontal line. However, if the inclinations are small, such as 5° as shown in FIGURE 12, or still smaller, for instance, 1° or about 1 to 60 or 1 to 100, the pocket volume will be considerable, because the water level 260 making contact at 261 with the upper wall at the lowest point thereof, will extend rather far to each side of the contact point 261. The liquid column will, in case of a pressure difference between the two sides, extend a considerable distance to the low pressure side.

Also in FIGURE 1 the inclinations of the pipe are rather small and even a horizontal extension is shown but the pockets 208 to 212 have been provided with a specific shape which will now be discussed.

In FIGURE 13 there is shown a specifically shaped pocket having S-bends 262, 263 and constituting a semi-circular pocket 264 with a relatively small radius of curvature. If the pocket volume of FIGURE 12 is designated $V_1$ and that of FIGURE 13 designated $V_3$, it is in fact as drawn $V_3 = 19\%$ of $V_1$.

It is desired to make the pocket volume somewhat larger, there may be provided a horizontal section 265 according to FIGURE 14. In this case as drawn the volume $V_2$ will be 28% of the volume $V_1$.

In FIGURE 15, the pocket has vertical extensions 305 and 306 whereby the depth of the pocket can be increased as desired. This is of importance in long, nearly horizontal sections of the discharge pipe. In this way it is assured that a moderate rise of liquid in the outgoing leg 306 will not cause an overflow of liquid into the adjacent nearly horizontal pipe 307. Further, this moderate rise will immediately produce a liquid column counteracting the pressure differential producing the rise.

Particularly in the case of long nearly horizontal sections as in FIGURE 1, it will be advisable to provide divides or water-partings 213 to 217 with a spacing of some 65 to 100 feet. Between each pair of adjacent divides there are provided pockets 208 to 212 respectively. These pockets are then shaped to constitute a small pocket volume, such as of the order of one liter (1.06 qt.–61 cu. in.) If the internal pipe diameter is 1.75 inches this means that the pocket volume will be only about 1:30 of the pipe volume between a pair of adjacent divides being spaced at say 85 feet.

*System with multiple water closets*

FIGURE 16 shows a vertical section through a building having a water closet installation which includes several water closet bowls 1, each having its individual discharge valve 4. The bowls 1 and valves 4 on the various floor levels in FIGURES 16 and 17 will be identified by letter suffixes, e.g., bowls 1a, 1b, 1c, 1d and 1e and valves 4a, 4b, 4c, 4d and 4e. Individual pipe lines 117 and 118 are passed through the various floorings down to a receiver 120 disposed in the cellar compartment of the building. As indicated in the drawing, several such pipe lines may be provided, each one of these pipe lines being connected to the outlet of a water closet bowl individual to the same. It is also possible to connect several bowl outlet branch pipes to a common conveyor main (shown in FIGURE 17) in which case, however, according to the specific system in FIGURE 17, the main (or common conduit) should be of an internal diameter not exceeding that of the branches. It is of material importance, that each water closet bowl has its associated individual outlet valve 4 connected to control the introduction of the bowl contents into the conveyor conduit main after passage through the respective discharge valves.

The receiver 120 is provided with an air evacuating pipe 122, an evacuating unit 121 and a ventilating pipe 123 which terminates above the roof of the building, for example. The evacuating unit operates automatically to continuously maintain a suitable sub-atmospheric value within the receiver 120. When the liquid plugs reach the receiver they will of course completely disintegrate from the coherent plug shape, due to the large cross section of the container, provided they have not already lost their coherent plug shape. The receiver 120 is provided with a drain pipe 124 near its bottom, the pipe normally being closed by a valve. When draining of the receiver is to be carried out, it is necessary, of course, to temporarily remove the vacuum pressure existing within the receiver 120, and possibly to replace the same by a positive pressure. Alternatively, the receiver could be made as a portable unit, removable and replaceable by another empty receiver, the various pneumatic conduits and evacuating pump lines being provided with quick disconnect fittings.

In FIGURE 16, some horizontally extending sections of the pipe lines 117 and 118 are shown, and it may happen, if these sections are comparatively long, that the plug vehicle formed by the flushing water may be extended in length to such an extent as to release from the internal wall surfaces of the pipes enabling air to flow past the plug whereby the latter will no longer be moved in a piston- or bullet-like manner along the pipe. The movement of the plug will then be retarded and may cease altogether. In such cases it will be necessary to provide a suitable number of pockets in the horizontal stretch, similar to those illustrated in FIGURE 1.

FIGURES 16 and 17 illustrate the possibility of several still more severe operating conditions in portions of an installed system, as well as certain measures which can be taken in accordance with the present invention in order to avoid the difficulties involved. Installed in a building having a plurality of stories below the ground level, are a plurality of water closet bowls 1 each having an outet control valve 4. Individual bowl outlet branches 129, 130 and 131 are connected to a common steep uphill conveying main 132 being of a diameter substantially the same, for example, as that of each bowl outlet branch. If the common conveyor main 132 is sufficiently narrow in relation to the volume of each liquid plug formed therein, the plug will be moved (literally sucked) verticaly upward a fairly considerable distance. However, in order to prevent loss of traversed distance by the loss of coherent plug shape causing the sealing engagement of the plug vehicle with the pipe wall surface to be released, one or more plug-forming or plug-restoring pockets 133, 135, 145 may be arranged in the uphill main depending upon the distance traversed. The types of pockets which are illustrated simply comprise one or more bends of the pipe in which a new plug can be formed afresh from the remains of a dispersed plug or plugs as has been described hereinbefore. The specific pocket 133 is a loop wherein the pipe 132 is curved only to the right. On the other hand, the pocket 145 is formed by bending the pipe 132 first to the right, then to the left and finally to the right again. The pocket type 145 is generally preferable because it may happen that in pocket type 133 centrifugal force of the rapidly moving plug will prevail over gravity so much that the liquid plug material is pressed against the radially outermost inner pipe surface of the loop to such an extent that the plug might lose its sealing relationship and thence could not proceed properly through the conveyor conduit.

Still referring to FIGURE 17, the vertical rise of conveyor pipe 132 merges into a horizontally extending portion 134 having a plug-forming pocket 135 such as has been described hereinbefore. The pipe then continues with an uphill portion 136 which is also provided with a plug-forming pocket 137. Then there is another horizontally extending pipe portion 138 having a plug-forming pocket 139. With reference to FIGURES 17 and 16, viewed as a unit, the pipe 138 is assumed to discharge into receiver 120, the source of air suction which is maintained at the aforenoted sub-atmospheric pressure.

The subterranean portions of the pipe sections 134 to 138 can be conveniently disposed in a wooden culvert 140 filled with a porous, heat insulating material 141, such as cinder, and shown in cross section in FIGURE 18.

The case of a nearly vertical rise section, such as that in FIGURE 17, will now be described in further detail with reference to detail FIGURE 19 showing a conveyor pipe including two S-shaped pocket bends, the direction of transport in the vertical pipe 266 being indicated by arrows. The lower pocket is indicated at 267 with a subsequent higher pocket indicated at 268. A first divide 269 and a second divide 270 define a pipe section drained by the pocket 267. Vertical spacing of the water level 274 and crest 270 of the next divide, in a system using 1.75 inches I.D. (inside diameter) pipe, can be a distance of 15 to 20 feet. In this illustrated embodiment, each pocket, such as 267 and 268, is located quite close to a divide, such as at 269 and 270, respectively. The pipe end 272 communicates with one or more closet bowls and the pipe end 273 with the vacuum source. All remains of a liquid plug in pipe 266 which have not passed into next pocket, such as 268, will return to the preceding pocket, such as 267, when all preceding closet bowl valves 4 have been closed.

Due to the downstream suction in the steady state of a system, discharge valves closed, the left hand column of fluid in each pocket will be raised above the pocket line 274 and 275 respectively as indicated. The actual liquid quantity stored in a pocket will thus exceed the theoretical pocket volume V as above defined. The air cushion 276 will here have a vertical extension.

*Multiplex system*

The plan view of FIGURE 20 illustrates a multiplex installation for a considerable number of water closets arranged in a number of groups, FIGURES 21–25 illustrating various details. In FIGURE 20, each block 277 will represent a building having some 50 or 100 flats or, as an alternative, each block 277 can represent a corresponding group of small dwelling or work units, e.g., houses or military base unit installations. On the drawing there are shown, for the sake of simplicity, only a few water closet bowls 278 in each group block 277, each bowl having a branch outlet line 279 and all of the branch lines within a group 277 leading to a common trunk line 280.

The trunk line 280 from a group block 277 passes into a connecting box 281, shown more in detail in FIGURES 22 and 23. A principal pipe 282 merges into the connecting box 281 and a continuation principal pipe 283 passes out from box 281. Into the connecting box 281 there are also introduced the exit ends of other trunk lines 284, 285 and 286. Each such trunk line represents a number of closet bowls situated in one group block 277, each block having for instance some 50 or 100 flats, each of which flats has at least one bowl 278. The branch lines, such as 279, and the trunk lines, such as 280, have the same inside diameter for instance 1¾″, whereas the principal pipe conduit has a larger diameter, in this instance, a diameter of 2¼″ would be suitable. The principal line 283 continues to a further connecting box 287, communicating with which are a further number of incoming trunk lines 289, 290, 291 and 292. After passing the connecting box 287 the principal line continues with its section 293 to other connecting boxes if the installation size so dictates, and so on. The principal line will finally merge into a comparatively large sub-atmospheric container or receiver (not shown) provided with an evacuation pump in the manner as hereinbefore described with reference to FIGURES 1 and 16.

As shown in FIGURE 21, between each connecting box, e.g., 281 and 287, the principal conveyor line 283 will be provided with divides, such as at 294, 295, and between two consecutive divides there will be provided pockets, as indicated at 296. For inspection purposes each connecting box (see detail FIGURE 22 and 23), such as 281 and 287, is installed within a concrete well 288. A suitable representative distance between two consecutive connecting boxes, such as 281 and 287, is about 325 feet and the divide distance between consecutive pockets some 65 to 100 feet. Each of the connecting boxes 281, 287, etcetera, has a very important function as a preliminary vacuum container for the trunk lines connected thereto. The vacuum or sub-atmospheric pressure is maintained via the comparatively long principal line sections, such as 283 and 293, and so on, from the main vacuum container, not shown.

It is again pointed out that the dimensions of the branch lines, such as 279, and the trunk lines, such as 280, are of the same I.D. dimension whereas the principal lines, such as 283, have a greater I.D. dimension. This increase in cross-section necessitates the provision of the connecting boxes 281 and their function as preliminary vacuum containers for the smaller diameter branch and trunk lines.

When the system is at stand still and in its steady state, there will be a vacuum or sub-atmospheric pressure maintained in the connecting box 281 which is of the same order as that in the main vacuum container, not shown, but with a reduction corresponding to the possible liquid columns established under a steady state in the different pockets provided in the principal lines. During this stand still, steady state condition there will also be vacuums in the numerous trunk and branch lines. Under such condition when a vehicle plug suddenly starts from one closet bowl through a branch line 279 via the trunk line 280 and into the connecting box 281, then the plug material would in fact have several paths to select, in each of which a certain vacuum is reigning. However, to assure that no waste liquid from a plug which enters the connecting box will then pass backwards into one of the trunk lines or even into the incoming principal line, the outlets of all lines which communicate in a discharge sense into a box are preferably provided with easily self-operable non-return or check valves as indicated more specifically in detail FIGURE 24. One such valve of the swinging gate type is shown in FIGURE 24 mounted on the downwardly disposed exit end of trunk pipe 280. Two ears 297 are provided on the pipe end and a lever having two arms 298b and 298c is hinged in these ears. One lever arm 298b carries a gravity responsive weight 298a and the other lever arm 298c carries a clapper valve closure member 299 shown seated on the exit mouth of the trunk pipe 280. As is clearly apparent, the weight 298a under gravity action is positioned so it will always tend to bias the valve closure member 299 to its closed position. However, when the sub-atmospheric pressure in the connecting box 281 is lower than the pressure prevailing in the trunk pipe 280, the valve member 299 will be swung to open position.

To avoid the provision of movable mechanical parts in a system of this kind it is also possible, at least in certain instances, to use the arrangement shown in FIGURE 25. In this embodiment the connecting box 300 is shaped somewhat like an inverted truncated cone. The incoming principal line 282 as well as the narrower trunk lines, such as 280, 285, have their exit ends 302, 301 and 303, respectively, convergent in the form of injection nozzles. As the rapidly moving liquid plugs are projected into the connecting box 300 the particles will have no tendency to go back into another of the exit ends, such as 301 or 302, but will be introduced directly down into the mouth of the continuation principal line 283 in the manner of a jet from a nozzle. This special embodiment shows trunk and principal lines which do not have throughout their lengths the same diameter in as much as their exit ends, in the connecting box, do have a reduced diameter. This points up that reductions in conveyor pipe size can be very easily tolerated but increases in conveyor pipe diameters should be avoided if possible and when they do occur, additional special components (the special function connecting boxes) must be incorporated into the system, and care must be taken not to exceed the maximum conveyor pipe diameters for satisfactory system operation.

Important features of a complete system in accord with this invention are thus:

(1) The conveyor or transport conduit should be provided with spaced divides or water-partings.

(2) Each section of conveyor conduit between adjacent divides should be provided with a liquid pocket the volume of which is only a small fraction, on the order of ⅟₃₀, of the conduit volume between said divides.

(3) Air cushions should be maintained between plugs formed in adjacent pockets, the cushions having a volume several times greater than the pocket volume.

(4) The output terminal of the discharge conduit is connected to a vacuum or sub-atmospheric pressure source and the input terminal to a closet mechanism operating as an automatic dispenser for introducing into the conduit for each operation a liquid vehicle plug of substantially predetermined volume together with a following air volume of preselected size, under a higher pressure than the vacuum source, the latter volume of air serving as an air cushion between consecutive liquid plugs and having a volume several times that of the liquid plug.

(5) The diameter of the conveying conduit or pipe should be constant, at least within a section beginning substantially at the input side of a pocket and ending well past the divide on the adjacent downstream side of this pocket. On the other hand, in a section beginning on the downstream side of a divide and being inclined downhill and ending substantially at the input side of next pocket or in the vacuum container, the pipe diameter is not so important and can be varied within reasonable limits. In any case, the length of each section should not be too great, as above described in connection with FIGURES 20 and 21.

If these features, or rules so to speak, are duly followed, then no difficulty will be encountered in conveying the liquid vehicle plugs from the water closet bowls to a higher level corresponding to the differential pressure capacity of the vacuum or sub-stmospheric pressure source 120. It should be observed in this connection that the flushing mechanism, several suitable types of which will be described in detail with reference to FIGURES 26–53, in order to predetermine the quantity of flushing water, should be so adjusted that, for any given conveyor conduit cross section, the length of the introduced plug will be such as to be considerably less than the height of a water column corresponding to the differential pressure effect available at the relevant point of the conveyor conduit. Thus, if the plug lengths are not excessive and the number and spacing of the pockets adequate, the liquid and material of the plug can be elevated during the course of operation to heights considerably in excess of those which would correspond to the water column height for the minimum sub-atmospheric pressure, obtainable, i.e., each plug could be conveyed to stepped heights of 35 feet, the plug to pipe seal being maintained at least until the plug passes over the crest of next upper pocket.

In connection with the sealed nature of the plug formation it should be pointed out that the free cross sectional area of the discharge duct should be approximately constant from the closet bowl outlet end to the duct mouth in the container 120 or a connecting box. To assure initial sealed plug relationship in emptying or dispensing from the bowl to the conveyor pipe, the bowl outlet valve 4 should be opened quickly and completely to cause the entire plug diameter to form as it passes through the valve. Further, immediately before opening the valve 4, the liquid quantity accumulated in the bowl must be sufficient to form an airtight liquid partition between the atmosphere and the valve and the vacuum or sub-atmospheric pressure must be fully established on the outlet side of the valve.

In order to assure the proper formation and transport of the plug, the length of the conduit between the valve 4 and the container 120 should be at least several times that of each plug.

*Automatic bowl or receptacle control apparatus*

Various embodiments of closet bowl flushing mechanisms are possible and several will now be described.

An electrically operated embodiment is illustrated in FIGURES 26 and 27, the water closet seat or bowl 1, in a conventional manner, being formed at its bottom portion as a liquid container 2 having an outlet duct 3. The outlet is connected to and controlled by a discharge valve 4 consisting of a plunger 5 which is surrounded by a rubber packing 6 and is slidably received within a ported cylinder 7 to control fluid passage from an inlet port, through the cylinder 7 and out of the outlet port. Plunger 5 is operated through a link 8 suspended on a wire 9 secured to the reciprocable armature 10 of a solenoid 11. Solenoid 11 is designed as a quick acting operator for valve 4. The weight of the valve closure plunger 5 is so selected that, when the solenoid 11 is deenergized, the plunger 5 together with its packing 6 will drop down to occupy its lower (closed) position, as shown in the drawing, in which position it is adapted to seal off the bowl outlet 3 so accurately that, even if a high vacuum pressure is prevailing within the conduit section 12, of the conveyor system, situated downstream of the valve 4, passage of air and liquid through bowl 1 and past valve 4 will be prevented.

A conventional domestic water supply source, under pressure, is derived through the pipe 13 which connects to the inlet of a valve 14, the outlet of which is connected to a bowl water supply pipe 15. The latter pipe 15 is connected to an annular nozzle pipe 16 located within the upper confines of bowl 1 having provided thereon a plurarality of radially inward extending stub tubes 17, closed at their terminal ends and provided with nozzle orifices 18 in the form of narrow slots in their lower walls. The water supply valve 14 is controlled through a link 19 connected to the armature 21 of a second solenoid 20.

The water supply control valve 14 may be of any suitable conventional type, a suitable specific type being illustrated in FIGURE 37. In this construction the body is made in two parts 150 and 152 and part 150 includes valve inlet 13' which communicates with a high upstanding circular flange 154, interior of the valve body part 150 surrounded by an annular space 156 which in turn is in communication with the valve outlet 15', also in body part 150. A rubber diaphragm 158 is clamped between body parts 150 and 152, disposed above the circular flange 154 and is pre-loaded to closed position against the seat end of flange 154 by a predetermined force, exerted by a weight 160, for example. The gravity effect on the weight 160 is selected to be considerably in excess of the static water supply pressure exerted on an area corresponding to the top opening of the seat flange 154. Thus, in the non-operated condition, weight 160 will act to urge the rubber diaphragm 158 against the edge of the flange 154, whereas, in the energized condition of solenoid 20, rod 19 will be subjected to a pull which displaces the weight 160 a few millimeters and permits a free passage of supply water past the diaphragm 158, as indicated by the arrows in FIGURE 37.

The electrical circuitry for the solenoids 11 and 20 will appear from FIGURE 27. The timing switch device (see also top of FIGURE 26) therein comprises an electric timer motor 22 with three rotary cams 23, 24 and 25 non-rotatably secured to its shaft. Cam 23 is provided with a peripheral recess 26, which in a specific angular position of the cam 23 cooperates with a switch 27, in a manner to permit its contacts to open. In all other angular positions of the cam 23, the contacts of switch 27 are closed. The second cam 24 is provided with two peripheral spaced apart radial projections 28 and with intermediate surfaces 29a and 29b of smaller radius. When the latter intermediate surfaces cooperate with a second switch 30, its contacts are open whereas, when either one of projections 28a or 28b is in its engagement with the operator of switch 30, its contacts are closed. In a similar manner, the third cam 25 is formed with one peripheral surface 31 of reduced radius, and a second peripheral cam rise surface 32 having greater radius. When reduced diameter surface 31 is aligned with the switch 33, the contacts of the latter are open whereas they are closed in any other position of cam 25.

Cam portions 32 and 28a, 29b are so angularly interrelated by their positions on the motor shaft as to cause the beginning of the closure of switch 33, due to the action of the cam portion 32 to occur at the end of the closed period of the switch 30 caused by the cam portion 28a whereas the end of the closure period of the switch 33 falls at the beginning of the closing actuation of the switch 30 by the cam portion 28b. The power supply circuit for motor 22 is selectively initially controlled by means of a push-button switch 34, the circuit immediately being rendered closed for one cam shaft cycle by switch 27 which is in parallel with push-button switch 34.

The operation of the equipment described is as follows: The valve devices 14 and 4 are normally closed. Upon depressing the push-button switch 34, motor 22 is started which immediately starts rotation of all three cams 23, 24 and 25, cam 23 thereby immediately closing the contacts of switch 27 which completes a holding circuit paralleling push-button switch 34 so that the motor is maintained in connection with the power supply and will continue its rotation until the cam recess 26 will again register with the switch 27 allowing the latter to open the power circuit, stopping the motor.

When motor 22 starts rotation, the cam portion 28a causes switch 30 to close, thus energizing the water supply valve control solenoid 20. The water supply valve 14 is abruptly opened and water under pressure is immediately supplied through the pipe 15, into nozzle ring 16 and thence into the bowl through the narrow nozzle slots 18. This will cause practically all of the pressure drop between the pressure within the water supply and the atmospheric pressure to be localized at the nozzle slots 18, so that the water discharge will have a high exit velocity, and even a small quantity of water will provide forceful flushing action against the walls of bowl 1. When the flushing action has continued for a predetermined moment of time as determined by the speed of rotation of the cam shaft, cam 32 will close the switch 33 to complete a circuit energizing the bowl outlet valve control solenoid 11 to attract its armature 10 which quickly and completely opens the bowl outlet valve 4. At the same time, the cam portion 28a leaves its engagement with the water supply control switch 30, whereby the latter is opened to deenergize the water supply control solenoid 20, the water supply valve 14 will close and flushing action will cease. Note: the bowl outlet valve is now open.

The bowl outlet connection pipe 12 will be connected in the conveyor conduit system to a continuously operating source of sub-atmospheric pressure as has been hereinbefore described, the contents of the bowl bottom 2 and its bight 3 will immediately be driven past the completely opened outlet valve 4 into the connecting pipe 12 in the form of a liquid vehicle plug by differential pressure force and will be propelled at a great velocity through pipe 12 and associated conveyor conduit to be received, for instance, in a container 120, as shown in FIGURE 16, in which container the sub-atmospheric pressure vacuum is maintained. It is important to assure that the plug is formed in a coherent piston-like mass, that the shifting of the valve 4 from its closed to an open position must proceed very rapidly, such as in a fraction of a second and preferably in less than 0.1 second.

After the lapse of a period which is predetermined so that the liquid content of the bowl 1 will have had time to discharge and the plug to reach the container 120 or, in any case where traverse of long distances of conveyor duct are necessitated, the plug has reached the conveyor pipe section controlled by the first plug reforming pocket, the trailing edge of the cam portion 32 moves past engagement with switch 33, allowing the latter to reopen whereby the bowl outlet valve control solenoid 11 deenergizes, releasing its armature, and the bowl outlet valve 4 is restored to its closed position. This closure blocks the suction through the conveyor conduit 12 from being exerted on the contents of the water closet bowl.

At the same time, cam portion 28b engages its switch 30 closing it, again energizing water supply control solenoid 20, and opening the water supply valve 14 so that flushing water again flows for a brief period until the cam portion 28b moves past the switch 30 and then again deenergized solenoid 20 releases its armature causing the water supply 14 to cut off further supply of water to the bowl 1. In the time interval between the closing actions of the outlet valve 4 and the water supply valve 14 the required quantity of water will have been received in the bottom portion of the bowl. This quantity, as has been hereinbefore described, should be sufficient to cause the water content of the bowl to surmount the highest level of the outlet opening passage, at 128 in FIGURE 26. Under these circumstances, the water quantity present within the bowl receiver 2 will continuously, sealingly engage wall surfaces of the outlet passage so that when the outlet valve 4 is quickly opened, the bowl contents will invariably form a liquid vehicle plug adapted to be projected through the conveyor conduit in the requisite piston or bullet-like manner.

Due to the fact that the flushing action of supplied water occurs at a high pressure and the bowl outlet connection pipe 12 is of a small diameter, such as, for instance ¾" to 2", the water quantity necessary for each discharge dispensing operation from bowl to pipe 12 may be predetermined at a very low value relative to that used in previous known conventional water closet bowl flushing and discharge operations, for instance 1 pint or less. Nevertheless, both the flushing effectivity and the formation and conveyance of the plug will be quite satisfactory.

FIG. 26 depicts a small quantity of air entrapped above the liquid level in the bowl bottom duct 3 in front of the outlet valve 4. This air column creates no problem, so long as its length is not so great that the initial coherent formation of the plugs is impaired.

A hydraulically powered flushing mechanism embodiment is illustrated in FIGURES 28 through 36 and is constructed throughout of hydraulic and mechanical components. The principal sub-assembly of this mechanism is a combined measuring and motor device, which includes a power cylinder 35 having end walls 36 and 37 in which a piston rod 38 with attached piston 39 is slidably mounted. The piston rod 38 has secured on one of its projected ends, a transverse arm 40 (see FIGURES 29, 32 and 33) formed at its upper end into the shape of an elongated plate 41 (see FIGURE 31) which extends parallel to the piston rod and passes in an overhanging manner, back over the cylinder 35.

Depending from one side of plate 41 is a frame 42. The plate 41 has provided therein a longitudinally extending recess 43 (see FIGURE 31) through which a lever 44 is passed. The lever 44 is pivotally mounted on a pivot pin 45, secured in a fixed plate, and carries adjacent its upper end a weight 46. At its lower end the lever 44 is provided with a forked extension 47 (clearly shown in FIGURES 32 and 33). With continued reference to FIGURES 32 and 33, each branch of the lower forked extension 47 of lever 44 is formed with a slot 48 engaged by a pin 49 which is slidably received in a slot 50 formed in a valve operating bar 51. The operating bar 51 is articulated at both of its ends to arms 52 and 53, respectively, which constitute control levers for four valves 54, 55, 56 and 57, all four valves being shown in FIGURE 30. The valves 54 and 55 respectively control a fluid circuit (see FIGURE 28) through pipe lines 58, 59 and 60 connecting the left-hand end of the cylinder 35 with the flushing water supply pipe 15 to bowl 1, and a fluid circuit (see FIGURES 28 and 29) through pipe lines 61, 62 and 63 connecting the right-hand end of the cylinder 35 with the same water supply pipe 15. When valve 54 is open valve 55 is closed and vice versa.

The inlet connection from the water service mains or supply 64 (see FIGURES 28 and 30) passes through a primary water inlet valve 65 thence through an inlet pipe 66 having two branch pipes 67 and 68, connected respectively through the valves 56 and 57 to one end and the other end of the power cylinder. The primary inlet valve 65 is a rotary valve having an arm 73 secured to its spindle 72, arm 73 carrying a weight 74 (see FIGURES 29, 32 and 33). The free end of the arm 73 is operable through a rod 75 provided with an operating handle 126 or the like. In the position shown in FIGURES 32 and 28, the arm 73 is retained by a latch 76 which is pivoted at 77 and is urged by a spring into its latching position. The common valve operator bar 51 is provided on one side with a cam projection 79 which is adapted in certain positions of the bar 51 to actuate and release the latch 76 for the water supply valve lever arm 73.

The portion of the hydraulic system thus far described constitutes the control equipment for the flushing water and operates in the following manner. FIGURE 32 illustrates the position of the primary components just after the manual initiating step when, in order to start flushing, the hand operated rod 75 has been raised manually by lifting knob 126 (FIGURE 29) so as to cause lever arm 73, to which rod 75 is attached, to rest on the latch 76. This operation of lever 73, as has been described, has rotated the valve spindle 72 to open the water inlet valve 65. In the illustrated positions valve 56 is open, valve 54 is closed, valve 55 is open and valve 57 is closed. This will cause water under pressure to communicate through lines 66 and 67, through open valve 56 (FIGURE 30), through pipe 71 and thence into the interior of the power cylinder 35 (left hand chamber in FIGURE 29). Piston 39, which in the exemplary condition is positioned as in FIGURE 32, will be displaced towards its right-hand end. The piston, thus moving, displaces the water present within the right-hand end portion of the power cylinder, this water being expelled through the pipe 61, open valve 55, pipes 62 and 63 to the flushing supply pipe 15 (see FIGURE 28), and the annular nozzle tube 16 with its nozzle orifices 18, causing flushing to take place.

In the course of the right-hand movement of the piston 39 and its rod 38 (FIGURE 32) the left-hand edge of the plate recess 43 (FIGURE 31 and 32) acts to erect and thus raise the inclined weighted lever 44 together with its weight 46. During this piston stroke, and movement of lever 44 is clockwise gradually causing its lower forked extension 47 to displace the floating connecting pin 49 along slot 50 in the valve operating bar slot 51, until the lever 44 reaches its vertical position. Shortly after such a vertical lever condition is reached, the floating connecting pin 49 will have been displaced enough to encounter the left-hand end of the operating bar slot 50, and then the lever carried weight 46 having passed overcenter will exert force tending to rock the lever 44 fully to the right, as seen in FIGURE 33. In the course of this completion of clockwise lever movement, operator bar 51 is reciprocated leftwardly and its cam projection 79 moves past and momentarily acts on the lower portion of the latch 76 pivoting the latter clockwise in opposition to its spring 78, as seen in FIGURE 28, the latch 76 thereby releasing the primary water supply valve lever arm 73 causing the latter to drop under force of gravity on weight 74 whereby the primary inlet supply valve 65 closes the supply of water and the water supply system is automatically inactivated after completion of one operative cycle.

It is obvious the disposition and shape of the cam projection 79 and of the operator bar 51 with its slot 50 are factors which are determinative of the length of the period of time during which flushing water is supplied. It is further obvious, that the quantity of flushing water used is exactly determined by the displacement length or throw and area of the piston 39. Since the power consumption required for the mechanical operations is utilized relatively slowly, it is also low. Consequently, the flushing water in the pipe 15 will be subjected to a pressure which is substantially of the same magnitude as that of the service mains.

The throw of the piston, as mentioned above, is preferably so selected as to cause the lever 44 to pass its vertical dead-center position and thereafter be rocked by gravity into its right-hand position, as shown in FIGURE 33. In this position, the operator bar 51 has been forced into its opposite position in which the arms 52, 53 have reversed the four valves 54, 55, 56, 57 so that now the valve 54 will be open, the valve 55 closed, the valve 56 closed and the valve 57 open. Thus, when the manual activating rod 75 is next raised, a new cycle of automatic flushing operation will occur, the piston 39 and the parts 51 and 44 however, now moving in the opposite sense to that previously described, back into their positions as shown in FIGURE 32.

Simultaneously during the aforedescribed operative cycle supply water and flushing operation, a further operation pertaining to opening and closing of the bowl outlet valve 4 is automatically carried out. The mechanism and operation will be best described with reference to FIGURES 34-36. In the position illustrated in FIGURE 34 the components occupy the positions corresponding to the condition of the mechanism as in FIGURES 29 and 32. The aforedescribed piston rod reciprocated frame 42 includes a longitudinally disposed lower portion 69 carrying a first spring biased pawl 70 pivotally mounted in a recess 80 in portion 69, the recess being so shaped as to allow the pawl 70 only to be rocked clockwise against spring bias to be received completely within the recess. A second spring biased pawl 81 is complementarily pivotally mounted in a second recess 82 so shaped as to allow this second pawl only to be rocked counterclockwise to be received completely within its recess. A lever 83 is pivotally mounted on the pivot pin 45, passes through and is guided by a slot 84 formed in the top plate 41. The lever 83 near its upper end carries a weight 85 and is provided at its lower end with an inverted T-flange 86.

The bowl outlet valve 4 has an operating rod or link 8 (FIGURE 28) connected to flexible wire 87 to which is fastened a weight 88. The wire 87 near its upper end passes in contact with a vertical guide roller 89 and between two further guide rollers 90 and 91, its upper end being secured to a loose T-shaped element 92. In the position shown in FIGURE 34 the element 92 has been rocked clockwise into a right-hand tilted position in which one of its T-arms is hooked over the corresponding arm of T-flange 86 on the end of the lever 83.

Upon commencement of the flushing operation, frame 42, will be displaced to the right, causing the right-hand pawl 70 to abut the lever T-flange 86 pushing the latter to the right as will be apparent from FIGURE 34. As soon as the weight 85 on the upper end of lever 83 has been moved slightly to the left, from its FIGURE 34 position, the weight will act suddenly to continue pivotal movement of lever 83 by gravity further counterclockwise whereby the relevant one of the arms of T-flange 86 hooked on element 92, will move the element 92 to the right into the position shown in FIGURE 35. This sudden action will pull the wire 87 upwardly to quickly operate the bowl outlet valve 4 to its open position. Owing to the vacuum prevailing in the conveyor pipe 12 the liquid content in the bottom receiver 2 of the bowl will then be immediately sucked into the pipe in the form of a liquid plug which is thus conveyed, in the manner as has been hereinbefore described, to a repository which is not shown in the drawings and in which a vacuum pressure is maintained.

Upon continued movement of frame 42 to the right (FIGURE 35) an abutment 93 disposed on an intermediate longitudinally extending frame member 95 will engage the end of the engaged hook flange of the T-shaped double hook element 92 and will shift and release the element 92 from engagement on the lever T-flange 86. Upon release of element 92, the weight 88, together with the mass of the valve closure member 5, restores the valve to its "closed" position, pulling the wire 87 and T-shaped element 92 to the positions illustrated in FIGURE 36.

The operations just described are so timed as to cause the bowl outlet valve 4 to open a short period of time after commencement of the flushing operation, and to close slightly before termination of the flushing operation. These intervals, of course, can be predetermined, to obtain any correlated accuracy desired, by suitably selecting the positions of the pawls 70 and 81 and the abutments 93 and 94.

Before the rightward movement of the power piston rod 38 has stopped altogether, the left-hand end of the slot 84 in plate 41 will engage and shift the lever 83 clockwise to restore it to its vertical position. This will cause the opposite arm of the T-flange 86 on lever 63 to now engage the other hooked arm of the T-shaped double-hook element 92 so as to rock element 92 slightly to one side in a manner corresponding to that shown in FIGURE 34, although in the opposite sense. The arrangement of parts is thus automatically conditioned for the initiation of a new discharge operation in conjunction with the starting of a further flushing operation by manually operating the handle 76. This operation will develop in a manner similar to that described in conjunction with the FIGURES 34 to 36 although with the exception that this time the frame 72 will move to the left, and the second pawl 81 and second abutment 94 will be effective in directions opposite to those in which the pawl 70 and abutment 93 were previously effective. This enables the relative timing sequence to be maintained unchanged in both cases.

The arrangement just described ensures that the lever mounted weights 46 and 85 provide a force to cause rapid actuation of the associated valves, avoiding intermediate positions due to slow movement, and providing sharply defined operating times.

In the embodiment of FIGURE 28 it is again stressed that the water level in the bowl receiver 2 must be sufficiently high to cause the water to form an airtight plug in the outlet passage 3. It should also be noted that the internal diameter of the duct 12 should preferably be slightly less than that of the outlet already under the cam follower roller 99 which has raised the valve operating spindle 98 whereby the valve 97 is open and flushing water is permitting to flow through the pipe 103 to all of the four supplementary flushing nozzles 18b. Shortly thereafter, when the automatic bowl emptying operation has been initiated, in conjunction with the opening of the bowl outlet valve 4, the cam portion 101 will have passed from under the follower roller 99, causing the latter to drop and the auxiliary valve 97 will close so that the supplementary flushing action is discontinued. After this occurs the only flushing action still continuing will be the reduced flushing action accomplished through nozzles 18a fed by the tubing 15, 16. Shortly before the piston reaches its other end position, the cam portion 102 (FIGURE 38) becomes effective to again open the auxiliary valve 97 and bring about a second forceful flushing action of brief duration through nozzle 18b in addition to nozzles 18a. It is to be noted in the present case again that the full service water pressure will be developed at the nozzle orifices, in that the piston 39 will be moved at a speed which varies according to the instantaneous rate of delivery through the nozzles 18a and 18b, thereby minimizing the quantity of water required for the accomplishment of a quite satisfactory flushing effect.

The embodiment illustrated in FIGURE 40 comprises a bowl ventilating device constructed and operative as follows: The seat proper, 125, is hinged to be folded back in the conventional manner but is normally maintained, spring-loaded by a pin, 106, in a slightly spaced relation to its supporting surface 105. Pin 106 is urged towards its upper position, as shown in the drawing, by a coil spring 107 disposed in a housing 108 and is articulated at its lower end to one end of a double-armed lever 109, the opposite passage 3 whereby any large-size solid matter entering the outlet passage will be trapped in advance of the valve 4 and may be removed through a cleaning door 127.

It has been assumed in the embodiments shown in FIGURES 26 and 28, that the flushing tube or nozzle manifold 16 is made annular and adapted to supply flushing water simultaneously to all of the nozzle orifices 18 distributed around the periphery thereof. However, as illustrated in FIGURE 38, this arrangement can be modified by causing the flushing water supply pipe 15 to only feed certain of the nozzle orifices 18a (FIGURE 39) whereas the remaining nozzles 18b are supplied by a separate pipe 96 connected to the supply pipe 15. The delivery from the latter pipe is controlled by an auxiliary valve 97, which for example, can be of the construction shown in FIGURE 37, the valve spindle 98 of which is provided with a roller 99 urged against a camming member 100 actuable by the piston rod 38, for instance being mounted on the arm 40. The upper edge of this camming member 100 is formed with two cam portions 101, 102. The water flowing through the valve 97 in its open position is directed through a supply pipe 103 and an annular flushing tube 104 to a plurality of flushing nozzle orifices 18b which are independent of the first-mentioned nozzle orifices supplied from the pipe 15 and ring tube 16. In an actual practical application, the flushing tube 16 was arranged to supply three nozzle orifices 18a disposed at two diametrally opposite portions of the tube, while the tube system 103, 104 supplied four other nozzle orifices 18b in circumferentially spaced interrelation.

By suitably positioning the cam portions 101 and 102 it is possible to accomplish the following timed sequence of events.

When cam member 100 occupies a position corresponding to the commencement of the flushing operation, the cam portion 101 its end of which is connected to a flexible wire 110 which passes over two guide rollers 111 and 112 to the actuating spindle 113 of a valve device 114. The valve device 114, being for instance of the type illustrated in FIGURE 37, is connected at one of its branches, 116, to the sub-atmospheric conveyor duct 12 while the other branch 115 thereof opens into the interior of the water closet bowl at a point situated above the intended liquid level therein. The passages 115 and 116 form an evacuating path. In operation, when a downward pressure is exerted on the seat the pin 106 will be depressed whereby the lever 109 is rocked and the wire 110 is tensioned so as to open the valve 114. This will produce a flow of air towards the discharge duct through the evacuating path 115, 116 and the rate of flow of which air is determined by the value of the vacuum pressure existing within the duct 12, as well as by the minimum area of the through-flow passages.

As soon as the seat is relieved of the downward pressure the inverse sequence of events will occur, and the valve 114 is reclosed.

A pneumatically powered flushing mechanism is described with reference to FIGURES 41–53. In the diagram of FIGURE 41, numeral 420 designates two water closet bowls which are connected through individual drain traps 421, normally-closed outlet valves 422, discharge pipes 423 and a collecting drain conduit 424 common to a plurality of water closets, to a collecting tank 425 in which a high vacuum is maintained at all times. Each closet bowl 420 is normally filled with water up to a predetermined level, such water being supplied from a source of pressurized water, not shown, for instance a water service system, through a pipe 426, a normally closed cut-off or flushing valve 427, a pressure-reducing valve 428, a pipe 429, and a plurality of flushing nozzles 430 arranged around the top edge of the bowl. The pressure-reducing valve 428 is designed so as automatically to maintain the water pressure on its outlet side at a substantially constant value in spite of any pressure fluctuations of the source of water supply, whereby the quantity of water supplied into the bowl will be substantially proportional to the time during which the flushing valve 427 is maintained in its open position.

The bowl outlet or discharge valve 422 and the flushing valve 427 are opened and closed in accordance with a predetermined timing schedule under the control of a mechanism 431 which is operated by a power drive unit comprising a piston 432 movable within a power cylinder 433 in response to the vacuum existing within the tank 425. To this end, the discharge pipe 423 beyond the outlet valve 422 is connected to the operating chamber of the power cylinder 433 through a pipe 434, a control valve device 435 and a further pipe 436. The mechanism 431 is actuated by manually pulling a handle 437.

Referring now to FIGURES 42–48, a preferred embodiment of the operating or control mechanism and pneumatic power drive unit comprises items 431 to 437 diagrammatically indicated in FIGURE 41, numeral 440 designating a frame disposed adjacent the back of the closet bowl 420 and in close proximity to the outlet or discharge valve 422 which is assumed to be of the sluice valve type. The power cylinder 433 is supported on the top of the frame 440. The power piston 432, provided with a sealing ring 441 in the conventional manner, is designed to be very heavy so as to be urged by gravity towards its bottom position, as shown in FIGURE 42. The piston 432 may, for example, be in the form of a shell encasing a mass of lead. The piston rod 442, which is preferably rectangular in cross-sectional shape, passes through a correspondingly shaped opening 443 in the bottom of the power cylinder and carries a camming member 444 on its lower end portion which projects below the cylinder. Cooperating with a cam track on this camming member is a cam follower roller 445 mounted on the end of the shorter arm of a bell crank lever 446 which is pivotable about a rigidly mounted pivot pin 447 and which carries a roller 448 on the end of its longer arm.

A lever 449, fulcrumed at one end about a fixed pin 450 and carrying at its opposite end a weight 451, is urged by gravity into a position in which it depresses a spindle 452 of the flushing water valve 427, thereby maintaining the latter in its closed position. A depending abutment projection 453 on the lever 449 is adapted to cooperate with the roller 448 so as to cause the lever 449 to be angularly displaced counterclockwise (as seen in FIGURES 42–44) and to open the flushing valve 427 as the bell crank 446 is moved in a clockwise direction when, due to upward displacement of the power piston 432, the roller 445 rides on to a raised portion of the track of the camming member 444 as shown in FIGURE 43.

Fulcrumed about a pin 454 fixed to the frame 440 is a further lever 455 of which the free end is articulated by a slot-and-pin connection to an upstanding rod 456 which at its upper end is rigidly connected to the movable valve member of the outlet or discharge valve 422, whereby the outlet valve will be opened as the lever 455 is swung upward. To cause this lever to be swung upward, a dog pin 457 is secured to the piston rod 442 and is adapted to engage the lever 455 to swing the latter clockwise as the piston 432 approaches its top-most position (see FIGURE 44). In order to retain the lever 455 in its upper limit position, and thus to retain the outlet valve 422 in its open position, a latch pawl 458 (clearly seen in FIGURE 44) in the form of a double-armed lever is provided and is pivoted on a fixed pin 459 and normally takes up a substantially vertical position, as shown in FIGURES 42 and 43, in which its lower arm is urged into engagement with a pin 460 secured to the piston rod 442, by a weight-load 461 adjustably affixed to the end portion of an arm 462 projecting laterally from the lever 458, the weight load thus urging the latch pawl or lever 458 in a counterclockwise direction. The abutment pin 460, as indicated in the drawings, is laterally adjustable and locatable in the desired position of adjustment. As the power piston 432 moves upward, thus bringing with it the pin 460, the retaining pawl 458 is slowly swung counterclockwise so as finally to engage a pin 463 fixed to the valve lifting lever 455. When, during the continued movement of the power piston, the lifting lever 455 has been swung substantially to its upper limit position, the pin 463 will leave its engagement with the vertical edge of the retaining pawl 458 which permits the pawl to move further counterclockwise so that the hook-shaped upper end 464 of the pawl is moved into engagement with the pin, whereby the lifting lever 455 will be retained in its upper limit position, thus retaining the outlet valve 422 in its open position.

As will be clearly seen from FIGURES 42–44, the operation of the mechanism thus far described is as follows:

When the power piston 432 is in its bottom position, as shown in FIGURE 42, the bell crank cam following roller 445 rests in a depression formed in the track of the camming member 444, while the bell crank operator roller 448 occupies a lower limit position, and the lever 449 is urged by its weight 451 against the valve spindle 452, thus maintaining the flushing valve 427 closed. In this condition there is a small clearance between the operator roller 448 and the lever abutment projection 453. The retaining pawl (or lever) 458 occupies its cocked vertical position in which its lower arm engages the pin 460, and the lifting lever 455 occupies its lowered position corresponding to the closed position of the outlet valve 422.

If, starting from this position, the power piston 432 moves upward, the follower roller 445 will ride on to a raised, straight-lined portion of the track of the camming member 444, thereby turning the bell crank 446 counterclockwise. This will bring the operator roller 448 into engagement with the abutment 453 thus turning the weight-loaded lever 449 counterclockwise, whereby the flushing valve 427 opens and remains open for the duration of the engagement between the follower roller 445 and the rectilinear raised portion of the cam track of member 444 (see FIGURE 43). As the power piston 432 moves further upward by a certain amount, follower roller 445 rides down towards a lower straight-lined portion of the cam track of member 444, whereby the bell crank 446 swings back to its initial position, the lever 449 swings to its lower position, and the flushing valve 427 is re-closed (see FIGURE 44). Approximately simultaneously with the latter step the dog pin 457 engages the lifting lever 455 and swings this lever upward thereby causing opening of the outlet valve 422 through the medium of the rod 456. During this action the engagement between the pin 460 and retaining pawl 458 finally ceases, causing the pawl to be urged further counterclockwise through a small angle by its weight 461 so as to engage the pin 463 on the lifting lever 455, so that, as the piston 432 reaches the top limit position shown in FIGURE 44 and in which position a stop ring (or collar) 465 on the piston rod 442 engages the bottom of the cylinder 433, the pawl 458 is turned further counterclockwise, whereby its hook-shaped upper end 464 engages the underside of the pin 463 thus retaining the lifting lever 455 in its upper limit position corresponding to the open position of the outlet valve 422.

When immediately thereafter the power piston 432 moves back from its top-most position towards its bottom position, the follower roller 445 initially moves along the lower rectilinear track portion of the camming member 444 thus continuing to maintain the flushing valve 427 in its close position. Shortly before the follower roller 445 rides up on to the raised portion of the cam track of member 444 to re-open the flushing valve 427, the pin 460 engages the lower arm of the retaining pawl 458 thereby swinging the pawl clockwise out of engagement with the pin 463 and thus permitting the outlet valve 422 to return by gravity immediately to its closed position. Finally, as the power piston 432 approaches its bottom position shown in FIGURE 42, the follower roller 445 again enters a depression in the track of the camming member 444 and thus cause the flushing valve 427 to close.

It is obviously possible, by adjustment of the abutment pin 460 to one side or the other, to time the closing instant of the outlet or discharge valve 422 relative to that of the flushing valve 427.

It will be obvious from the foregoing description that the outlet valve 422 and the flushing valve 427 are opened and closed according to a direct relationship with the displacement of the power piston 432 within the cylinder 433, said relationship being conditioned by the movement transmitting mechanism. As a consequence, the speed of movement of the power piston 432 during the various steps of the cycle of operation will have a direct influence on the duration of the periods, during which the outlet valve and the flushing valve are kept closed. In the embodiment shown, the speed of movement of the power piston is determined by the valve device generally designated by 435 in FIGURES 41–43.

This valve device, as will be seen from FIGURES 47–48, comprises a valve body 470 having formed therein a passageway 471 of which one end is connected through the pipe 434 to the discharge pipe 423 at a position immediately beyond the outlet valve 422, while at its other end the passageway 471 is connected to the interior of the power cylinder 433 through the pipe 436. The inlet from pipe 434 is normally sealed off by a plunger-like movable valve member 472 having an upwardly extending spindle the projecting upper end of which is provided with the ball-shaped operating handle 437.

Intermediate its ends, the passageway 471 is normally sealed off by a plunger-like movable stop or interlocking valve 473. The upper portion of this valve is formed with an enlarged-diameter piston 474 which fits displaceably in an airtight manner within a cylinder bore 475 the upper portion of which communicates, through a conduit 476, with the passageway 471 outside the actuating valve 472. Between the stop or interlocking valve 473 and the point of connection of the pipe 436, the passageway 471 passes through a cylindrical space or bore in which a plunger 477 is displaceable. When this plunger is in its upper limit position, as shown in FIGURE 47, the passage 471 is completely unrestricted, whereas the plunger 477 obturates this passageway when in its lower limit position, as shown in FIGURE 48, the communication being, however, maintained through a restricted by-pass 478 formed through the plunger. The position of the plunger 477 is related to that of the power piston 432. As a matter of fact, as seen from FIGURES 42–44, the bell crank lever 446 is formed with a third arm 479 upon which is supported a rod 480 which, by a cross piece 481 at its upper end, is connected to the end of the spindle 482 of the plunger 477 which projects out of the valve body 470.

In the last-mentioned figures, numeral 483 designates a latch pawl which is mounted on the valve body 470 so as to be pivotable about a horizontal axis 484, and which is provided adjacent its pivot axis with an arm-like lateral extension 485 which tends to tilt the pawl counterclockwise by gravity. The latch pawl 483 normally engages the enlarged upper portion of the manual operating spindle 486 but is adapted, as the operating spindle is pulled upward by means of its handle 437, to enter into engagement with an annular shoulder 487 formed at the bottom end of the enlarged manual operating spindle portion, thereby retaining said manual operating spindle in its elevated position. An adjustable screw 488 rigidly connected with the piston rod 442 is adapted, as the power piston 432 reaches its top-most position, to engage the arm-like extension 485, thereby turning the latch pawl 483 out of engagement with the shoulder 487, see FIGURE 44, thus permitting the operating spindle 486, and hence the valve member 472, to be returned by gravity into their initial positions.

The control mechanism thus described operates as follows: Pulling the ball handle 437 will raise the valve member 472 from its bottom position, as shown in FIGURE 47, into its top-most position shown in FIGURE 48, in which latter position the valve member will be retained, even after releasing the handle, owing to the fact that the latch pawl 483 engages the shoulder 487. As a consequence, communication is established between the discharge pipe 423 beyond the outlet valve 422 and the passageway 471 in the valve body 470. If the vacuum existing in the discharge pipe beyond the outlet valve 422 is sufficiently high, the piston 474 will be moved upward within the cylinder bore 475 whereby the stop valve 475 will be opened. Since in the initial position the arm 479 is in its upwardly tilted end position, see FIGURE 42, the plunger 477 will be in its upper limit position as shown in FIGURE 47, thus completely uncovering the flow passage in the passageway 471 and the pipe 436. As a consequence, the cylinder space above the power piston 432 will rapidly be evacuated with the result that the piston will commence to move upward at a rapid rate. As soon as the piston has been raised sufficiently to cause the roller 445 to ride up on to the raised rectilinear track portion of the camming member 444, thus opening the flushing valve 427, the arm 479 will be lowered into its bottom limit position, FIGURE 43, whereby the plunger 477 will drop into its bottom limit position, shown in FIGURE 48, in which position the evacuation of the interior cylinder space is effected through the restricted by-pass 478 provided in the plunger. Consequently, the continued upward movement of the piston 432 will take place at a lower rate. This relatively slow displacement will continue so long as the cam follower 445 remains in engagement with the raised rectilinear track portion of the camming member 444, i.e. so long as the flushing valve 427 remains open. This will ensure sufficient flushing of the closet bowl before the outlet valve 422 is caused to open. When this occurs the roller 445 has moved down on to the lower rectilinear track portion of the camming member 444, and the arm 479 has been rocked into its upper limit position, thereby raising the obturating plunger 477 into its top-most position in which it completely uncovers the evacuation passageway, causing the power piston to move rapidly during the latter portion of its upward stroke, thus quickly opening the outlet valve 422.

As the operating piston 432 reaches its top-most position, the limit trip screw 488 engages the arm 485 of the latch pawl 483 causing the latter to be swung out of engagement with the shoulder 487. This will allow the valve member 472 to be returned by gravity into the position shown in FIGURE 47 where the member effectively seals off the communication between the cylinder and the source of vacuum. Through a permanently open, relatively restricted air inlet orifice 489 provided through the top end wall of the cylinder 433, atmospheric air will be inhalated into the cylinder space reducing the vacuum therein and permitting the power piston 432 to drop by gravity at a rate which depends partly on the weight of the piston proper and partly on the area of the inlet orifice 489. As stated hereinbefore, this action first causes closure of the outlet valve 422, after which the flushing valve 427 is opened to supply a suitable quantity of water into the closet bowl, and before the power piston 432 has reached its bottom position, the flushing valve will be re-closed, whilst at the same time the obturating plunger 477 of the valve device is raised into its open position shown in FIGURE 47. Now the various parts of the mechanism have been restored to their initial positions preparatory to the initiation of a new cycle of operations.

The rate of displacement of the power piston 432 during its upward as well as during its downward stroke is, of course, dependent also upon the resistance to air flow offered by any passages through which the cylinder space below the power piston communicates with the ambient atmospheric air. In the embodiment illustrated, an adjustment of this resistance in response to the instantaneous position of the power piston 432 has been provided for by shaping the piston rod 442 so as to exhibit varying cross-sectional areas along its length, whereby in different axial positions the piston rod will take up a larger or smaller proportion of the area of the opening 443 provided for the rod in the bottom wall of the power cylinder 433.

The connection of the vacuum source, as shown in FIGURES 41–48, to the valve device through a drain pipe common to all of the water closets may involve drawbacks under certain conditions to the optimum arrangement. Therefore, according to a development of the present invention, a separate conduit 495 is (as shown in the diagram of FIGURE 49) connected between the evacuated sewage tank 425 and a modified control valve device 496, the conduit 495 enabling the working space within the power cylinder 433 to be evacuated. In order to block the valve device 496, should the vacuum immediately beyond the outlet valve 422 decrease below a predetermined value, a pressure responsive blocking device 497 may be provided and be connected with the discharge pipe 423 through a pipe 498, which is also indicated in FIGURE 49. This figure also indicates a modified design of the manual operating member for tripping the valve mechanism. These modifications are illustrated in more detail in FIGURES 50 and 51 wherein, in order to simplify the representation, the mechanism operated by the power piston 432 and serving for actuating the outlet valve 422 and the flushing valve 427 has been omitted (as also in FIGURE 52).

According to FIGURES 50, 51 and 52, the ball handle 437 is mounted on the extreme end of a separate rod 499 which is movable in a guiding sleeve 500 between two limit positions defined by spaced abutment shoulders 501 and 502 provided on the rod. The lower end of the rod 499 is forked and straddles a substantially horizontally extending lever 503 to which the rod is articulated by a pivot pin 504 secured to the lever and engaging a vertically elongated slot 505 formed in the forked end of the rod. The lever 503 is articulated at one end to an upward extension 506 of the valve spindle 507 (see particularly FIGURE 52), and at its opposite end to a rod 508 which is vertically guided in the frame 440 and normally occupies its lower end position as shown in the drawing. It is held in this position by the piston rod 442, when this is in its bottom position, by co-action between the lower portion of the camming member 444 and an arm 509 projecting laterally from the rod 508. A spring 510 inserted between a fixed guiding element 511 and a collar 512, provided on the rod 508, urges the rod towards its upper limit position. When the rod 508 is in its lower limit position—which indicates that the mechanism has completed its last-preceding cycle of operations—the pin 504 will be in engagement with the bottom end of the elongated slot 505. Therefore, upon pulling the handle 437, the lever 503 will tilt about its right-hand pivot pin and will lift the valve spindle 506, 507 together with the starting valve 472, thus initiating a new cycle of operations. On the other hand, if the power piston 432 has not yet returned to its initial position, the rod 508 will occupy its uppermost position, the pin 504 will engage the upper end of the elongated slot 505, the handle rod 499 will be free to move relative to the lever 503, and pulling by means of the ball handle 437 will have no effect on the starting valve 472. The mechanism described will thus ensure that a preceding cycle of operations is completed before a new cycle can be initiated.

As will be seen from FIGURE 52, the embodiment of the control valve device here shown obviates the use of the stop or interlocking valve 473 used in the embodiment illustrated in FIGURES 47 and 48. Instead the valve device of FIGURE 52 is provided with the particular blocking mechanism 497 indicated diagrammatically in FIGURE 49 and which is adapted to prevent opening of the starting valve 472 should the vacuum adjacent the closet bowl be too low. The blocking mechanism 497 comprises a cylinder 513 mounted on the valve body 470, one end of this cylinder communicating, through the pipe 498, with the discharge pipe 423 immediately beyond the outlet valve 422. The cylinder 513 receives a slidable plunger 514 having associated therewith a central rod 515 which projects through the end of the cylinder 513 remote from the pipe 498 and is adapted, when the plunger assumes its right-hand end position, to enter a corresponding locating hole 516 formed in the upward extension 506 of the valve spindle 507, whereby the latter is positively locked against displacement. Affixed to the plunger rod 515 at some distance from its extreme end is a rectangular frame member 517 (see FIGURE 53 in particular) which embraces the valve spindle extension 506 and to the extreme end of which is fastened a flexible wire 518 laid around a guide pulley 519 and tensioned by a weight 520 suspended from its end. This weight tends to pull out the plunger or locking rod 515 into its locating position shown in FIGURE 53. If the vacuum prevailing to the left of the plunger 514 is sufficiently high, however, the suction force exerted on the plunger by the vacuum is effective to overcome the pull exerted thereon by the weight-loaded wire 518, causing the plunger to be maintained in its left-hand end position (shown in FIGURE 52) in which the locating pin or rod 515 is withdrawn from the locating hole 516, thus permitting the starting valve 472 to be operated in the normal way without any interference.

The showing of FIGURES 50 and 51 also includes a safety arrangement adapted automatically to start the mechanism for emptying and refilling the closet bowl if, for some reason or other such as the emptying of a bucket of water into the bowl, the free liquid surface therein should rise above a predetermined level. This safety arrangement includes a double-armed lever 521 having a long and a short arm and which is tiltable about a fixed horizontal pivot 522, the lever carrying a receptacle 523 at the extreme end of its longer arm and a weight 524 at the extreme end of its shorter arm. Owing to the presence of the weight 524, the lever 521 normally engages a fixed abutment 525 which is adjustable into various vertical positions as desired. The receptacle 523 communicates through a flexible hose 526 with the water basin of the closet bowl, preferably with the drain trap 421, so that a rise of the water level in the closet bowl 420 will cause the receptacle 523 to be filled with water up to the same level, the receptacle being located at an appropriate height to permit this to happen. After the water level in the receptacle 523 has risen to a sufficient height, the weight of the water therein will balance the counterweight 524 and cause the lever 521 to be tilted clockwise from its position shown in FIGURE 51. This tilting movement will occur at a progressively accelerated rate because the water will at the same time flow out to the extreme outer portion of the receptacle 523, thus causing the center of gravity to be moved further away from the fulcrum 522 of the lever 521. Moreover, this tilting of the lever 521 will cause an abutment projection 527 on the weight 524 to engage the lower end of a vertically displaceable rod 528 guided in the frame 440 and having its upper end connected to the valve spindle extension 506, whereby the starting valve 472 will be opened, a new cycle of operations will be initiated, and the closet bowl will be emptied. It is obvious that the position of the abutment 525 determines the level of the water within the closet bowl at which the lever 521 will be tilted and cause the discharge operation to take place.

The safety device shown in FIGURES 50 and 51 may readily be modified so as to prevent emptying of the closet bowl if the free liquid surface in said bowl rises above a predetermined level, and thus the introduction of a non-desired amount of liquid into the pipe system and into collecting vessel for excrements respectively. For said purpose it is possible, by way of example, to remove the rod 528 and to connect instead the long arm of the lever 521 mechanically with the end of the flexible wire 518, suitably by means of flexible wire carried over a guide pulley, so that on swinging of the lever 521 clockwise about the pivot 522 the locking rod 515 will be pulled into the locating hole 516, thereby preventing shifting of the actuating valve 472. Alternatively, the arrangement may be devised so as to automatically lock the discharge valve in its closed position when the free surface of liquid in the closet bowl rises above the predetermined level.

It is obvious also that the arrangement is susceptible to modification in many respects without departing from the scope of the invention. Thus it is conceivable, for the purpose of regulating the open period of the flushing valve, to construct the camming member 444 in two mutually telescopic parts in such a way as to enable the raised rectilinear portion of the cam track to be lengthened or shortened by relatively adjusting said parts.

The foregoing description discloses a new method of conveying material in conduits using combined principles of hydraulics and pneumatics. The materials being conveyed utilize liquid plug vehicles of short length within small diameter conduits, optimum and preferable dimensions being set forth in the preceding description.

Primarily the conveying force is pneumatic, derived from differential pressures and utilizing long lengths of air cushions between sequential plug vehicles as dictated by the extent of the conduit. The method includes steps of rapid introduction of material to be conveyed into conveying conduits together with concurrent formation of the material and liquid vehicle into a requisite short length plug form; the reformation, if necessary, into new plug shape of material and liquid from plugs which have lost their coherency due to extended passage through the conduit; and utilization of a common system to convey material from multiple sources. Additionally, new systems have been disclosed which among other things, enable utilization of the method of hydro-pneumatic conveying from single sources of material to be conveyed from multiple sources of material and from multiplex systems of multiple source branch systems. And furthermore new components of the complete systems such as special conduit and pocket arrangements and automatic material introducing and plug forming devices powered by either hydraulic, electrical or pneumatic forces are disclosed.

This invention may be embodied in other specific forms without departing from the spirit or essential characteristics thereof. The present embodiments are therefore to be considered in all respect as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of hydro-pneumatic conveying of material through a conduit, having a relatively small internal diameter as compared with conventional soil pipe from at least one initial location to a second distant terminal locating, comprising:
   (a) subjecting the outlet end of the conduit to a sub-atmospheric pressure;
   (b) accomplishing a sudden and unobstructed introduction of a coherent vehicle plug, consisting of material to be conveyed and a small volume of liquid, into the conduit under the pressure of and, while moving through the conduit and still in a coherent vehicle plug shape, followed by a materially larger volume of air under pressure higher than the said sub-atmospheric pressure;
   (c) controlling the initial volume of the plug so that its initial length in the conduit is at least several times the conduit inside diameter and
      (1) the plug has an initial length which is a fraction of the length of a theoretical water column equivalent to the difference between the two defined pressures expressed in inches of water, and
   (d) maintaining the inner diameter of the conduit throughout its length within the approximate range of from ¾″ to 2½″.

2. A method of hydro-pneumatic conveying through a conduit system having at least one introduction terminal and an outlet terminal comprising:
   (a) providing said conduit system with spaced divides;
   (b) providing each section of conduit between spaced divides with a pocket formation, the volume of which is only a minor fraction of the volume of the associated section of conduit enabling spaced apart collection of particles of material dispersed from previously conveyed plugs to form secondary plugs in said pocket formations;
   (c) providing during a steady state of the system, air cushions between any coherent plugs collected in pockets having a pocket volume at least several times greater than the pocket volume;
   (d) providing a vacuum source at the conduit system outlet terminal;
   (e) provision for automatically injecting into the conduit introduction terminal and along the conduit system during each operation, a small vehicle plug of predetermined volume of liquid and material to be conveyed and a following air volume of pre-selected size to furnish an air cushion between consecutive secondary and ejected plug vehicles, and
   (f) maintaining the inner diameter of the conduit in the conduit system within the approximate range of from ¾″ to 2½″.

3. A method of conveying, including removing excrements collected in a water closet bowl, comprising the steps of:
   (a) blocking the bowl outlet by introducing a comparatively small quantity of water, in the vicinity of one quart, into the bowl;
   (b) flushing the walls of the bowl by forcibly squirting into the bowl an additional comparatively small amount of water;
   (c) driving the bowl contents through the bowl outlet into a connecting conveyor conduit by suddenly subjecting the contents to an air pressure differential which, in terms of equivalent water column height, is greater than the length of conveyor conduit required to contain the bowl contents, and
      (1) simultaneously shaping the contents to a short length piston-like liquid and excrement vehicle plug which completely fills out the cross section of the conveyor conduit downstream of the bowl outlet;
   (d) driving the liquid and excrement in the form of a short length plug by the pressure differential thereacross along the conveyor conduit toward a receiver, and
   (e) maintaining the inner diameter of the conveyor conduit throughout its length from bowl to receiver within the approximate range of from ¾″ to 2½″.

4. A method of removing a water and excrement accumulation collected in a water closet bowl having a controllable outlet and a water supply source, comprising the steps of:
   (a) introducing a comparatively small amount of water into the bowl, with its outlet closed, to cleanse the bowl surface and add to an excrement collecting water accumulation in the bowl;
   (b) forcing the water accumulation and any excrements collected therein through the bowl outlet into a pneumatic conveyor conduit pipe leading to a sub-atmospheric receiving vessel by
      (1) rapidly fully opening the bowl outlet to suddenly subject the bowl contents to a considerable pressure differential with the lower pressure existing in the receiving vessel and conduit pipe, and
      (2) simultaneously shaping the contents into a collected short length liquid plug vehicle having the internal cross section of the bowl outlet and conduit, the length of the plug vehicle being a fraction of the pressure differential expressed in water column height;
   (c) driving the short length liquid plug vehicle by the pressure differential thereacross in a self sealed piston-like manner along the conveyor conduit; and
   (d) maintaining the liquid plug vehicle at a substantially non-increasing cross section as it proceeds toward the receiving vessel until it reaches the vessel or for a substantial distance before it loses self sealing and coherent plug shape, said conveyor conduit pipe, throughout its length from the bowl to the receiving vessel, having its inside diameter maintained within the approximate range of ¾″ to 2½″.

5. A hydro-pneumatic conveying system for conveying short length liquid vehicle plugs for a considerable distance by pneumatic force, comprising:

(a) a pneumatic conduit with at least one entrance and an exit and of substantially constant inside diameter throughout which is within the approximate range of from ¾" to 2½";
(b) an evacuated receiver in fluid communication with the conduit exit to maintain the interior of said conduit under sub-atmospheric pressure;
(c) means in controllable fluid communication with said conduit entrance for:
  (1) automatically controlling the approximate amount of and introducing a small quantity of liquid and material to be conveyed into said conduit through said entrance in a plug form having a diameter dimension formed during introduction which is at least equal to the inside diameter of said conduit adjacent said entrance,
  (2) permitting air under ambient pressure to follow said plug for a predetermined time period, and
  (3) then sealing said conduit entrance,
  (4) said amount of liquid and material to be conveyed providing in said conduit a short length plug, the length of which in said conduit is a fraction of the difference between the pressure in said evacuated receiver and said ambient pressure expressed in height of an equivalent water column.

6. A hydro-pneumatic conveying system as defined in claim 5 wherein:
(a) said conduit comprises, at an intermediate location between said entrance and exit, a plug forming pocket having an inside diameter at least equal to the inside diameter of the immediately adjacent downstream conduit portion and having a capacity to form a short length plug the length of which in said conduit is a fraction of the difference between the pressure in said evacuated receiver and said ambient pressure expressed in height of an equivalent water column.

7. A hydro-pneumatic conveying system as defined in claim 5 wherein:
(a) said conduit has smoothly curved interior contours without abrupt direction changes wherever it passes over and around obstacles, and
(b) includes plural pockets at spaced locations intermediate said entrance and exit for forming short length secondary sealed plug vehicles from remains of other conveyed plugs, at finite locations during a steady non-conveying state of the system, separated by stretches of conduit of sufficient length to provide air cushions at least several times the short length of said plugs,
(c) the number of said pockets depending upon the distance and height traversed by said conduit.

8. A hydro-pneumatic conveying system as defined in claim 6 wherein said conduit is made from long stretches of tubing made from plastic capable of being deformed to follow ground contours and to form self-contained, integral plug forming means in the conduit.

9. A water closet emptying and conveying system comprising:
(a) a bowl in the form of a collecting basin having an outlet at its bottom;
(b) an evacuated receiving vessel;
(c) fluid communication means comprising a pneumatic conveyor conduit, having an inside diameter throughout its length within the approximate range of from ¾" to 2½", connected between said outlet at the bottom of said bowl and said evacuated receiving vessel;
(d) fluid communication control means comprising:
  (1) a shut-off valve normally blocking said bowl outlet;
  (2) inlet pipe means for introducing a comparatively small amount of water into said bowl to form a water accumulation in said basin which also blocks said bowl outlet and receives excrements;
  (3) emptying mechanism operating automatically upon initiation to open the shut-off valve suddenly and to reclose the shut-off valve after a lapse of a predetermined time; and
  (4) passageway means provided by the bowl outlet, the shut-off valve and the connection to said conveyor conduit to form a self sealed liquid vehicle plug from the bowl contents which fills out and forms a seal with the entire cross section of the outlet pipe downstream of said shut-off valve when said shut-off valve is opened suddenly and the contents of the bowl are subjected to a sudden pressure differential driving the self sealing liquid vehicle plug a further distance through said conveyor conduit in a piston-like manner.

10. In the conveying system defined in claim 9,
(a) at least one liquid trapping pocket formed in said conveyor conduit between said water closet bowl and said evacuated receiving vessel, and
(b) at least a section of said conduit leading to said pocket is inclined toward said pocket so that liquid and waste from previous plugs which collects in the bottom of said inclined conduit section flows toward said pocket under the action of gravity to form a secondary liquid vehicle plug in said pocket which fills out the entire cross section of the pipe, a pressure difference across the plug resulting from the evacuated receiving vessel and compressed air deriving from passage of a succeeding plug driving the secondary plug, spaced from said succeeding plug by an air cushion, a further distance in said conduit toward said receiving vessel during a following emptying operation.

11. A water closet emptying and conveying system comprising:
(a) a bowl in the form of a collecting basin with a bottom outlet;
(b) a transport conduit communicating with said outlet at the bottom of said bowl and adapted to be connected with an evacuated receiving vessel, said conduit having an inside diameter throughout its length within the approximate range of from ¾" to 2½";
(c) a normally closed shut-off valve disposed in said transport conduit adjacent the bowl;
(d) duct means for introducing predetermined small amounts of water into said bowl to provide a liquid sealed block in said bowl outlet and to flush the walls of said bowl;
(e) emptying mechanism operating automatically through a cycle after initiation to open said shut-off valve rapidly and to reclose said shut-off valve after a lapse of a predetermined time, and including
  (1) means to control the introduction of said predetermined small amounts of water to said duct means during an automatic emptying operation cycle;
(f) at least one short length liquid plug vehicle forming pocket in said transport conduit between said water closet bowl and said evacuated receiving vessel, and
  (1) a section of said transport conduit which leads to said pocket, being inclined towards said pocket so that liquid which collects in the bottom of said inclined conduit section flows towards said pocket under the action of gravity to form a secondary liquid plug in said pocket which fills out the entire cross section of said conduit;
(g) a pressure difference across the secondary plug, resulting from the evacuated receiving vessel and the compressed air cushion downstream of a succeeding plug and upstream of the secondary plug, driving the secondary plug a further distance in the conduit towards the receiving vessel during a following emptying operation.

12. A system for removing and conveying excrements from a plurality of water closet bowls, each having a bottom outlet, comprising:
   (a) a receiving vessel;
   (b) means for maintaining a comparatively high vacuum in said vessel;
   (c) a transport conduit communicating with said receiving vessel;
   (d) a plurality of branch conduits, each respectively connected at one end to an outlet at the bottom of an associated one of said bowls and at the other end to said transport conduit;
   (e) said branch conduits and said transport conduit having an internal diameter of within a range of from about ¾ inch to approximately 2½ inches;
   (f) a normally closed shut-off valve disposed in each of said branch conduits adjacent the bowl associated therewith;
   (g) means associated with each bowl for introducing a predetermined small amount of water sufficient only to form a short length plug related to the inner diameter of the transport conduit, into the bowl for blocking the bowl outlet;
   (h) means for rapidly opening any of said shut-off valves to subject the water and excrements in the corresponding bowl to a sudden pressure differential, caused by the vacuum in the receiving vessel, to drive the bowl contents as a self sealing short length liquid vehicle piston plug through the bowl outlet and said branch and transport conduits toward said receiving vessel,
   (i) the predetermined small amount of water introduced into the bowl being small enough to be disposed in coherent plug shape within a length of the transport pipe considerably shorter than the height of a water column corresponding to the pressure differential between the ambient air and the inside of the receiving vessel, and
   (j) the sections of the branch conduits having a smooth, internal, curved connection into said transport conduit, such curvature being directed toward said evacuated vehicle.

13. A water closet bowl emptying and disposal system comprising:
   (a) a pneumatic conduit system including conveying conduit which throughout said conduit system has an inside diameter maintained within the approximate range of from ¾" to 2½", one end of said conduit being an exit terminal end, and means subjecting its exit terminal end to sub-atmospheric pressure;
   (b) a plurality of water closet bowls, each having an outlet directed into a portion of said pneumatic conduit system;
   (c) bowl emptying mechanism for each said water closet bowl, each mechanism comprising selectively operable means having an automatic cycle of operation to rapidly introduce contents of said bowl, including liquid, in a coherent plug form self sealing relationship into the pneumatic conveying conduit followed by a considerable volume of atmospheric air passing through the bowl and the bowl outlet into said conduit system and thereafter reclosing the outlet and introducing a quantity of liquid vehicle carrier into the bowl sufficient to form a subsequent small volume coherent liquid vehicle plug upon selective initiation of a subsequent cycle of operation, and
   (d) said conduit system including a plurality of conduit drainage pockets at specific spaced intervals in said conduit between said water closet bowls and said system terminal end enabling collection by gravity drainage of liquid and material particles, from prior plugs passing from said bowls into the conduit, to form secondary plugs at spaced locations in the conduit thereby enabling progressive stepped conveying of liquid vehicle plugs for successive distances along the conveyor system until the material in the plugs reaches the said conduit system terminal end.

14. A hydro-pneumatic conveying system comprising:
   (a) a conveying conduit the inside diameter of which is within an approximate range of from ¾" to 2½" throughout said system, said conduit being provided with spaced apart divides of approximately constant inside diameter at locations intermediate the conduit ends;
   (b) each section of said conduit between adjacent divides being provided with a liquid trapping pocket, the volume of which is a minor fraction of the conduit volume between divides to provide space for an air cushion between adjacent pockets having a volume at least several times that of each said pocket;
   (c) an evacuated device connected to one end of said conduit to provide a sub-atmospheric pressure in said conduit;
   (d) an upstream terminal entrance to said conduit;
   (e) a selectively operable charge forming and dispensing mechanism connected to control relationship to said entrance for injecting into the conduit during each operation a liquid vehicle plug of predetermined volume sealed against the interior surface of said conduit and an air volume of preselected size, the latter being intended to serve as an air cushion between consecutive ejected liquid quantities, and said predetermined plug volume being of such value to form a plug having a diameter equal to that of the inside of said conduit and a length which is several times the diameter but considerably less than a water column height equivalent to the presure differential created by said evacuating device.

15. A multiplex hydro-pneumatic liquid vehicle plug, material conveying system comprising:
   (a) pneumatic conveyor conduit system comprising:
      (1) a plurality of branch conduits, each having a substantially constant cross section area throughout its length,
      (2) main conduit means having a main conduit in sections with a substantially constant cross section area throughout its length,
         (a) means joining adjacent ones of said main conduit sections and connecting said plurality of branch conduits to said main conduit; and
      (3) all conduits in said conduit system having inside diameters which are within a range from about ¾" to approximately 2½";
   (b) a plurality of means for introducing liquid and material to be conveyed, in the form of short length liquid vehicle plugs into associated ones of said branch conduits,
   (c) a main receiver in fluid sealed communication with one end of said main conduit;
   (d) means for evacuating said main receiver to a sub-atmospheric pressure;
   (e) said means connecting said branch conduits to said main conduit comprising at least one fluid tight connecting box including;
      (1) a bottom outlet to the adjacent downstream section of said main conduit including a plug forming pocket,
      (2) an upper inlet from the upstream section of said main conduit directed to discharge toward said bottom outlet, and
      (3) a plurality of upper inlets, one in fluid sealed communication from each of said plurality of branch lines conduits which connect to said connecting box, all directed to discharge toward said bottom outlet, (f) said connecting box providing a sub-atmospheric pressure to all branch conduits connected thereto; and (g) each liquid and material introducing means enabling opening of a sealed entrance to an associated branch conduit, introduction of a small volume liquid vehicle plug into its branch conduit followed by passage of a large volume of air under pressure higher than the sub-atmospheric pressure for a predetermined time and then resealing the entrance to the branch conduit.

16. A multiplex hydro-pneumatic conveying system as defined in claim 15, wherein:

(a) at least a portion of said conduits leading into said connection box are of one cross section dimension, and (b) the outlet and connecting main conduit section are of a slightly larger cross section dimension and include means enabling reforming of any plugs introduced into the connection box for subsequent conveyance as reformed liquid vehicle plugs along the main conduit during subsequent introduction of new liquid vehicle plugs into any branch conduit upstream of said connection box.

17. A multiplex hydro-pneumatic conveying system as defined in claim 15, wherein said main conduit means includes a plurality of small length liquid vehicle plug forming pockets at spaced intervals along said conduit sections, the spaced intervals being at least several times longer than the length of the plugs.

18. A hydro-pneumatic conveying system comprising:

(a) a receptacle, a portion of which is in the form of a collecting basin;

(b) an inlet pipe to said receptacle;

(c) means to connect said inlet pipe to a pressurized supply of water;

(d) an outlet pipe communicating with the lower portion of said basin;

(e) a valve, having a controlled through passage the same cross section dimension as said outlet pipe connected to and normally closing said outlet pipe;

(f) a collecting tank;

(g) a source of vacuum coupled to said tank to evacuate said tank;

(h) conduit means to connect said outlet pipe to said tank, the cross section dimension of said conduit means being the same as said outlet pipe and having an inside diameter throughout its length which is within an approximate range of from ¾" to 2½"; and (i) operating means including a timing device and a motor means, responsive to initial actuation to thereafter automatically cycle to control said motor to cause rapid full opening then a closing of said outlet valve after a predetermined interval.

19. In the hydro-pneumatic conveying system as defined in claim 18, said operating means including said timing means and motor means comprises:

(a) a fluid motor including a cylinder and a reciprocable power piston slidable therein;

(b) means including a manually actuable starting valve to connect the fluid motor to a source of fluid pressure for energization; and (c) operating mechanism including a piston rod in the fluid motor to open and close said outlet valve during power piston movement.

20. A conveying system comprising:

(a) a receptacle, a portion of which is in the form of a collecting basin;

(b) an inlet pipe to said receptacle;

(c) means to connect the inlet pipe to a pressurized supply of water;

(d) a collecting vessel;

(e) a source of vacuum coupled to said collecting vessel to evacuate said vessel;

(f) an outlet pipe communicating at one end with the lower portion of said basin and at the other end with the evacuated collecting vessel in which a comparatively high vacuum is maintained;

(g) a valve normally closing said outlet pipe;

(h) a fluid motor responsive to initial actuation to automatically cycle to open and then reclose said outlet valve after a predetermined interval;

(i) a line from a source of operating fluid to energize the fluid motor;

(j) a starting valve in the operating fluid line;

(k) a starting valve initiating device mechanically coupled to said starting valve; and (l) mechanical means responsive to operation of the fluid motor to enable actuation of the initiating device to open the starting valve and start the fluid motor only when the fluid motor occupies a position corresponding to the closed position of the outlet valve.

21. Water closet apparatus comprising a bowl in the form of a collecting basin, an inlet pipe to the bowl, means to connect the inlet pipe to a pressurized supply of flushing water, an outlet pipe communicating with the lower portion of the bowl, a valve normally closing said outlet pipe, pipe means to connect the outlet pipe to an evacuated closed receiving vessel on the downstream side of the outlet valve, a fluid motor responsive to actuation automatically to open and then reclose the outlet valve after a predetermined interval, the fluid motor including a vertically disposed cylinder and a weighted power piston slidable therein, an evacuating line from the upper end of the cylinder adapted to be connected to a source of vacuum, a manually operable starting valve in the evacuating line to initiate when opened operation of the fluid motor, an opening in the lower end of the power cylinder, and a piston rod varying in cross section along its length, the piston rod extending through the opening to form a restricted opening varying in area as a function of the position of the power piston to restrict the air entering the cylinder below the piston thereby to affect the speed of the piston during its upward stroke.

22. Apparatus as defined in claim 21, in which an opening is provided in the upper end of the cylinder communicating with the atmosphere to determine the speed of the piston during its downward stroke.

23. Water closet apparatus comprising a bowl in the form of a collecting basin, an inlet pipe to the bowl, means to connect the inlet pipe to a pressurized supply of flushing water, an outlet pipe communicating with the lower portion of the bowl, a valve normally closing said outlet pipe, a collecting tank, a source of vacuum coupled to the collecting tank to evacuate the tank, pipe means to connect the outlet pipe to the evacuated collecting tank on the downstream side of the outlet valve, operating mechanism responsive to actuation automatically to open and then reclose the outlet valve after a predetermined interval, vacuum operated control means cooperating with the valve operating mechanism, the control means being operated to a first condition in response to vacuum above a predetermined level to enable actuation of the valve operating mechanism and operated to a second condition in response to vacuum below a predetermined level to prevent actuation of the valve operating mechanism, and means connecting the vacuum operated control means to the evacuated outlet pipe downstream of the outlet valve to prevent actuation of the valve operating mechanism when the vacuum in the outlet pipe behind the valve is less than the predetermined level.

24. Water closet apparatus comprising a bowl in the form of a collecting basin, an inlet pipe to the bowl, means to connect the inlet pipe to a pressurized supply of flushing water, an outlet pipe communicating with the lower portion of the bowl, a valve normally closing said outlet pipe, a collecting tank, a source of vacuum coupled to the collecting tank, pipe means to connect the outlet pipe to the evacuated collecting tank, a fluid motor responsive to actuation automatically to open and then reclose the outlet valve after a predetermined interval, an evacuating line connecting the fluid motor to the source of vacuum, a manually operable starting valve in the line, a control cylinder connected to the evacuated outlet pipe on the downstream side of the outlet valve, a control piston cooperating with the starting valve, the control piston being slidably mounted in the control cylinder and operated from a second position to a first position when the vacuum in the outlet pipe exceeds a predetermined value, and a device connected to the control piston and operated to a first position enabling actuation of the valve operating fluid motor when the control piston is in its first position, the device being operated to a second position when the control piston is in its second position to prevent actuation of the valve operating fluid motor when a vacuum below the predetermined value is provided in the outlet pipe behind the outlet valve.

25. Water closet apparatus comprising a bowl in the form of a collecting basin, an inlet pipe to the bowl, means to connect the inlet pipe to a pressurized supply of flushing water, an outlet pipe communicating with the lower portion of the bowl, a valve normally closing said outlet pipe, a collecting container, a source of vacuum coupled to the collecting container to evacuate the container, pipe means to connect the outlet pipe to the evacuated collecting container on the downstream side of the outlet valve, a fluid motor responsive to actuation automatically to open and then reclose the outlet valve after a predetermined interval and to control the flow of pressurized water through the inlet pipe to the bowl, the fluid motor including a vertically movable weighted power member, means including a manually actuatable starting valve to connect the fluid motor to the source of vacuum for energization, and means providing communication between the upper end of the power member and the vacuum source through the starting valve to provide an upward power member stroke.

26. Water closet apparatus comprising a bowl in the form of a collecting basin, an inlet pipe to the bowl, means to connect the inlet pipe to a pressurized supply of flushing water, an outlet pipe communicating with the lower portion of the bowl, a valve normally closing said outlet pipe, a collecting tank, a source of vacuum coupled to the tank to evacuate the tank, pipe means to connect the outlet pipe to the evacuated collecting tank on the downstream side of the outlet valve, a fluid motor responsive to actuation automatically to open and then reclose the outlet valve after a predetermined interval, the fluid motor including a vertically disposed cylinder and a weighted power piston slidable in upward and downward strokes therein, means including a manually actuatable starting valve to connect the fluid motor to the source of vacuum for energization, operating mechanism including a piston rod in the fluid motor to open the outlet valve at the end of the upward stroke of the power piston and reclose the outlet valve during the downward stroke thereof.

27. Water closet apparatus comprising a bowl in the form of a collecting basin, an inlet pipe to the bowl, means to connect the inlet pipe to a pressurized supply of flushing water, an outlet pipe communicating with the lower portion of the bowl, a valve normally closing said outlet pipe, a collecting vessel, a source of vacuum coupled to the collecting vessel to evacuate the vessel, pipe means to connect the outlet pipe to the evacuated collecting vessel on the downstream side of the outlet valve, a fluid motor responsive to actuation automatically to open and then reclose the outlet valve after a predetermined interval, the fluid motor including a vertically movable power member, an evacuating line from the fluid motor communicating with the upper side of the power member and connected to the source of vacuum, a manually operable starting valve in the evacuating line to initiate when opened operation of the valve operating fluid motor, and fluid flow restricting means in the evacuating line mechanically coupled to the power member and operable between a restricted position and an unrestricted position by movement of the power member to control the speed of the upward stroke of the power member.

28. Water closet apparatus comprising a bowl in the form of a collecting basin, an inlet to the bowl, means to connect the inlet to a supply of flushing water, an evacuated collecting vessel, an outlet pipe communicating at one end with the lower portion of the bowl and at the other end with the evacuated collecting vessel, a valve normally closing said outlet pipe, operating mechanism responsive to actuation automatically to open and then reclose the outlet valve after a predetermined interval and to control the flow of pressurized water through the inlet pipe to the bowl, a double arm lever fulcrumed about a horizontal axis, a weight at one end of the lever to maintain it in a normal position, a receptacle at the other end of the lever communicating through a flexible pipe with the collecting basin so that the lever will be tilted away from its normal position when a certain quantity of water has collected in the receptacle, and means mechanically coupling the lever to the valve operating mechanism to prevent actuation of the valve operating mechanism when the lever is tilted from its normal position in response to rising of the liquid surface in the basin above a predetermined level.

29. Water closet apparatus comprising a bowl in the form of a collecting basin, an inlet pipe to the bowl, means to connect the inlet pipe to a pressurized supply of flushing water, a collecting vessel, a source of vacuum coupled to the collecting vessel to evacuate the vessel, an outlet pipe communicating at one end with the lower portion of the bowl and at the other end with the evacuated collecting vessel in which a comparatively high vacuum is maintained, a valve normally closing said outlet pipe, a fluid motor responsive to actuation automatically to open and then reclose the outlet valve after a predetermined interval, an evacuating line to energize the fluid motor, means to connect the line to the source of vacuum, a starting valve in the line between the fluid motor and the vacuum source, a starting valve initiating device mechanically coupled to the starting valve, and mechanical means responsvie to operation of the fluid motor to enable actuation of the initiating device to open the starting valve and start the fluid motor only when the fluid motor occupies a position corresponding to the closed position of the outlet valve.

30. A system for removing excrements from a plurality of water closet apparatus, each having a bowl in the form of a collecting basin, said system comprising a collecting tank, a source of vacuum coupled to the collecting tank to evacuate the tank, a transport pipe communicating with the collecting tank, a plurality of outlet pipes each communicating at one end with the lower portion of a corresponding water closet bowl and at the other end with the transport pipe, a valve associated wth each water closet apparatus normally closing the corresponding outlet pipe, an operating mechanism for each outlet valve responsive to actuation automatically to open and then reclose the outlet valve after a predetermined interval, at least one of the water closet apparatus incorporating a vacuum operated control means cooperating with the valve operating mechanism, the control means being operated to a first condition in response to vacuum above a predetermined level to enable actuation of the valve operating mechanism and operated to a second condition in response to vacuum below the predetermined level to prevent actuation of the valve operating mechanism, and means to connect the vacuum operated control means to the evacuated outlet pipe behind the corresponding outlet valve to prevent actuation of the valve operating mechanism when the vacuum in the outlet pipe behind the valve is less than less than the predetermined level.

31. A conveying system comprising: a receptacle, a portion of which is in the form of a collecting basin, an inlet pipe to said receptacle, means to connect the inlet pipe to a pressurized supply of water, an outlet pipe communicating with the lower portion of said basin, a valve normally closing said outlet pipe, a collecting tank, a source of vacuum coupled to the collecting tank to evacuate the tank, conduit means to connect the outlet pipe to the evacuated collecting tank on the downstream side of the outlet valve, operating mechanism responsive to actuation automatically to open and then reclose the outlet valve after a predetermined interval, power operated control means cooperating with the valve operating mechanism, the control means being operated to a first condition in response to vacuum in said system above a predetermined level to enable actuation of the valve operating mechanism and operated to a second condition in response to vacuum below a predetermined level to prevent actuation of the valve operating mechanism, and means connecting the vacuum operated control means to the evacuated outlet pipe downstream of the outlet valve to prevent actuation of the valve operating mechanism when the vacuum in the outlet pipe behind the valve is less than the predetermined level.

32. A conveying system comprising: a receptacle, a portion of which is in the form of a collecting basin, an inlet pipe to said receptacle, means to connect the inlet pipe to a pressurized supply of water, an outlet pipe communicating with the lower portion of said basin, a valve normally closing said outlet pipe, a collecting tank, a source of vacuum coupled to the collecting tank, conduit means to connect the outlet pipe to the evacuated collecting tank, a fluid motor responsive to actuation automatically to open and then reclose the outlet valve after a predetermined interval, a line connecting the fluid motor to a fluid pressure source, a manually operable starting valve in the line, a control cylinder connected in fluid communication to the evacuated conduit means on the downstream side of the outlet valve, a control piston cooperating with the starting valve, the control piston being slidably mounted in the control cylinder and operated from a second position to a first position when the vacuum in the outlet pipe exceeds a predetermined value, and a device connected to the control piston and operated to a first position enabling actuation of the valve operating fluid motor when the control piston is in its first position, the device being operated to a second position when the control piston is in its second position to prevent actuation of the valve operating fluid motor when a vacuum below the predetermined value is provided in the conduit means downstream of the outlet valve.

33. Water closet apparatus comprising:
 (a) a bowl in the form of a collecting basin;
 (b) liquid plug forming means, including an outlet pipe communicating with the lower portion of said bowl, to be connected to a source of vacuum;
 (c) pipe means carrying spraying nozzles in the upper portion of said bowl;
 (d) a control valve connected to a water source;
 (e) a double-acting hydraulic power cylinder and piston mechanism, said cylinder and piston cooperating to provide opposed expansible chambers;
 (f) first valve means connecting one chamber of said cylinder and piston alternately to the water source through said control valve and to said spraying nozzle pipe;
 (g) second valve means connecting the other chamber of said piston alternately to said spraying nozzle pipe and to the water source through said control valve, whereby actuation of said hydraulic piston by water flow through said control valve will force a predetermined small quantity of water from said cylinder through said spraying nozzles into said bowl to form a water accumulation blocking said outlet pipe and to receive waste material;
 (h) an outlet valve included in the plug forming means to block said outlet pipe downstream of the water accumulation;
 (i) means connecting said hydraulic piston to said outlet valve to abruptly fully open said outlet valve;
 (j) the liquid plug forming means cooperating with said basin to form a liquid plug in said outlet pipe when said valve is opened rapidly and the water in said bowl is subjected suddenly to a pressure differential produced by the vacuum source, the pressure differential driving the plug a substantial distance through said outlet pipe;
 (k) said control valve when opened enabling concurrent movement of said piston and flow of water through said spraying nozzles;
 (l) said hydraulic piston connecting means includes means which cooperate with said outlet valve to provide the opening and closing cycle of said outlet valve during a portion of the nozzle spraying so that water flows through said nozzles prior to said outlet valve opening and subsequent to said outlet valve closure;
 (m) a third valve connects said spraying nozzle pipe means to the water source; and
 (n) said outlet valve connecting means is connected to and controls said third valve to cause flow of water therethrough initially to said spray nozzle pipe means and to subsequently reduce said flow to said spray nozzle pipe means when said outlet valve is opened.

34. Apparatus as defined in claim 33, wherein said outlet valve connecting means includes means to control said third valve to increase the water flow through said spraying nozzles when said outlet valve is closed.

35. Apparatus as defined in claim 34, wherein said spraying nozzle pipe means includes two separate pipes carrying spraying nozzles, one pipe being in fluid communication to the hydraulic cylinder and the other pipe being in fluid communication with said third valve.

36. A hydro-pneumatic conveying system comprising:
 (a) a receptacle, a portion of which is in the form of a collecting basin;
 (b) an inlet pipe to said receptacle;
 (c) means to connect said inlet pipe to a pressurized supply of water;
 (d) an outlet pipe communicating with the lower portion of said basin;
 (e) a valve, having a controlled through passage the same cross section dimension as said outlet pipe connected to and normally closing said outlet pipe;
 (f) a collecting tank;
 (g) a source of vacuum coupled to said tank to evacuate said tank;
 (h) conduit means to connect said outlet pipe to said tank, the cross section dimension of said conduit means being the same as said outlet pipe; and
 (i) operating means comprising:
  (1) a pneumatic expansible chamber with a movable power member;
  (2) means including a manually actuable starting valve to connect said pneumatic motor to a source of pressure resulting from differential pressure between ambient air and the evacuated collecting tank pressure; and
  (3) operating mechanism including timing means and the movable power member of said pneumatic motor, to open and close said outlet valve during power member movement;
 said operating means being responsive to initial actuation to thereafter automatically cycle to control said motor to cause rapid full opening, then a closing of said outlet valve after a predetermined interval.

37. Water closet apparatus comprising a bowl in the form of a collecting basin, an inlet pipe to the bowl, means to connect the inlet pipe to a pressurized supply of flushing water, an outlet pipe communication with the lower portion of the bowl, an outlet valve normally urged to closed position and normally closing said outlet pipe, a collecting tank, a source of vacuum coupled to the tank to evacuate the tank, pipe means to connect the outlet pipe to the evacuated collecting tank on the downstream side of the outlet valve, an expansible chamber fluid motor responsive to actuation automatically to open and then reclose the outlet valve after a predetermined interval, the expansible chamber fluid motor including a vertically disposed cylinder and a weighted power piston slidable in upward and downward strokes therein, means including a manually actuatable starting valve to connect the fluid motor to the source of vacuum for energization, operating mechanism including a piston rod in the fluid motor to open the outlet valve at the end of the upward stroke of the power piston and reclose the outlet valve during the downward stroke thereof, a dog member connected to said piston rod, mechanical means coupled to said outlet valve, a locking lever weighted to pivot and hold said outlet valve open, and an abutment on said piston rod engaging and moving said locking lever into its release position to permit said outlet valve to close.

References Cited by the Examiner

UNITED STATES PATENTS

| | | | |
|---|---|---|---|
| 253,106 | 1/1882 | Sack | 4—82 |
| 380,082 | 3/1888 | Boyd et al. | 137—247.27 |
| 482,439 | 9/1892 | Liernur | 137—236 |
| 560,740 | 5/1896 | McCartney | 4—96 |
| 766,764 | 8/1904 | Keyt | 137—247.19 |
| 1,593,083 | 7/1926 | Kirchhan | 137—247.27 |
| 1,652,702 | 12/1927 | Curtis | 137—247.27 |
| 1,721,401 | 7/1929 | Martinez | 4—19 |
| 2,678,450 | 5/1954 | Simpson | 4—10 |
| 2,760,204 | 8/1956 | Joanis | 4—41 |
| 2,864,317 | 12/1958 | Robinson | 103—235 |

FOREIGN PATENTS 390,117  3/1933  Great Britain.

LAVERNE D. GEIGER, *Primary Examiner.*

FRANK E. BAILEY, EDWARD V. BENHAM,
*Examiners.*

UNITED STATES PATENT OFFICE
CERTIFICATE OF CORRECTION

Patent No. 3,239,849                           March 15, 1966

Sven Algot Joel Liljendahl

It is hereby certified that error appears in the above numbered patent requiring correction and that the said Letters Patent should read as corrected below.

Column 5, line 30, for "sucessive" read -- successive --; column 17, line 52, for "outet" read -- outlet --; line 59, for "verticaly" read -- vertically --; column 20, line 62, for 'sub-stmospheric" read -- sub-atmospheric --; column 25, line 53, after "cycle" insert -- of --; column 27, line 9, for 'permitting" read -- permitted --; column 28, line 3, for "its" read -- is --; column 27, line 6, beginning with "already under" strike out all to and including "the opposite" in line 40, same column 27, and insert the same, after "portion 101 is" in line 3, column 28; column 40, line 35, for "presure" read -- pressure --; column 44, line 75, strike out "less than".

Signed and sealed this 16th day of May 1967.

SEAL)
.ttest:

:DWARD M.FLETCHER,JR.                      EDWARD J. BRENNER
.ttesting Officer                             Commissioner of Patents